US012767567B2

(12) United States Patent
Oldfield

(10) Patent No.: US 12,767,567 B2
(45) Date of Patent: Oct. 20, 2026

(54) POLYALUMINUM SULFATE WITH REDUCED CHLORIDE CONTENT

(71) Applicant: USALCO, LLC, Baltimore, MD (US)

(72) Inventor: Michael R. Oldfield, Benton, AR (US)

(73) Assignee: USALCO, LLC, Baltimore, MD (US)

(*) Notice: Subject to any disclaimer, the term of this patent is extended or adjusted under 35 U.S.C. 154(b) by 387 days.

(21) Appl. No.: 18/414,103

(22) Filed: Jan. 16, 2024

(65) Prior Publication Data

US 2024/0246839 A1 Jul. 25, 2024

Related U.S. Application Data

(60) Provisional application No. 63/480,216, filed on Jan. 17, 2023.

(51) Int. Cl.
*C02F 1/52* (2023.01)
*C02F 101/12* (2006.01)

(52) U.S. Cl.
CPC ........ *C02F 1/5245* (2013.01); *C02F 2101/12* (2013.01); *C02F 2209/06* (2013.01); *C02F 2209/40* (2013.01)

(58) Field of Classification Search
CPC .......................... C02F 1/5245; C02F 2101/12; C02F 2209/06; C02F 2209/40; C02F 1/66; C01F 7/786
See application file for complete search history.

(56) References Cited

U.S. PATENT DOCUMENTS 4,563,342 A * 1/1986 Gunnarsson .............. C01F 7/74 210/705
2004/0166051 A1 8/2004 Shultes et al.

FOREIGN PATENT DOCUMENTS

KR 102038830 B1 * 10/2019 ............ C02F 1/5245

OTHER PUBLICATIONS

International Search Report and Written Opinion in Application No. PCT/US2024/011653 dated Mar. 21, 2024, 10 pages.

* cited by examiner

*Primary Examiner* — In Suk C Bullock
*Assistant Examiner* — Bachar El Haj Hassan
(74) *Attorney, Agent, or Firm* — Barclay Damon LLP

(57) ABSTRACT

Methods are described for manufacturing ultra-low chloride, polyaluminum sulfate (PAS) coagulants useful for removing suspended colloidal matter and organic carbon in potable water, industrial process water and wastewater. A method of preparing a PAS solution includes forming a basic solution of sodium carbonate and sodium aluminate, adding an aqueous solution of aluminum sulfate and the basic solution to water to form a mixture having a pH between about 5 to 7, allowing precipitates of aluminum hydroxide to form in the mixture, and adding an additional aqueous solution of aluminum sulfate in an amount sufficient to dissolve the precipitates of the aluminum hydroxide and to form the PAS solution. The PAS solution has reduced corrosivity compared to other aluminum-based coagulants, and is particularly suitable for drinking water applications. The simplified methods used to produce the PAS coagulant provide a high quality product that is less expensive to produce than current methods.

14 Claims, 5 Drawing Sheets

POLYALUMINUM SULFATE WITH REDUCED CHLORIDE CONTENT

CROSS-REFERENCE TO RELATED APPLICATIONS

This patent application claims the benefit of U.S. Provisional Patent Appl. No. 63/480,216 filed Jan. 17, 2023, the disclosure of which is incorporated by reference herein in its entirety.

TECHNICAL FIELD

The present invention relates to methods for making polyaluminum sulfate (PAS) with reduced chloride content. Such methods provide a product, useful for water treatment, with about 50% basicity and reduced corrosiveness.

BACKGROUND ART

Polyaluminum chloride (PAC), sulfated polyaluminum chloride, and polyaluminum chlorosulfate (PACS) are inexpensive to produce, and are useful as flocculating agents for water treatment. However, these compounds release chloride ions, which can corrode pipes, leading to the release of toxic substances, in particular lead ions. The corrosive nature of chloride was recently highlighted by the water crisis in Flint, Michigan, during which the presence of corrosive chloride ions contributed to lead levels well in excess of EPA limits.

U.S. Patent Appl. Publ. No. 2017/0113943 (the '943 publication) describes a procedure for the production of PAC and PACS, which involves combining an aluminum sulfate stream with a basic stream while maintaining a pH in the neutral range. However, in the '943 publication, the solution is decanted, after the precipitate of $Al(OH)_3$ forms, followed by a separate digestion step with polyaluminum chloride (PAC), aluminum chloride, and/or hydrochloric acid, which brings the precipitate into solution. The decantation step adds to the complexity of the process. More importantly, the resulting formulation cannot be considered "low chloride." Therefore, a need exists for methods of inexpensively producing flocculating agents that minimize the release of corrosive chloride ions.

SUMMARY OF THE EMBODIMENTS

In accordance with one embodiment of the invention, a method of preparing a polyaluminum sulfate (PAS) solution with reduced chloride content includes forming a basic solution of sodium carbonate and sodium aluminate and adding an aqueous solution of aluminum sulfate and the basic solution to water to form a mixture having a pH between about 5 and about 7. The method further includes allowing precipitates of aluminum hydroxide to form in the mixture and adding an additional aqueous solution of aluminum sulfate to the mixture in an amount sufficient to dissolve the precipitates of the aluminum hydroxide and to form the PAS solution.

In related embodiments, the aqueous solution of aluminum sulfate and the basic solution of sodium carbonate and sodium aluminate may be added to the water as two separate streams that do not contact one another prior to being added to the water. The basic solution may have a ratio of the sodium carbonate to the sodium aluminate of about 0.1 to 0.3. The method may further include agitating the water when the two separate streams are added to the water. The method may further include adjusting flow rates of the two separate streams in order to maintain the pH of the mixture. The PAS solution formed may have less than 20 ppm chloride. The mixture may have a pH between about 6.5 to about 6.8. The method may further include adding phosphoric acid to the PAS solution. The phosphoric acid may be added at a concentration of about 0.75% to about 1.5% by weight.

In accordance with another embodiment of the invention, a PAS solution is prepared according to any of the above described methods. The PAS solution may have a basicity of between about 40 and about 70, a weight percent sulfate between about 15 and about 22, and a weight percent alumina between about 7.5 and about 12. The PAS solution may have a basicity of between about 48% and about 52%, a weight percent sulfate between about 16.8 and about 17.2, and a weight percent alumina between about 8.0 and about 8.5. The PAS solution may be stabilized with between about 0.75% and about 1.125% phosphoric acid by weight.

According to another embodiment of the invention, a method for treating water to reduce impurities includes adding a PAS solution prepared according to any of the above described methods in order to coagulate the impurities. The method further includes separating the coagulated impurities from the water to produce a treated water reduced in the impurities without increasing a chloride to sulfate mass ratio of the treated water.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Figure 1:
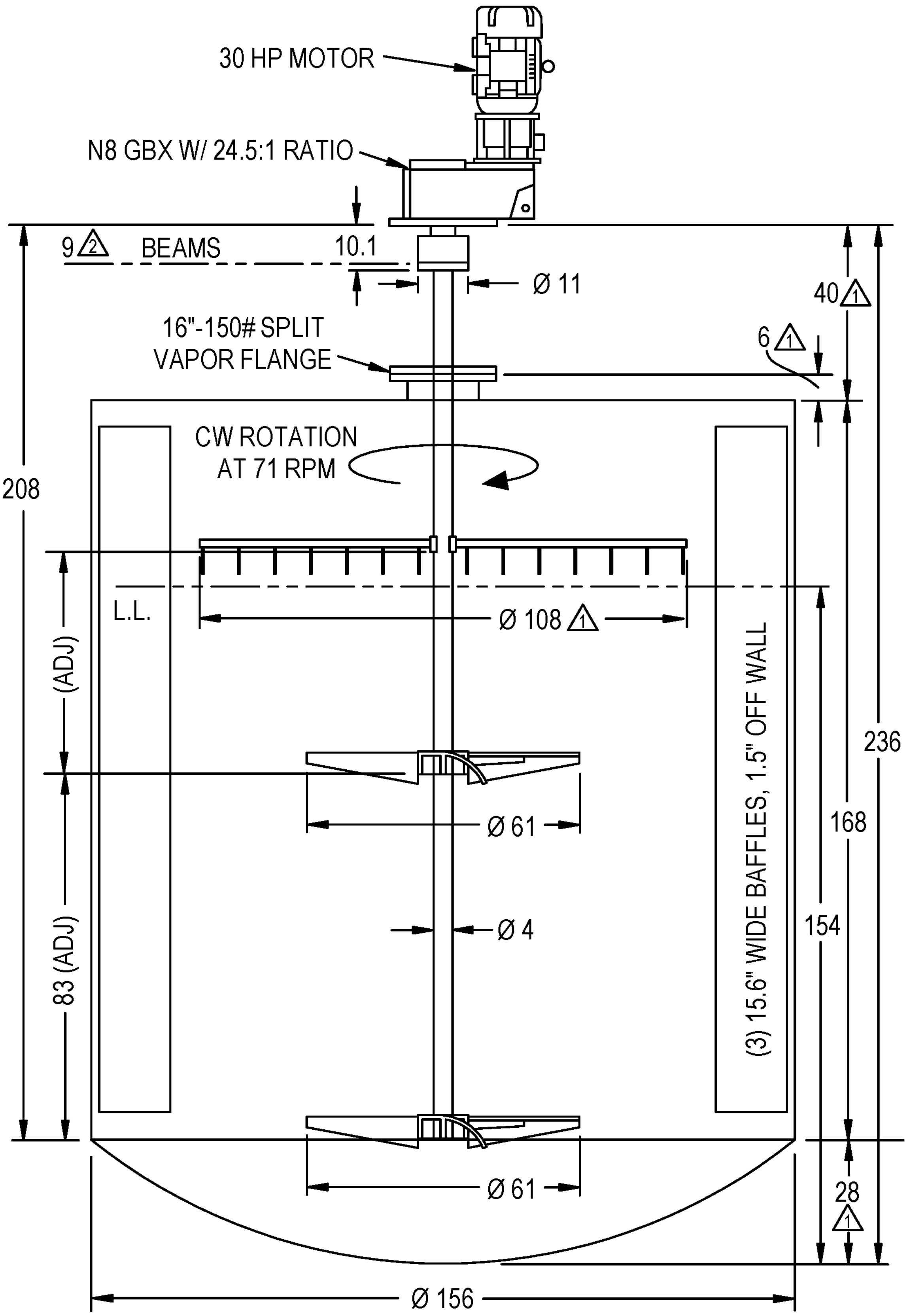
FIG. 1 is a diagram of a tank/mixer system suitable for use as a laboratory reactor according to embodiments of the present invention.

Definitions. As used in this description and the accompanying claims, the following terms shall have the meanings indicated, unless the context otherwise requires:

Expressed as a percentage, the "basicity" B of polyaluminum complexes, of the type $Al_n(OH)_mX_p(SO_4)_q$, where X is a halogen, is given by the formula B=m/3*n*100. Pure polyaluminum sulfate, with the formula $Al_4(OH)_6(SO_4)_3$ thus has a basicity of 50%.

"Turbidity" corresponds to the "cloudiness" of a solution. The unit used to measure turbidity is the Nephelometric Turbidity Unit (NTU). As reported here, turbidity is measured by light scattering according to USEPA Method 180.1. ISO 7027. In water testing, turbidity reflects the presence of suspended microscopic particles. Turbidity can be decreased by the use of coagulants, which cause the suspended particles to aggregate and settle.

"% TOC" refers to the total percentage of total organic carbon in a water sample. As reported here, TOC is measured according to Standard Methods for the Examination of Water and Wastewater, $18^{th}$ Ed. Using the Persulfate-Ultraviolet Oxidation Method 5310 C on a Sievers 900 Portable TOC analyzer utilizing a Sievers Inorganic Carbon Remover (ICR) and a GE autosampler.

"Alum" as used herein refers to aluminum sulfate, which has the chemical formula $Al_2(SO_4)_3$.

"Soda ash" is a common term for sodium carbonate, which has the chemical formula $Na_2CO_3$.

"Sodium aluminate" has the chemical formula $NaAl(OH)_4$.

In water purification applications, solutions of polyaluminum sulfate (PAS) function effectively as coagulants, and provide an alternative to other aluminum containing coagulants such as alum, polyaluminum chloride (PAC), sulfated polyaluminum chloride, and polyaluminum chlorosulfate (PACS). PAS solutions can be formulated with ultra-low chloride content. However, current methods of producing PAS are not cost-effective when compared to other aluminum containing coagulants.

According to embodiments of the present invention, methods are described for manufacturing an ultra-low chloride, PAS coagulant useful for removing suspended colloidal matter and organic carbon in potable water, industrial process water and wastewater. The PAS solution has reduced corrosivity compared to other aluminum based coagulants and is particularly suitable for drinking water applications. The simplified methods used to produce the PAS coagulant provide a high quality product that is less expensive to produce than current methods.

Method Description

The manufacture of polyaluminum sulfate (PAS) is completed in two steps in embodiments of the present invention. The first two steps involve the mixing of two solutions in a single reaction vessel, followed by an optional third step that stabilizes the resulting PAS solution. The first step involves the precipitation of aluminum hydroxide and the second step involves the digestion of the precipitated aluminum hydroxide. The method begins by forming a basic solution of sodium carbonate and sodium aluminate. Preferably, the basic solution has a sodium carbonate to sodium aluminate ratio of about 0.1 to 0.3. The method further includes simultaneously adding separate streams of an aqueous solution of aluminum sulfate and the basic solution to water to form a mixture having a pH between about 5 and about 7. The two separate streams are added into the reaction vessel such that they do not come into direct contact with one another before being dispersed into the water, under constant agitation, in the reaction vessel. The method further includes allowing precipitates of aluminum hydroxide to form in the mixture. Precipitation occurs as the pH reaches a range of about 5 to about 7 which is the range of minimum solubility for aluminum hydroxide. A key feature of the method is that the addition rates of the two streams into the reaction vessel are adjusted to maintain this pH range so that precipitation continues. The optimal range is a pH of about 6.5 to about 6.8. Sodium sulfate and carbon dioxide are produced as side reaction products. The precipitation step is typically completed in about 1 hour.

The use of a mixture of sodium aluminate solution with dissolved sodium carbonate is required to form a precipitate that will dissolve to form the final product. If only sodium aluminate solution is used, the resulting precipitate will not dissolve in a reasonable time period. If only sodium carbonate solution is used, the resulting product will be too dilute for commercial use due to its limited solubility in water.

The second step involves the digestion of the precipitated aluminum hydroxide. The method further includes adding an additional aqueous solution of aluminum sulfate to the mixture in an amount sufficient to dissolve the precipitates of the aluminum hydroxide and to form a liquid PAS solution at the desired basicity. This second step is completed as soon as the first step is finished. The time to digest the precipitated aluminum hydroxide in the additional amount of aluminum sulfate solution ranges from about 6 to about 20 hours when the proper proportion of sodium aluminate solution and sodium carbonate are used during the precipitation step.

The method may further include adding phosphoric acid to the PAS solution. This optional third and final step to form a stabilized final PAS product may include the addition of about 0.75 to about 1.5% phosphoric acid by weight to the mixture just after the final aluminum sulfate solution is added. The phosphoric acid increases the shelf life from about 2 months to about 6-12 months or more depending on the amount of phosphoric acid added.

The reactions that occur during the precipitation step and the digestion step are as follows.

Precipitation Step:

$$Al_2(SO_4)_3 + 2\ NaAl(OH)_4 + 2\ Na_2CO_3 + 2\ H_2O \longrightarrow 4\ Al(OH)_3 + 3\ Na_2SO_4 + 2\ CO_2$$

Digestion Step:

$$Al_2(SO_4)_3 + 2\ Al(OH)_3 \longrightarrow Al_4(OH)_6(SO_4)_3$$

Overall Reaction:

$$3\ Al_2(SO_4)_3 + 2\ NaAl(OH)_4 + 2\ Na_2CO_3 + 2\ H_2O \longrightarrow 2\ Al_4(OH)_6(SO_4)_3 + 3\ Na_2SO_4 + 2\ CO_2$$

Product Analysis and Description

Solutions of the PAS coagulant produced according to embodiments of the present invention, as described in the following working examples, are clear to slightly hazy liquids, colorless to yellow in appearance, having a percentage of alumina within the range of about 7.8% to about 8.7%, ideally within the range of about 8.0% to about 8.5%. The PAS solutions have basicities that are within the range of about 45% to about 55%, ideally within the range of about 48% to about 52%, and a percentage of sulfate within the range of about 16.5% to about 17.4%, ideally within the range of about 16.8% to about 17.2%. Here, the test methods used to determine the percentage of alumina, basicities, and the percentage of sulfate are provided in the "Test Method" column of Table I.

Table I further provides a summary of experimental results as described below compared to expected values for solutions of $Al_4(OH)_6(SO_4)_3$.

TABLE 1

Summary of experimental results

| Attribute | Expected Value | Range | Test Method |
|---|---|---|---|
| Appearance | Clear liquid | Clear to slightly hazy liquid. | Visual inspection or turbidity measurement |
| Color | Colorless | Colorless to yellow | Visual inspection |
| % Alumina, $Al_2O_3$ | 8.2 | 8-8.5 | ANSI/AWWA B408-18 Sec. 5.3 |
| % Basicity | 50 | 48-52 | ANSI/AWWA B408-18 Sec. 5.5 |
| % Sulfate, $SO_4$ | 17 | 16.8-17.2 | Standard Methods for the Analysis of Water and Wastewater 20th Ed. 4500 - SO42- D. |
| Viscosity, Brookfield @ 23° C. (LV1 spindle at 60 rpm) | 15 | <50 | |
| Specific Gravity | 1.293 | 1.285-1.300 | |

WORKING EXAMPLES

The laboratory reactor used for the following working examples is described below and shown in FIG. 1, although other size reactors may be used with embodiments of the present invention. The reactor consists of a 2-liter, thick-walled beaker fitted with three ½-inch 316 stainless steel baffles set equidistantly around the reactor. The beaker is 7½ inches tall with a 5-inch inside diameter. The bottom of the beaker is flat. The baffles preferably are $1/10^{th}$ the diameter of the beaker as in a full-scale reactor. Agitation was provided using a Caframo model BOC digital vertical shaft overhead mixer fitted with a 7¾ inch long shaft and a single 3-inch diameter, 45° pitched, four-blade agitator. The agitator is positioned so the blades are just covered by the start-up water and operated at 250 rpm during the process. Two glass serological pipets are clamped in the beaker on opposite sides and away from the baffles. They are set such that the tip of the pipets are close to and level with the middle of the agitator blades just below the surface of the start-up water. Two variable speed Masterflex peristaltic pumps fitted with #13 Masterflex tubing which feeds down into the serological pipets are used to add the components.

Water/Sodium Carbonate/Sodium Aluminate Feed Vessel

A second beaker of variable size is used to make up and feed the water/sodium carbonate/sodium aluminate mixture. The beaker was placed on a VWR programmable hotplate fitted with an infrared thermocouple for controlling the mixture temperature. Agitation was provided using a second Caframo model BOC digital vertical shaft overhead mixer fitted with a 7¾ inch long shaft and a single 1½ or 2¼-inch diameter, 45° pitched, four-blade agitator (depending on the volume of the mixture). The agitator is positioned so the blades are covered by the solution water and operated at 350 rpm initially to dissolve the sodium carbonate and combine the sodium aluminate. The speed is reduced as necessary during process to eliminate splashing. The thermocouple is positioned so that the infrared probe end is near to, but not touching the bottom of the beaker and such that it does not contact the agitator impeller. The hotplate is set to maintain the exotherm temperature of the solution process of the mixture which is usually around 35° C. A glass serological pipet is clamped such that the tip reaches to the bottom of the beaker but on a slight angle so as to not interfere with the flow of the mixture and is positioned so that the piped does not contact the agitator impeller. One end of one of the #13 Masterflex tubing from the precipitator/digestor set up is fed into the serological pipet to feed the reactor with the mixture.

Aluminum Sulfate Feed Vessel

A plastic Boston Round bottle of appropriate volume was used to feed the aluminum sulfate solution. A hole of the same diameter as the #13 Masterflex tubing was cut into the cap to seal the bottle after the aluminum sulfate solution is added to eliminate evaporating during the process. The end of the other #13 tubing is fitted into the bottle such that the end reaches to the bottom but does not interfere with the flow of the solution.

Laboratory Batch Procedure

Weigh and record the precipitator/digestor tare weight. Add the required amount of start-up water to the vessel. Place the agitator and serological pipets as described above. Set the agitator to 250 rpm.

Insert a calibrated pH probe with an automatic temperature compensator and digital pH and temperature readout midway between the serological pipets and downstream of the intended aluminum sulfate feed point. Place the probe such that the tip is covered by the start-up water and will not contact the agitator impeller.

Weigh and record the tare weigh of the beaker used to make up and feed the water/sodium carbonate/sodium aluminate mixture. Tare the balance with the vessel on it and add a slight excess of the required solution water and record the amount. Place the beaker on the programable hotplate as described above. Set the agitator at 350 rpm.

In another tared beaker, add a slight excess of the required amount of sodium carbonate and record the amount. Slowly add this to the mixture beaker. Reweigh the addition beaker to confirm all the sodium carbonate has been added. Record any difference. Allow the sodium carbonate to completely dissolve. Once dissolved set the hotplate to match the exotherm temperature of about 35° C.

In another tared plastic beaker add a 1-2 g excess of the amount of sodium aluminate required. This material is very viscous and careful addition is necessary to add the desired slight excess of material to the mixture. Re-tare the beaker with the sodium aluminate. Slowly added this to the mixture beaker until a slight excess is added. Do this by measuring the weight loss of the beaker containing the sodium aluminate. Record the total amount added by difference. From the recorded weight in steps 3, 4 and 5 the gross weight of mixture beaker can be calculated.

Tare the plastic Boston Round bottle to be used to feed the aluminum sulfate solution. Add 0.5-1.0 grams excess of the required amount of aluminum sulfate solution. Remove the bottle and tare the balance. Weigh and record the gross weight of the bottle and the aluminum sulfate solution. Insert the Masterflex tubing as described above.

Start the Masterflex pump feeding the aluminum sulfate solution on its lowest setting. When the solution reaches the reactor, and the pH drops to below 4 turn off the pump and record the temperature and pH using the meter readouts.

Start the Masterflex pump feeding the mixture on its lowest setting. When the mixture just reaches the bulk solution in the reactor restart the pump feeding the aluminum sulfate solution and start a timer.

Monitor and record the resulting bulk slurry temperature and pH using the meter readouts at one-minute intervals. Adjust the pump rates as necessary to achieve a bulk solution pH of 6.5-6.8 in as timely a manner as possible. Once the pH has stabilized increase the pump feed rates proportionally so that the water/sodium carbonate/sodium aluminate mixture feed is complete in about one hour. Monitor and record the bulk solution temperature and pH at convenient intervals.

When the water/sodium carbonate/sodium aluminate mixture feed is complete, record the bulk slurry temperature, pH and time and immediately weigh and record the final gross weight of the mixture beaker and any residual. Flush a small amount of water through the feed tubing.

Continue feeding the aluminum sulfate solution at the same rate until the bulk slurry drops below pH 5.0. Increase the feed rate to a maximum until all the aluminum sulfate solution is added. Record the bulk slurry temperature, pH and the time and immediately weigh and record the final gross weight of the bottle and residual. If a solid is being added as a stabilizer flush a small amount of water through the tubing. Remove and rinse the serological pipets used to feed the mixture and flush the tubing with water into a waste container.

In another tared beaker add a slight excess of the amount of stabilizer required. Tare and record the gross weight of the beaker and stabilizer. If a solid is being used add it directly to the top of the bulk slurry. Weigh and record the final gross weight of the beaker and any residual. If a solution is being used add it using the tubing used to feed the aluminum sulfate solution on the lowest pump setting. When all the stabilizer is added record the bulk slurry temperature, pH and the time and immediately weigh and record the final gross weight the beaker and any residual. Flush a small amount of water through the tubing.

Remove and rinse the serological pipet and flush the tubing with water into a waste container. Allow the slurry to mix until the pH has stabilized and record the final value. Remove the probe and allow as much solution to drain back into the reactor as practical. Rinse and store the probe as required. Allow the slurry to mix until all the solids have dissolved, overnight if necessary.

Once all the solids have dissolve turn off the agitator and remove the agitator. Allow as much solution to drain back into the reactor as practical. Record the time and weigh and record the final gross weight of the reactor and the final product.

Filter the solution through a #41 or #541 Whatman filter paper under vacuum. Store the final product in an appropriately sized plastic Boston Round sample bottle. Fill a 40 ml glass TOC vial for stability studies.

The product analysis and specifications obtained upon application of this procedure are shown above in Table 1.

Performance Testing Results

The PAS material stabilized with 1% phosphoric acid, prepared according to embodiments of the present invention and described in the Working Examples above, was used to treat raw water samples from central Arkansas and from Anderson, South Carolina. For comparison, water samples from the same batches were treated with alum.

Figure 2:
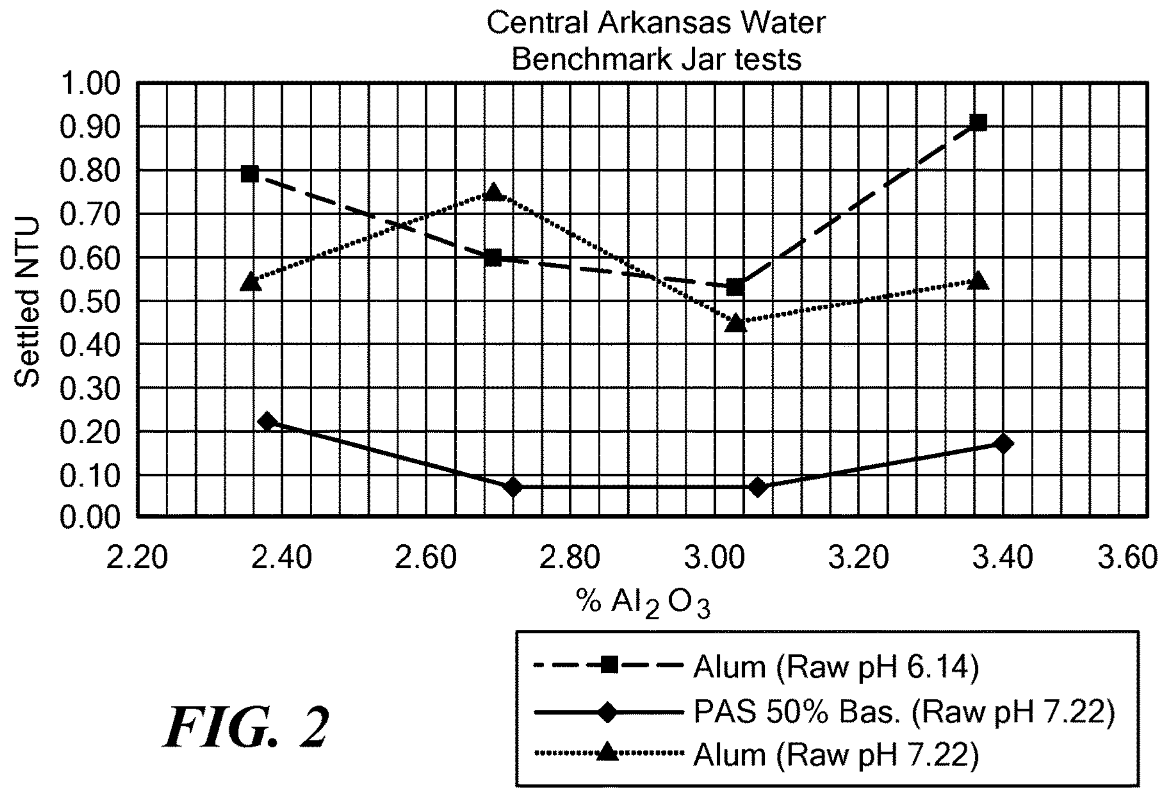
FIG. 2 is a graph showing the settled turbidity (settled NTU) for samples of central Arkansas water treated with increasing concentrations of alum (upper curves) and PAS (lower curve) according to embodiments of the present invention.

FIG. 2 shows the results of turbidity measurements following a settling period for a batch of raw water from central Arkansas treated with chlorine dioxide. The batch had an initial alkalinity of 8.8 mg/L, which increased to 17.5 mg/L as $ClO_2$ was lost. The turbidity of the sample was 4.4 NTU, and the TOC was 3.18 mg/L.

The lower curve of FIG. 2 shows samples treated with the PAS solution stabilized with 1% phosphoric acid according to embodiments of the present invention, whereas the upper curves show water samples from the same batch treated with alum. For the alum samples, the pH changed due to chlorine dioxide dissipation between the two sets of measurements. As can be seen, the sample treated with phosphoric acid stabilized PAS according to embodiments of the present invention produced settled water turbidities significantly lower than those for samples treated with alum at equivalent alumina dosages.

Figure 3:
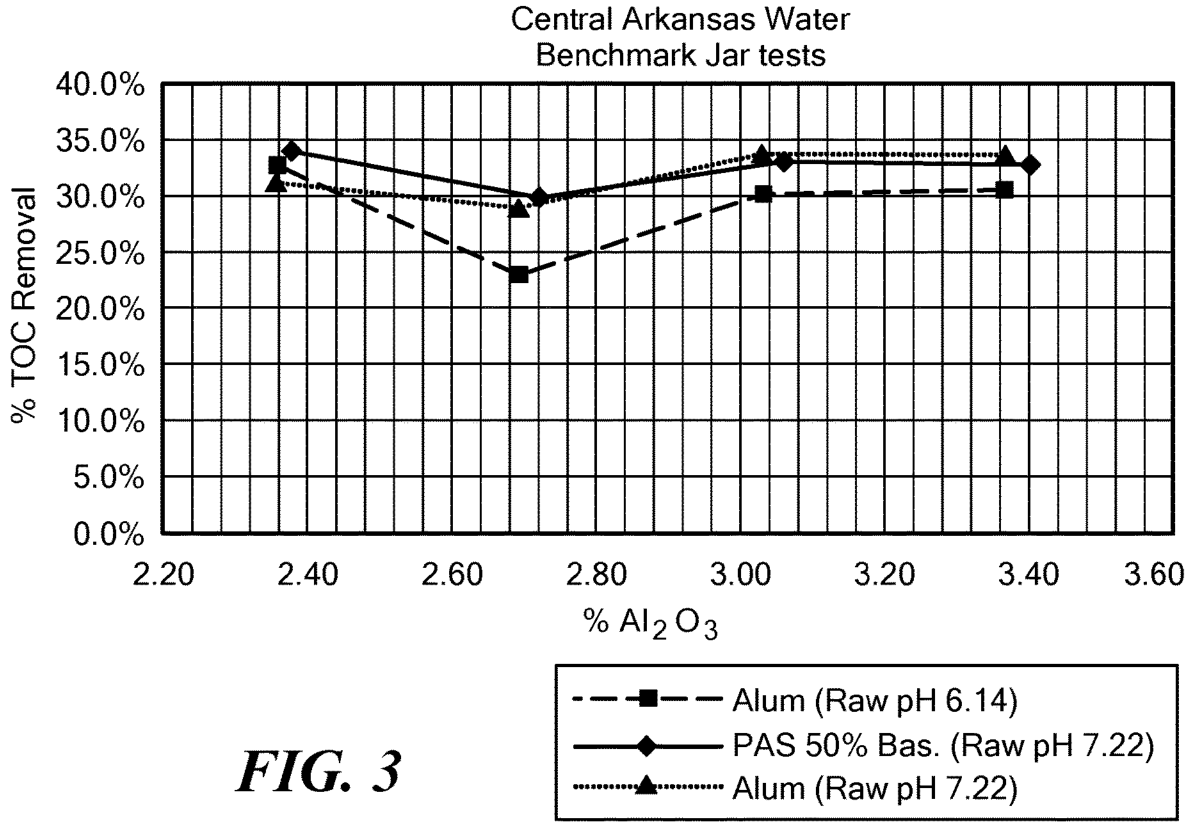
FIG. 3 is a graph showing settled turbidity for the samples of FIG. 2, plotted against the treatment cost in $/Million Gallons (MG). The dashed and the dotted curves are for treatment with alum, whereas the solid curve is for treatment with PAS according to embodiments of the present invention.

Treatment costs in $/MG are shown in FIG. 3 for the treated samples of FIG. 2. The optimum turbidity for the alum sample was about 0.45 NTU, and corresponded to a treatment cost of about $11/MG. If the PAS data are extrapolated back to an equivalent turbidity of 0.45 NTU, the treatment costs would only be about $9/MG. Consequently, to reach an equivalent turbidity, treatment with the PAS solution, prepared according to embodiments of the present invention, is less expensive than treatment with alum.

Figure 4:
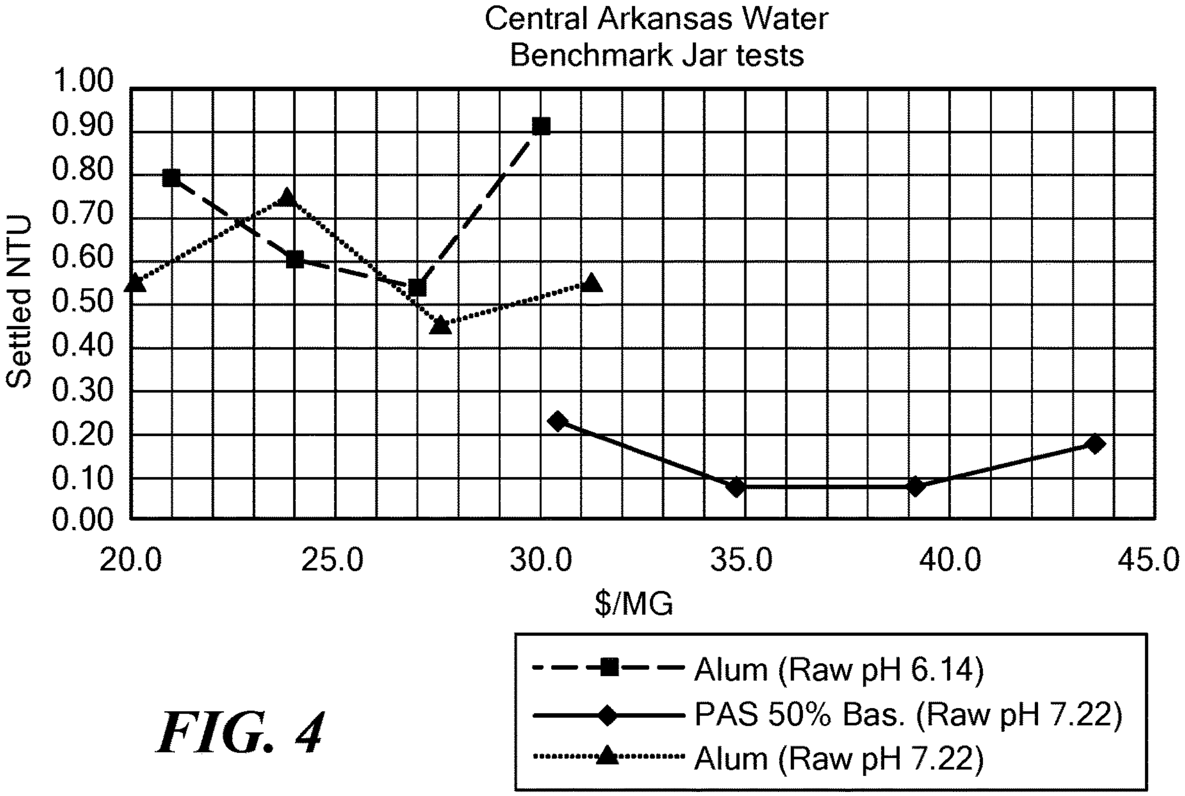
FIG. 4 is a graph showing the percentage of Total Organic Carbon (TOC) for central Arkansas water samples treated with alum (dashed and dotted lines) and with PAS (solid line) according to embodiments of the present invention.

As shown in FIG. 4, a comparison of % TOC shows an equal or better performance for samples treated with the PAS solution prepared according to embodiments of the present invention compared to samples treated with alum at equivalent alumina dosages.

Figure 5:
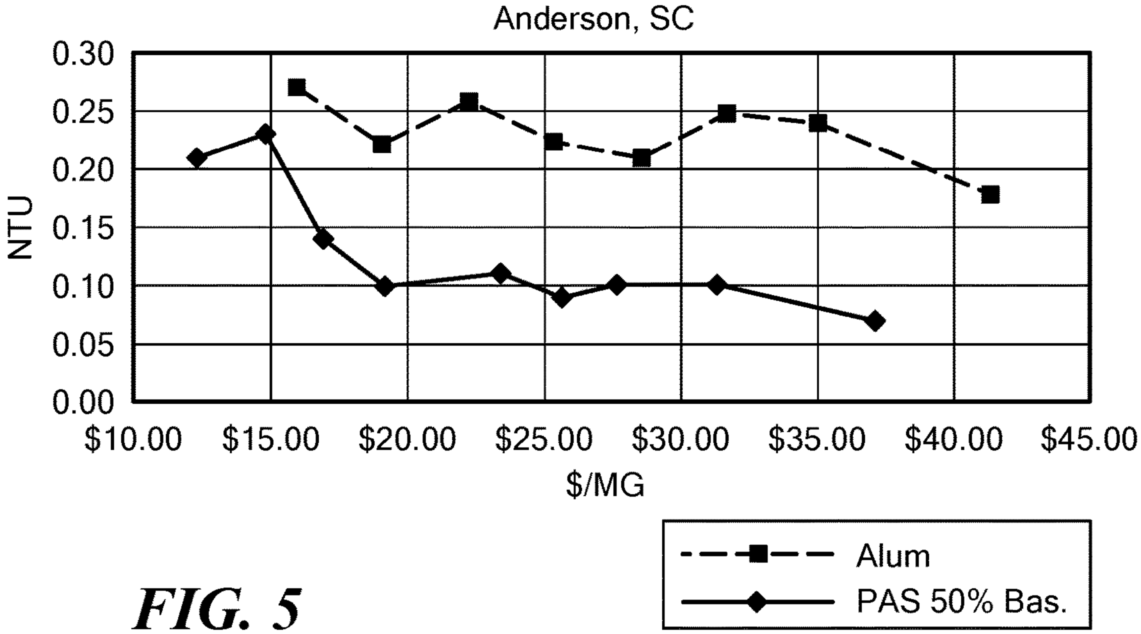
FIG. 5 is a graph showing settled turbidity plotted against the cost per milligram of alum (dashed curve) and of PAS (solid curve) according to embodiments of the present invention for samples of raw water from Anderson, South Carolina.
Figure 6:
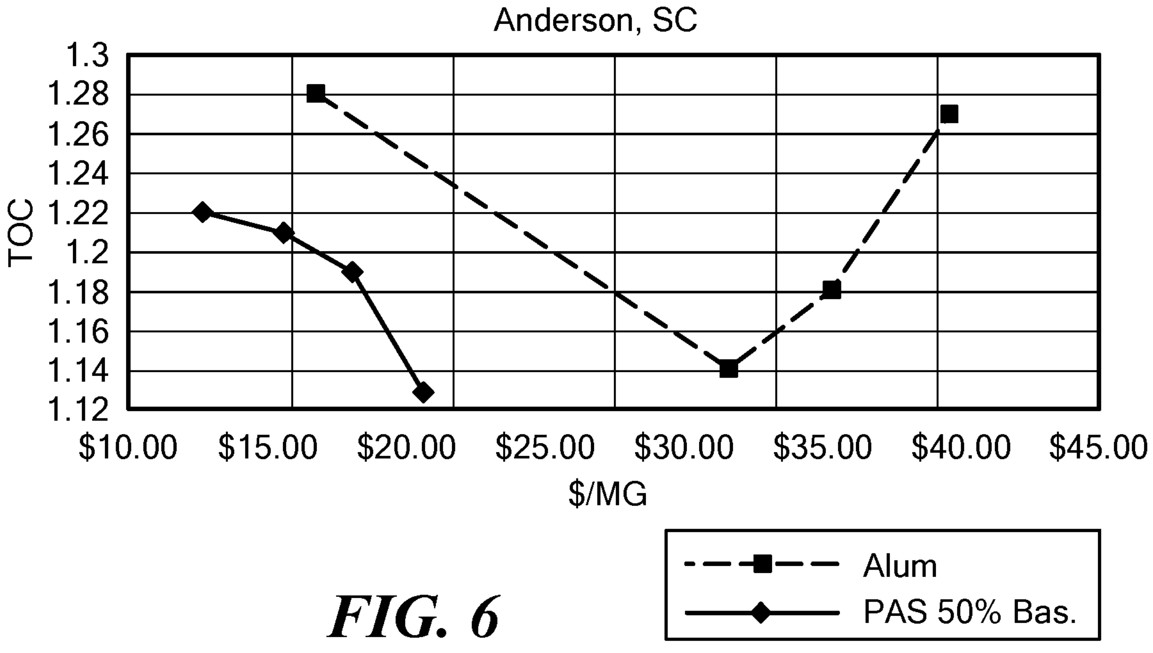
FIG. 6 is a graph showing the percentage of TOC plotted against the cost per milligram of alum (dashed curve) and of PAS (solid curve) according to embodiments of the present invention for samples of raw water from Anderson, South Carolina.

FIGS. 5 and 6 show settled turbidity and % TOC removal for a batch of raw water from Anderson, South Carolina. In FIGS. 5 and 6, the settled turbidity and % TOC numbers are compared versus estimated $/MG. As is evident from FIG. 5, when compared at equivalent costs per MG, phosphoric acid stabilized PAS treatment, according to embodiments of the present invention, produced settled water turbidities generally lower than alum treatment. FIG. 6 demonstrates that TOC removal was likewise better for the PAS treatments, according to embodiments of the present invention, when compared to alum treatment at equivalent costs per MG.

Stability Testing Results

Figure 7:
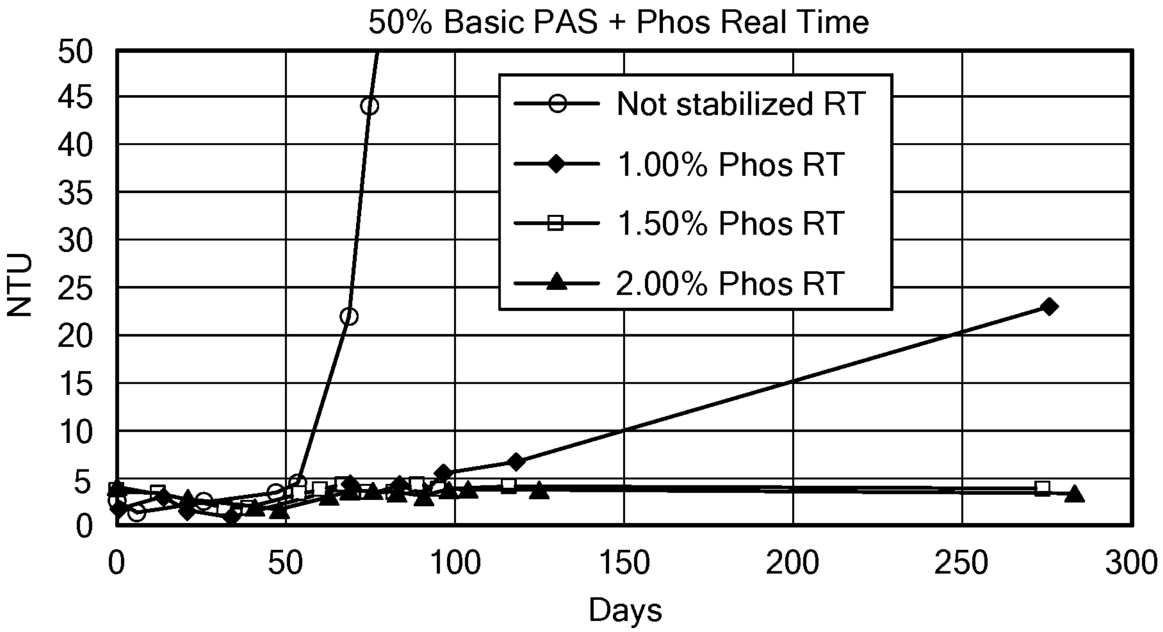
FIG. 7 shows a stability test for raw water samples for treatments with various concentrations of phosphoric acid stabilizer. The hollow circles show data for untreated samples. The solid diamonds, hollow squares, and solid triangles show data for samples treated with 1%, 1.5%, and 2% phosphoric acid, respectively.

FIG. 7 shows stability studies performed at ambient temperature for samples with various levels of phosphate stabilizer. For the sample not treated with phosphate stabilizer, a dramatic increase in settled turbidity occurred just beyond 50 days. However, samples treated with 1% by weight of phosphoric acid stabilizer showed no significant increase in turbidity for nearly 100 days, and samples with weight percentages of 1.5% and 2% showed no increase in settled turbidity over the nearly 300 day testing period.

Additional Working Examples of Clarity Tests

Figure 8:
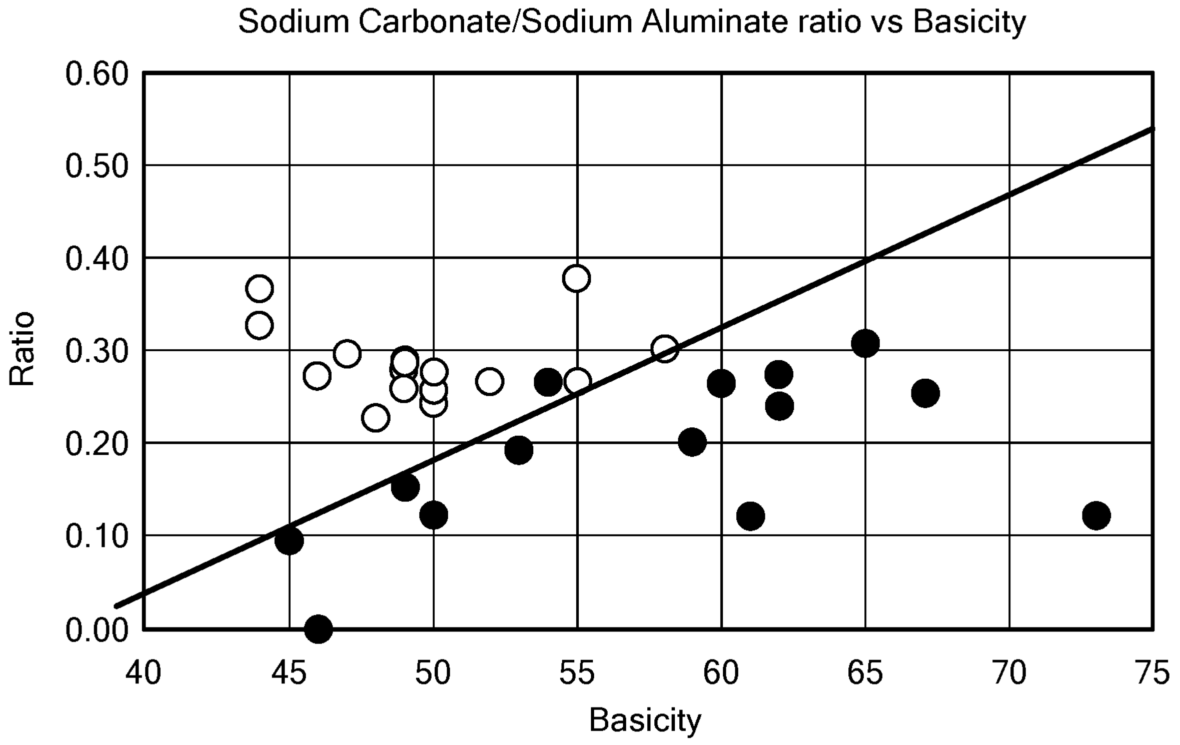
FIG. 8 shows clarity data obtained, under various experimental conditions, for PAS preparations according to embodiments of the present invention.

Table 2 shows a summary of results of numerous clarity tests that were conducted with different experimental parameters according to embodiments of the present invention. A more detailed description of the parameters and processes used for each of the clarity tests are shown in Tables 3-37 for Lot numbers MR-105, MS-100, MS-110, MS-170, MU-046, MU-064, MU-162, MU-164, MU-166, MU-168, MU-180, MV-057, MV-061, MV-064, MV-067, MV-070, MV-073, MV-076, MV-080, MV-085, MV-110, MV-115, MV-119, MV-122, MV-125, MV-128, MV-131, MV-142, MV-145, MV-155, MV-158, MV-161, MV-169, MV-173, and MV-176, respectively. FIG. 8 shows graphically the relationship between the basicity and the ratio of sodium carbonate to sodium aluminate for samples that were initially clear (hollow circles) versus samples that were turbid (solid circles). These results support the ranges that are shown in Table 1.

TABLE 2

Clarity tests under various experimental conditions

| Lot | % Bas. | Stablizer | % Soda Ash | % LSA | SA/LSA | % SO4 | Rxn Temp. (° C.) | ppt pH | Initial clarity | Time (Hr) | Temp. (° C.) | Final Clarity | Time (Hr) |
|---|---|---|---|---|---|---|---|---|---|---|---|---|---|
| MR-105 | 67 | None | 3.0 | 11.9 | 0.25 | 15.56 | 49.5 | 6.34 | Heated/ Clear | 17-24 | — | — | — |
| MS-100 | 98 | None | 5.9 | 16.7 | 0.35 | 12.64 | 58.5 | 5.75 | Slurry | — | — | — | — |
| MS-110 | 95 | None | 6.3 | 16.8 | 0.37 | 12.45 | 47.3 | 5.51 | Slurry | — | — | — | — |
| MS-170 | 100 | None | 6.3 | 16.8 | 0.37 | 12.49 | 49.9 | 5.90 | Slurry | — | — | — | — |
| MU-046 | 50 | 2% Phos | 1.4 | 11.6 | 0.12 | 16.65 | 37.9 | 6.47 | Cloudy | 42.1 | 40 | Clear | 66.1 |
| MU-064 | 49 | 2% Phos | 1.8 | 11.7 | 0.16 | 16.57 | 27.5 | 6.82 | Cloudy | 18.6 | 40 | Clear | 27.1 |
| MU-162 | 73 | 2% Phos | 2.2 | 17.7 | 0.12 | 13.70 | 27.7 | 6.18 | Cloudy | 20.25 | 40 | ND | ND |
| MU-164 | 61 | 2% Phos | 1.8 | 14.7 | 0.12 | 14.91 | 27.7 | 6.12 | Cloudy | 20.9 | 40 | Clear | 116.9 |
| MU-166 | 55 | 2% Phos | 3.7 | 9.8 | 0.38 | 16.03 | 25.6 | 5.85 | Clear | 18.5 | — | — | — |
| MU-168 | 44 | 2% Phos | 3.0 | 8.1 | 0.37 | 16.72 | 26.1 | 5.54 | Clear | 18.4 | — | — | — |
| MU-180 | 62 | 2% Phos | 3.2 | 13.3 | 0.24 | 15.98 | 27.4 | 6.39 | Cloudy | 22.5 | 40 | Clear | 26.5 |
| MV-057 | 46 | 0.2% SG | 0.0 | 12.3 | 0.00 | 18.54 | 23.9 | 6.09 | Cloudy | 20 | 35-40 | Clear | 42 |
| MV-061 | 45 | 0.2% SG | 1.0 | 10.5 | 0.10 | 18.04 | 24.4 | 6.61 | Cloudy | 20 | 40 | Clear | 27 |
| MV-064 | 48 | 0.2% SG | 2.1 | 9.0 | 0.23 | 17.85 | 25.5 | 6.66 | Clear | 19.5 | — | — | — |
| MV-067 | 53 | 0.2% SG | 2.1 | 10.9 | 0.19 | 18.05 | 25.7 | 6.64 | Cloudy | 19.5 | 35 | Clear | 25 |
| MV-070 | 52 | 0.2% SG | 2.6 | 9.7 | 0.27 | 17.20 | 25.8 | 6.81 | Clear | 18 | — | — | — |
| MV-073 | 54 | 0.2% SG | 2.7 | 10.3 | 0.26 | 17.55 | 25.9 | 6.45 | Cloudy | 17.7 | 35 | Clear | 21.7 |
| MV-076 | 58 | 0.2% SG | 3.1 | 10.3 | 0.30 | 16.67 | 26.2 | 6.58 | Clear | 18 | — | — | — |
| MV-080 | 62 | 0.2% SG | 3.1 | 11.4 | 0.28 | 16.71 | 27.3 | 6.63 | Cloudy | 18.5 | 35 | Clear | 21.6 |
| MV-085 | 65 | 0.2% SG | 3.7 | 12.0 | 0.31 | 16.21 | 26.8 | 6.51 | Cloudy | 22.5 | 35 | Clear | 24 |
| MV-110 | 55 | none | 2.5 | 9.4 | 0.27 | 16.60 | 27.2 | 6.49 | Clear | 18.2 | — | — | — |
| MV-115 | 46 | 2% Phos | 2.6 | 9.5 | 0.27 | 16.55 | 26.6 | 6.31 | Clear | 19.5 | — | — | — |
| MV-119 | 50 | 2% Phos | 2.6 | 10.6 | 0.24 | 16.31 | 27.0 | 6.49 | Clear | 18.1 | — | — | — |
| MV-122 | 49 | 0.26% Phos | 2.6 | 9.0 | 0.29 | 17.07 | 25.9 | 6.42 | Clear | 20.75 | — | — | — |
| MV-125 | 49 | 0.52% Phos | 2.6 | 9.1 | 0.28 | 16.96 | 26.4 | 6.83 | Clear | 18.2 | — | — | — |
| MV-128 | 49 | 1.0% Phos | 2.6 | 9.6 | 0.27 | 16.75 | 26.9 | 6.72 | Clear | 18.25 | — | — | — |
| MV-131 | 50 | 1.5% Phos | 2.6 | 10.5 | 0.24 | 16.57 | 26.9 | 6.60 | Clear | 18.1 | — | — | — |
| MV-142 | 59 | 0.55% Phos | 2.6 | 12.9 | 0.20 | 16.43 | 26.9 | 6.23 | Cloudy | 20.5 | — | Clear | 45.5 |
| MV-145 | 60 | 0.5% Phos | 3.0 | 11.4 | 0.26 | 15.54 | 27.6 | 6.46 | Cloudy | 19 | 30 | Clear | 24.5 |
| MV-155 | 49 | 1.0% Phos | 2.6 | 9.9 | 0.26 | 16.90 | 28. | 5.85 | Clear | 17.33 | — | — | — |
| MV-158 | 49 | 0.6% SG | 2.6 | 9.1 | 0.29 | 17.19 | 28.3 | 6.64 | Clear | 19.2 | — | — | — |
| MV-161 | 50 | 1.0% Phos | 2.5 | 9.7 | 0.26 | 16.77 | 23.4 | 6.43 | Clear | 19.75 | — | — | — |
| MV-169 | 44 | 1.0% Phos | 2.5 | 7.6 | 0.33 | 17.94 | 26.1 | 6.13 | Clear | 18.33 | — | — | — |
| MV-173 | 47 | 1.0% Phos | 2.5 | 8.3 | 0.30 | 17.63 | 27.5 | 6.03 | Clear | 20.25 | — | — | — |
| MV-176 | 50 | 1.0% Phos | 2.6 | 9.3 | 0.28 | 17.37 | 28.5 | 6.60 | Clear | 18.42 | — | — | — |

SG = Sodium gluconate
Phos = 75% Phosphoric acid solution

For Lot numbers MS-100, MS-110, and MS-170, Table 2 shows just the precipitation of aluminum hydroxide step.

For Lot number MU-162, the sample initially gelled, but with extra alum became fluid but turbid.

TABLE 3

| | | | | | | | | | | | | | | | |
|---|---|---|---|---|---|---|---|---|---|---|---|---|---|---|---|
| | | | | | | | | | | | | Headspace | | | |
| | | | | | 67% Basic PAS | | Conversion Gallons | | | | Target | Initial | Actual | | |
| | Working Examples MR-105 | | | MR-105 | | | 91.1969 | 14774.7 | | | 11.4 | 1.0 | 16.0 | 8.3 | |
| | Digest Temp. (° C.) | | | | Formulation | | | Target | | | | Actual | | | |
| Target | Overnight (° C.) | % $M_2O_3$ | % Basicity | Sp. Gr. | grams | % | Pounds | Gallons | % | Min. Gallons | Pounds | Gallons | % | | |
| 60.00 | Start Up Water | 0 | | 1.000 | 60.00 | 3.70 | 5,470 | 656 | 3.70 | 2,100 | 23,005 | 2759 | 15.56 | | |
| 0.00 | Ferric sulfate | 17.75 | 10.5 | 1.581 | 0.00 | 0.00 | 0 | 0 | 0.00 | 1,869 | 2,955 | 354 | 2.00 | | |
| 252.20 | Water (SA) | 0 | | 1.000 | 252.20 | 15.56 | 23,000 | 2,759 | 15.56 | 5,518 | 18,330 | 2499 | 12.40 | | |
| 49.20 | Soda Ash | 0 | | NA | 49.20 | 3.04 | 4,485 | NA | 3.03 | | 5,685 | NA | 3.85 | | |
| 193.20 | 43% SAX | 23.63 | 140.1 | 1.520 | 193.40 | 11.93 | 17,635 | 1,392 | 11.93 | 4,150 | 10,550 | 833 | 7.14 | % $Na_2O$ SAX | 18.74 |
| 1145.40 | Alum | 8.29 | 0.74 | 1.325 | 1145.50 | 70.67 | 104,465 | 9,457 | 70.68 | | 26,050 | 2358 | 17.62 | | |
| 0.00 | UP 290 | 17.29 | 41.8 | 1.370 | 0.00 | 0.00 | 0 | 0 | 0.00 | | 63,035 | 5519 | 42.65 | % Cl UP 290 | 20.99 |
| 0.00 | $H_3PO_4$ (75%) | 0 | | 1.570 | 0.00 | 0.00 | 0 | 0 | 0.00 | | 0 | 0 | 0.00 | | |
| | Flush Water | | | 1.000 | 0.00 | 0.00 | 0 | 0 | 0.00 | | 0 | 0 | 0.00 | | |
| 1700.00 | UltraPAC 2230 | 8.68 | 8.7 | 1.200 | 1700.30 | 104.90 | 155,060 | 15,499 | 104.91 | | 149,610 | 13,749 | 101.22 | | |
| | Check | | | | 1620.80 | 100.00% | 155,055 | | | 148,014 | 147,806 | 14,390 | 100.00% | | |
| | % SA soln | 16.3% | | 1.153 | 1,350.7 | 95.32% | 147,805 | −7,250 | | −208 | −1,804 | 641 | 98.79% | | |

| | Evaporation | | | % $Al_2O_3$ | % Basicity | % $SO_4$ | % Cl | $Cl/SO_4$ ratio | Cl + $SO_4$ | Na | Cl + $SO_4$ + Na |
|---|---|---|---|---|---|---|---|---|---|---|---|
| Expected | 0.00 | 0.00% | Evap. & $CO_2$ | 8.68% | 57.2 | 16.56 | 0.00 | 0.00 | 16.56 | 2.91 | 19.47 |
| Actual | 79.50 | 4.90% | Just $CO_2$ | 8.35% | | 15.93 | 0.00 | | 15.93 | 2.91 | 18.84 |

1. Add required amount of start up water to the reactor and start agitation. 1
2. Add the required amount of water into the soda ash mix vessel and start agitator. 1804 1.22%
3. Add required amount of sodium carbonate (soda ash) to the soda ash mix vessel and agitate until dissolved.
4. Add the required amount of 43% sodium aluminate solution Into the soda ash mix vessel.
5. Add the required amount of aluminum sulfate solution to the alum holding vessel.
6. Start addition of the aluminum sulfate solution to the reactor to lower pH to less than 4.
7. Start addition of the sodium carbonate/sodium aluminate mixture to the reactor.
8. Adjust feed rates to add the solutions over desired time period maintaining the pH between 6 and 7.
9. Increase the feed rate of the aluminum sufate solution when all of the sodium carbonate/sodium aluminate solution has been added.
10. When all of the aluminimc sulfate solution has been added start the phosphoric acid addition.
11. When phosphoric acid addition is completet let solution mix until all solids have dissolved.

TABLE 3-continued

| Analysis: | Calculated | Actual | |
|---|---|---|---|
| Specific Gravity | | 1.291 | |
| % $M_2O_3$ | 8.68 | 8.79 | |
| % $Al_2O_3$ | 8.68 | 8.79 | |
| % $Fe_2O_3$ | 0.00 | 0.00 | |
| % Basicity | 57.2 | 67.1 | 9.9 170.5 143.6 |
| % Sulfates | 16.56 | ND | |
| Turbidity, NTU | | 9.4 | |
| Viscosity, cps | | 15.4 | |

Precipitation observations and data

| Time (min) | Bulk slurry Temp. (° C.) | Bulk slurry Temp. (° F.) | Bulk slurry pH | Alum/ UP290 pump setting | $H_2O$/ SA/SAX pump setting | Comments | Alum pump rate (ml/min.) | $H_2O$/ SA/SAX pump rate (ml/min.) | Pump Ratio | |
|---|---|---|---|---|---|---|---|---|---|---|
| 0 | 48.1 | 118.6 | 4.56 | 19 | 4 | Started both feeds. | 4.0 | 4.3 | 0.9 | |
| 1 | 48.0 | 118.4 | 7.01 | 20 | 4 | | 4.2 | 4.3 | 1.0 | |
| 2 | 47.8 | 118.0 | 6.67 | 20 | 4 | | 4.2 | 4.3 | 1.0 | |
| 3 | 47.9 | 118.2 | 6.81 | 20 | 4 | | 4.2 | 4.3 | 1.0 | |
| 4 | 48.3 | 118.9 | 6.83 | 20 | 4 | | 4.2 | 4.3 | 1.0 | |
| 5 | 48.5 | 119.3 | 6.83 | 21 | 4 | | 4.4 | 4.3 | 1.0 | |
| 18 | 50.3 | 122.5 | 6.21 | 20 | 4 | | 4.2 | 4.3 | 1.0 | |
| 30 | 50.3 | 122.5 | 6.34 | 20 | 4 | | 4.2 | 4.3 | 1.0 | |
| 40 | 49.3 | 120.7 | 6.34 | 20 | 4 | | 4.2 | 4.3 | 1.0 | |
| 50 | 49.3 | 120.7 | 6.36 | 20 | 4 | | 4.2 | 4.3 | 1.0 | |
| 60 | 48.3 | 118.9 | 6.36 | 20 | 4 | | 4.2 | 4.3 | 1.0 | |
| 70 | 49.0 | 120.2 | 6.13 | 20 | 4 | Water/soda ash/sodium aluminate mixture feed complete (388/70 = 5.54 ml/min.). Added 492.7 g alum to this point | 4.2 | 4.3 | 1.0 | |
| 71 | 49.3 | 120.7 | 6.18 | 80 | 0 | | 16.1 | 0.0 | 0.0 | |
| 110 | 51.3 | 124.3 | 3.34 | 0 | 0 | Alum feed complete ([1145.5 − 492.7]/1.325/[110 − 70] = 12.31 ml/min.). | 0.0 | 0.0 | 0.0 | |
| 120 | 53.3 | 127.9 | 3.32 | 0 | 0 | Let solution mix overnight. | 0.0 | 0.0 | 0.0 | 1.0 |
| — | — | — | — | — | — | (May 17, 2016) 8:45 am. Solution clear. Turned off heat and let cool. | | | | |
| Average | 49.5 | 121.1 | 6.34 | | | | | | | |

TABLE 4

| | | | | | | | | | | | | | | | |
|---|---|---|---|---|---|---|---|---|---|---|---|---|---|---|---|
| | | | | | | | | | | | Headspace | | | | |
| | | | | | Precipitated Aluminum Hydroxide (PAH) | | Conversion Gallons | | | | Target | Initial | Actual | | |
| | Working Examples MS-100 | | | | MS-100 | | 61.6989 | 14774.7 | | | 11.4 | 5.2 | 16.0 | 10.7 | |
| | Digest Temp. (° C.) | | | | Formulation | | Target | | | | Actual | | | | |
| Target | Overnight (° C.) | % $M_2O_3$ | % Basicity | Sp. Gr. | grams | % | Pounds | Gallons | % | Min. Gallons | Pounds | Gallons | % | | |
| 233.00 | Start Up Water | 0 | | 1.000 | 233.0 | 9.73 | 14,375 | 1,724 | 9.73 | 2,100 | 23,005 | 2759 | 15.56 | | |
| 0.00 | Ferric sulfate | 17.75 | 10.5 | 1.581 | 0.00 | 0.00 | 0 | 0 | 0.00 | 1,869 | 2,955 | 354 | 2.00 | | |
| 434.50 | Water (SA) | 0 | | 1.000 | 409.0 | 17.07 | 25,235 | 3,027 | 17.07 | 6,054 | 18,330 | 2294 | 12.40 | | |
| 149.50 | Soda Ash | 0 | | NA | 140.7 | 5.87 | 8,680 | NA | 5.87 | | 5,685 | NA | 3.85 | | |
| 425.00 | 43% SAX | 23.38 | 140.1 | 1.520 | 401.0 | 16.74 | 24,740 | 1,952 | 16.74 | 4,979 | 10,550 | 833 | 7.14 | % $Na_2O$ SAX | 19.57 |
| 717.50 | Alum | 8.35 | 2.09 | 1.325 | 1282.2 | 53.52 | 79,110 | 7,162 | 53.52 | | 26,050 | 2358 | 17.62 | | |
| 0.00 | UP 290 | 16.88 | 41.8 | 1.370 | 0.00 | 0.00 | 0 | 0 | 0.00 | | 63,035 | 5519 | 42.65 | % Cl UP 290 | 20.98 |
| 0.00 | $H_3PO_4$ (75%) | 0 | | 1.570 | 0.00 | 0.00 | 0 | 0 | 0.00 | | 0 | 0 | 0.00 | | |
| | Flush Water | | | 1.000 | 0.00 | 0.00 | 0 | 0 | 0.00 | | 0 | 0 | 0.00 | | |
| 1900.70 | UltraPAC 2230 | 8.38 | 8.4 | 1.200 | 2465.90 | 102.93 | 152,145 | 15,208 | 102.93 | | 149,610 | 13,749 | 101.22 | | |
| | Check | | | | 2395.70 | 100.00% | 152,140 | | | 0 | 147,806 | 14,185 | 100.00% | | |
| | % SA soin | 25.6% | | 1.256 | 1,996.4 | 97.15% | 147,809 | −4,331 | | 147,806 | −1,804 | 436 | 98.79% | | |

| | Evaporation | | | % $Al_2O_3$ | % Basicity | % $SO_4$ | % Cl | Cl/$SO_4$ ratio | Cl + $SO_4$ | Na | Cl + $SO_4$ + Na |
|---|---|---|---|---|---|---|---|---|---|---|---|
| Expected | 58.80 | 2.44% | Evap. & $CO_2$ | 8.38% | 89.0 | 12.63 | 0.00 | 0.00 | 12.63 | 4.87 | 17.50 |
| Actual | 70.20 | 2.93% | Just $CO_2$ | 8.29% | | 12.50 | 0.00 | | 12.50 | 4.87 | 17.36 |

1. Add required amount of start up water to the reactor and start agitation. 1
2. Add the required amount of water into the soda ash mix vessel and start agitator. 1804 1.22%
3. Add required amount of sodium carbonate (soda ash) to the soda ash mix vessel and agitate until dissolved.
4. Add the required amount of 43% sodium aluminate solution Into the soda ash mix vessel.
5. Add the required amount of aluminum sulfate solution to the alum holding vessel.
6. Start addition of the aluminum sulfate solution to the reactor to lower pH to less than 4.
7. Start addition of the sodium carbonate/sodium aluminate mixture to the reactor.
8. Adjust feed rates to add the solutions over desired time period maintaining the pH between 5.5 and 7.

| Analysis: | Calculated | Actual | |
|---|---|---|---|
| Specific Gravity | | | |
| % $M_2O_3$ | 8.38 | | |
| % $Al_2O_3$ | 8.38 | 8.58 | 0.2 |
| % $Fe_2O_3$ | 0.00 | | |
| % Basicity | 89.0 | 97.2 | 8.2 157.7 |
| % Sulfates | 12.63 | | |
| Turbidity, NTU | | | |
| Viscosity, cps | | | |

TABLE 4-continued

| Precipitation observations and data | | | | | | | | | | |
|---|---|---|---|---|---|---|---|---|---|---|
| Time (min) | Bulk slurry Temp. (° C.) | Bulk slurry Temp. (° F.) | Bulk slurry pH | Alum/ UP290 pump setting | $H_2O$/ SA/SAX pump setting | Comments | Alum pump rate (ml/min.) | $H_2O$/ SA/SAX pump rate (ml/min.) | Pump Ratio | |
| 0 | 68.8 | 155.8 | 3.23 | 49 | 8 | Started both feeds @ 10:15 am. | 9.9 | 8.6 | 1.2 | |
| 1 | 66.9 | 152.4 | 5.00 | 49 | 8 | | 9.9 | 8.6 | 1.2 | |
| 2 | 64.7 | 148.5 | 5.35 | 49 | 8 | | 9.9 | 8.6 | 1.2 | |
| 3 | 62.9 | 145.2 | 5.52 | 49 | 8 | | 9.9 | 8.6 | 1.2 | |
| 4 | 61.2 | 142.2 | 5.64 | 50 | 8 | | 10.1 | 8.6 | 1.2 | |
| 5 | 59.7 | 139.5 | 5.62 | 50 | 8 | | 10.1 | 8.6 | 1.2 | |
| 10 | 55.8 | 132.4 | 5.64 | 50 | 8 | | 10.1 | 8.6 | 1.2 | |
| 15 | 59.3 | 138.7 | 5.50 | 50 | 8 | | 10.1 | 8.6 | 1.2 | |
| 20 | 58.1 | 136.6 | 5.62 | 100 | 16 | | 20.0 | 17.1 | 1.2 | |
| 25 | 56.0 | 132.8 | 5.74 | 100 | 16 | Restarted timer. | 20.0 | 17.1 | 1.2 | |
| 35 | 57.7 | 135.9 | 5.90 | 0 | 0 | Initial alum feed complete. | 0.0 | 0.0 | 0.0 | |
| 38 | 59.6 | 139.3 | 5.91 | 105 | 16 | Began adding additional alum. | 21.0 | 17.1 | 1.2 | |
| 55 | 58.8 | 137.8 | 5.73 | 60 | 16 | | 12.1 | 17.1 | 0.7 | |
| 577 | 59.6 | 139.3 | 6.08 | 0 | 16 | Stopped additional alum feed | 0.0 | 17.1 | 0.0 | |
| 59 | 60.8 | 141.4 | 6.50 | 0 | 0 | Stopped water/soda ash/sodium aluminate mixture feed. | 0.0 | 0.0 | 0.0 | |
| 65 | 62.5 | 144.5 | 6.32 | 0 | 0 | Turned off slurry heat. | 0.0 | 0.0 | 0.0 | 1.2 |
| 225 | 35.5 | 95.9 | 6.61 | 0 | 0 | | 0.0 | 0.0 | 0.0 | |
| Average | 58.5 | 137.4 | 5.75 | | | | | | | |

TABLE 5

| | | | | | | | | | | | | | | | |
|---|---|---|---|---|---|---|---|---|---|---|---|---|---|---|---|
| | | | | | | | | | | | Headspace | | | | |
| | | | | Precipitated Aluminum Hydroxide (PAH) | | | Conversion Gallons | | | | Target | Initial | Actual | | |
| | Working Examples MS-110 | | | MS-110 | | | 60.8555 | 14774.7 | | | 11.4 | 3.7 | 16.0 | 10.7 | |
| | Digest Temp. (° C.) | | | | Formulation | | Target | | | | Actual | | | | |
| Target | Overnight (° C.) | % $M_2O_3$ | % Basicity | Sp. Gr. | grams | % | Pounds | Gallons | % | Min. Gallons | Pounds | Gallons | % | | |
| 233.00 | Start Up Water | 0 | | 1.000 | 233.0 | 9.59 | 14,180 | 1,701 | 9.59 | 2,100 | 23,005 | 2759 | 15.56 | | |
| 0.00 | Ferric sulfate | 17.75 | 10.5 | 1.581 | 0.00 | 0.00 | 0 | 0 | 0.00 | 1,869 | 2,955 | 3.54 | 2.00 | | |
| 456.20 | Water (SA) | 0 | | 1.000 | 442.4 | 18.21 | 26,920 | 3,229 | 18.21 | 6,458 | 18,330 | 2294 | 12.40 | | |
| 157.00 | Soda Ash | 0 | | NA | 152.2 | 6.27 | 9,260 | NA | 6.26 | | 5,685 | NA | 3.85 | | 19.57 |
| 421.00 | 43% SAX | 23.38 | 140.1 | 1.520 | 408.3 | 16.81 | 24,845 | 1,961 | 16.81 | 5,190 | 10,550 | 833 | 7.14 | % $Na_2O$ SAX | |
| 1282.20 | Alum | 8.35 | 2.09 | 1.325 | 1281.8 | 52.77 | 78,005 | 7,061 | 52.78 | | 26,050 | 2358 | 17.62 | | |
| 0.00 | UP 290 | 16.88 | 41.8 | 1.370 | 0.00 | 0.00 | 0 | 0 | 0.00 | | 63,035 | 5519 | 42.65 | % Cl UP 290 | 20.99 |
| 0.00 | $H_3PO_4$ (75%) | 0 | | 1.570 | 0.00 | 0.00 | 0 | 0 | 0.00 | | 0 | 0 | 0.00 | | |
| | Flush Water | | | 1.000 | 0.00 | 0.00 | 0 | 0 | 0.00 | | 0 | 0 | 0.00 | | |
| 2472.90 | UltraPAC 2230 | 8.34 | 8.3 | 1.200 | 2517.70 | 103.65 | 153,215 | 15,315 | 103.66 | | 149,610 | 13,749 | 101.22 | | |
| | Check | | | | 2428.90 | 99.99% | 153,210 | | | 0 | 147,806 | 14,185 | 100.00% | | |
| | % SA soln | 25.6% | | 1.256 | 2,024.1 | 96.47% | 147,806 | −5,404 | | 147,806 | −1,804 | 436 | 98.79% | | |

| | Evaporation | | | % $Al_2O_3$ | % Basicity | % $SO_4$ | % Cl | $Cl/SO_4$ ratio | Cl + $SO_4$ | Na | Cl + $SO_4$ + Na |
|---|---|---|---|---|---|---|---|---|---|---|---|
| Expected | 76.50 | 3.13% | Evap. & $CO_2$ | 8.34% | 91.3 | 12.45 | 0.00 | 0.00 | 12.45 | 5.04 | 17.50 |
| Actual | 88.80 | 3.66% | Just $CO_2$ | 8.20% | | 12.25 | 0.00 | | 12.25 | 5.04 | 17.29 |

1. Add required amount of start up water to the reactor and start agitation. 1
2. Add the required amount of water into the soda ash mix vessel and start agitator. 1804 1.22%
3. Add required amount of sodium carbonate (soda ash) to the soda ash mix vessel and agitate until dissolved.
4. Add the required amount of 43% sodium aluminate solution into the soda ash mix vessel.
5. Add the required amount of aluminum sulfate solution to the alum holding vessel.
6. Start addition of the aluminum sulfate solution to the reactor to lower pH to less than 4.
7. Start addition of the sodium carbonate/sodium aluminate mixture to the reactor.
8. Adjust feed rates to add the solutions over desired time period maintaining the pH between 5.5 and 7.

| Analysis: | Calculated | Actual | |
|---|---|---|---|
| Specific Gravity | | | |
| % $M_2O_3$ | 8.34 | | |
| % $Al_2O_3$ | 8.34 | 8.23 | −0.1 |
| % $Fe_2O_3$ | 0.00 | | |
| % Basicity | 91.3 | 95.4 | 4.1 148.9 |
| % Sulfates | 12.45 | | |
| Turbidity, NTU | | | |
| Viscosity, cps | | | |

TABLE 5-continued

| Precipitation observations and data | | | | | | | | | | |
|---|---|---|---|---|---|---|---|---|---|---|
| Time (min) | Bulk slurry Temp. (° C.) | Bulk slurry Temp. (° F.) | Bulk slurry pH | Alum/ UP290 pump setting | $H_2O$/ SA/SAX pump setting | Comments | Alum pump rate (ml/min.) | $H_2O$/ SA/SAX pump rate (ml/min.) | Pump Ratio | |
| 0 | 48.0 | 118.4 | 3.07 | 50 | 8 | Started both feeds @ 1:45 pm. | 10.1 | 8.6 | 1.2 | |
| 1 | 46.5 | 115.7 | 5.00 | 50 | 8 | | 10.1 | 8.6 | 1.2 | |
| 2 | 45.4 | 113.7 | 5.26 | 50 | 8 | | 10.1 | 8.6 | 1.2 | |
| 3 | 44.7 | 112.5 | 5.22 | 50 | 8 | | 10.1 | 8.6 | 1.2 | |
| 4 | 44.2 | 111.6 | 5.39 | 50 | 8 | | 10.1 | 8.6 | 1.2 | |
| 6 | 44.2 | 111.6 | 5.44 | 50 | 8 | | 10.1 | 8.6 | 1.2 | |
| 10 | 45.1 | 113.2 | 5.55 | 75 | 12 | | 15.1 | 12.8 | 1.2 | |
| 15 | 46.1 | 115.0 | 5.60 | 75 | 12 | | 15.1 | 12.8 | 1.2 | |
| 20 | 46.5 | 115.7 | 5.27 | 100 | 16 | Some plugging in the water/soda ash/sodium aluminate mixture feed line. | 20.0 | 17.1 | 1.2 | |
| 30 | 47.9 | 118.2 | 5.52 | 100 | 16 | | 20.0 | 17.1 | 1.2 | |
| 45 | 47.0 | 116.6 | 5.33 | 100 | 16 | | 20.0 | 17.1 | 1.2 | 1.2 |
| 60 | 49.8 | 121.6 | 5.83 | 0 | 16 | Alum feed complete. | 0.0 | 17.1 | 0.0 | |
| 66 | 51.6 | 124.9 | 6.97 | 0 | 0 | Stopped water/soda ash/sodium aluminate mixture feed. | 0.0 | 0.0 | 0.0 | |
| 75 | 51.4 | 124.5 | 6.89 | 0 | 0 | Turned off slurry heat. | 0.0 | 0.0 | 0.0 | |
| Average | 47.3 | 117.1 | 5.51 | | | | | | | |

TABLE 6

| | | | | | | | | | | | | | | | |
|---|---|---|---|---|---|---|---|---|---|---|---|---|---|---|---|
| | | | | | | | | | | | Headspace | | | | |
| | | | | 100% Basic PAH | | | Conversion Gallons | | | | Target | Initial | Actual | | |
| | Working Examples MS-170 | | | MS-170 | | | 56.9845 | 14774.7 | | | 11.4 | 3.2 | 16.0 | 10.7 | |
| | Digest Temp. (° C.) | | | | Formulation | | Target | | | | Actual | | | | |
| Target | Overnight (° C.) | % $M_2O_3$ | % Basicity | Sp. Gr. | grams | % | Pounds | Gallons | % | Min. Gallons | Pounds | Gallons | % | | |
| 249.3 | Start Up Water | 0 | | 1.000 | 249.3 | 9.61 | 14,205 | 1,704 | 9.61 | 2,100 | 23,005 | 2759 | 15.56 | | |
| 0.00 | Ferric sulfate | 17.75 | 10.5 | 1.581 | 0.00 | 0.00 | 0 | 0 | 0.00 | 1,869 | 2,955 | 354 | 2.00 | | |
| 473.2 | Water (SA) | | | 1.000 | 473.2 | 18.24 | 26,965 | 3,234 | 18.24 | 6,469 | 18,330 | 2294 | 12.40 | | |
| 162.9 | Soda Ash | 0 | | NA | 162.9 | 6.28 | 9,285 | NA | 6.28 | | 5,685 | NA | 3.85 | | |
| 436.9 | 43% SAX | 23.38 | 140.1 | 1.520 | 436.9 | 16.84 | 24,895 | 1,965 | 16.84 | 5,199 | 10,550 | 833 | 7.14 | % $Na_2O$ SAX | 19.57 |
| 1372.4 | Atum | 8.35 | 2.09 | 1.325 | 1372.4 | 52.91 | 78,205 | 7,080 | 52.91 | | 26,050 | 2358 | 17.62 | | |
| 0.00 | UP 290 | 16.88 | 41.8 | 1.370 | 0.00 | 0.00 | 0 | 0 | 0.00 | | 63,035 | 5519 | 42.65 | % Cl UP 290 | 20.99 |
| 0.00 | $H_3PO_4$ (75%) | 0 | | 1.570 | 0.00 | 0.00 | 0 | 0 | 0.00 | | 0 | 0 | 0.00 | | |
| | Flush Water | | | 1.000 | 0.00 | 0.00 | 0 | 0 | 0.00 | | 0 | 0 | 0.00 | | |
| 2599.8 | UltraPAC 2230 | 8.36 | 8.4 | 1.200 | 2694.7 | 103.88 | 153,555 | 15,349 | 103.89 | | 149,610 | 13,749 | 101.22 | | |
| | Check | | | | 2593.9 | 99.99% | 153,555 | | | 0 | 147,806 | 14,184 | 100.00% | | |
| | % SA soin | 25.6% | | 1.256 | 2,161.6 | 96.26% | 147,811 | −5,744 | | 147,806 | −1,804 | 436 | 98.79% | | |

| Evaporation | | | | % $Al_2O_3$ | % Basicity | % $SO_4$ | % Cl | $Cl/SO_4$ ratio | Cl + $SO_4$ | Na | Cl + $SO_4$ + Na |
|---|---|---|---|---|---|---|---|---|---|---|---|
| Expected | 94.9 | 3.65% | Evap. & $CO_2$ | 8.36% | 91.2 | 12.49 | 0.00 | 0.00 | 12.49 | 5.06 | 17.54 |
| Actual | 100.8 | 3.89% | Just $CO_2$ | 8.20% | | 12.25 | 0.00 | | 12.25 | 5.06 | 17.31 |

1. Add required amount of start up water to the reactor and start agitation. 1
2. Add the required amount of water into the soda ash mix vessel and start agitator. 1804 1.22%
3. Add required amount of sodium carbonate (soda ash) to the soda ash mix vessel and agitate until dissolved.
4. Add the required amount of 43% sodium aluminate solution into the soda ash mix vessel.
5. Add the required amount of aluminum sulfate solution to the alum holding vessel.
6. Start addition of the aluminum sulfate solution to the reactor to lower pH to less than 4.
7. Start addition of the sodium carbonate/sodium aluminate mixture to the reactor.
8. Adjust feed rates to add the solutions over desired time period maintaining the pH between 6 and 7.

| Analysis: | Calculated | Actual | |
|---|---|---|---|
| Specific Gravity | | | |
| % $M_2O_3$ | | | |
| % $Al_2O_3$ | 8.36 | 8.45 | |
| % $Fe_2O_3$ | 0.00 | | |
| % Basicity | 91.2 | 99.6 | 8.4 157.9 |
| % Sulfates | 12.49 | | |
| Turbidity, NTU | | | |
| Viscosity, cps | | | |

TABLE 6-continued

| Precipitation observations and data | | | | | | | | | | |
|---|---|---|---|---|---|---|---|---|---|---|
| Time (min) | Bulk slurry Temp. (° C.) | Bulk slurry Temp. (° F.) | Bulk slurry pH | Alum/ UP290 pump setting | $H_2O$/ SA/SAX pump setting | Comments | Alum pump rate (ml/min.) | $H_2O$/ SA/SAX pump rate (ml/min.) | Pump Ratio | |
| 0 | 50.7 | 123.3 | 3.48 | 50 | 8 | Started both feeds @ 1:35 pm. | 10.1 | 8.6 | 1.2 | |
| 1 | 49.6 | 121.3 | 5.70 | 50 | 8 | Bulk slurry set point @ 50° C. | 10.1 | 8.6 | 1.2 | |
| 2 | 49.3 | 120.7 | 5.94 | 52 | 8 | | 10.5 | 8.6 | 1.2 | |
| 3 | 49.1 | 120.4 | 6.03 | 54 | 8 | | 10.9 | 8.6 | 1.3 | |
| 4 | 49.0 | 120.2 | 5.96 | 54 | 8 | | 10.9 | 8.6 | 1.3 | |
| 5 | 48.9 | 120.0 | 5.94 | 54 | 8 | | 10.9 | 8.6 | 1.3 | |
| 6 | 49.0 | 120.2 | 5.96 | 54 | 8 | | 10.9 | 8.6 | 1.3 | |
| 7 | 49.0 | 120.2 | 5.93 | 54 | 8 | | 10.9 | 8.8 | 1.3 | |
| 8 | 49.1 | 120,4 | 5.94 | 55 | 8 | | 11.1 | 8.6 | 1.3 | |
| 9 | 49.2 | 120.6 | 5.91 | 55 | 8 | | 11.1 | 8.6 | 1.3 | |
| 10 | 49.4 | 120.9 | 5.90 | 55 | 8 | | 11.1 | 8.8 | 1.3 | |
| 20 | 50.6 | 123.1 | 5.88 | 55 | 8 | | 11.1 | 8.6 | 1.3 | |
| 30 | 51.2 | 124.2 | 5.89 | 55 | 8 | | 11.1 | 8.6 | 1.3 | |
| 40 | 51.1 | 124.0 | 5.89 | 55 | 8 | | 11.1 | 8.6 | 1.3 | |
| 50 | 50.6 | 123.1 | 5.86 | 55 | 8 | | 11.1 | 8.6 | 1.3 | |
| 75 | 50.1 | 122.2 | 5.8 | 55 | 8 | | 11.1 | 8.6 | 1.3 | 1.3 |
| 90 | 50.3 | 122.5 | 5.83 | 0 | 8 | Alum feed complete | 0.0 | 8.6 | 0.0 | |
| 98 | 50.0 | 122.0 | 7.1 | 0 | 0 | Water/soda ash/sodium aluminate mixture feed complete. Lowered bulk slurry set point to 40° C. | 0.0 | 0.0 | 0.0 | |
| 110 | 49.4 | 120.9 | 7.0 | 0 | 0 | | 0.0 | 0.0 | 0.0 | |
| 135 | 45.5 | 113.9 | 6.98 | 0 | 0 | Let slurry cool to 40° C. Once cooled turned of hotplat and let mix overnight. | 0.0 | 0.0 | 0.0 | |
| | | | 7.33 | | | (Nov. 3, 2017) 8:30 am. Solution @ 24° C.ool. | | | | |
| Average | 49.9 | 121.7 | 5.90 | | | | | | | |

TABLE 7

| | | | | | | | | | | | | | | | |
|---|---|---|---|---|---|---|---|---|---|---|---|---|---|---|---|
| | | | | | | | | | | | Headspace | | | | |
| | | | | 50% Basic PAS + 2% Phos. Acid (75%) soln | | | Conversion Gallons | | | | Target | Initial | Actual | | |
| | Working Examples MU-46 | | | MU-046 | | | 230.9346 | 14774.7 | | | 11.4 | 8.7 | 16.0 | 8.4 | |
| | Digest Temp. (° C.) | | | | formulation | | Target | | | | Actual | | | | |
| Target | Overnight (° C.) | % $M_2O_3$ | % Basicity | Sp. Gr. | grans | % | Pounds | Gallons | % | Min. Gallons | Pounds | Gallons | % | | |
| 60.00 | Start to Water | 0 | | 1.000 | 60.00 | 9.37 | 13,855 | 3,662 | 9.37 | 2,100 | 23,005 | 2759 | 15.56 | | |
| 0.00 | Ferric sulfate | 17.75 | 10.5 | 1.581 | 0.00 | 0.00 | 0 | 0 | 0.00 | 1,869 | 2,955 | 354 | 2.00 | | |
| 44.45 | Water (SA) | 0 | | 1.000 | 44.36 | 6.93 | 10,245 | 1,229 | 6.93 | 2,458 | 18,330 | 2484 | 12.40 | | |
| 9.00 | Soda Ash | 0 | | NA | 9.07 | 1.42 | 2,095 | NA | 1.42 | | 5,685 | NA | 3.85 | | |
| 73.70 | 43% SAX | 22.71 | 140.1 | 1.520 | 74.19 | 11.59 | 17,135 | 1,352 | 11.59 | 2,581 | 10,550 | 833 | 7.14 | % $Na_2O$ SAX | 18.74 |
| 447.30 | Alum | 8.42 | 5.2 | 1.325 | 447.69 | 69.95 | 103,385 | 9,359 | 69.94 | | 26,050 | 2358 | 17.62 | | |
| 0.00 | UP 290 | 17.29 | 41.8 | 1.370 | 0.00 | 0.00 | 0 | 0 | 0.00 | | 63,035 | 5519 | 42.65 | % Cl UP 290 | 20.99 |
| 12.80 | $H_3PO_4$ (75%) | 0 | | 1.570 | 12.97 | 2.03 | 2,995 | 229 | 2.03 | | 0 | 0 | 0.00 | | |
| | Flush Water | | | 1.000 | 0.00 | 0.00 | 0 | 0 | 0.00 | | 0 | 0 | 0.00 | | |
| 640.00 | UltraPAC 2230 | 8.52 | 8.5 | 1.200 | 648.28 | 101.29 | 149,710 | 14,964 | 99.28 | | 149,610 | 13,749 | 101.22 | | |
| | Check | | | | 640.06 | 100.01% | 149,710 | | | 147,988 | 147,806 | 14,374 | 100.00% | | |
| | % SA soln | 17.0% | | 1.160 | 533.4 | 98.73% | 147,812 | −1,898 | | −162 | −1,804 | 625 | 98.79% | | |

| | Evaporation | | | % $Al_2O_3$ | % Basicity | % $SO_4$ | % Cl | $Cl/SO_4$ ratio | Cl + $SO_4$ | Na | Cl + $SO_4$ + Na |
|---|---|---|---|---|---|---|---|---|---|---|---|
| Expected | 7.25 | 1.13% | Evap. & $CO_2$ | 8.52% | 49.1 | 16.65 | 0.00 | 0.00 | 16.65 | 2.18 | 18.83 |
| Actual | 8.22 | 1.28% | Just $CO_2$ | 8.45% | | 16.51 | 0.00 | | 16.51 | 2.18 | 18.69 |

1. Add required amount of start up water to the reactor and start agitation. 1
2. Add the required amount of water into the soda ash mix vessel and start agitator. 1804 1.22%
3. Add required amount of sodium carbonate (soda ash) to the soda ash mix vessel and agitate until dissolved.
4. Add the required amount of 43% sodium aluminate solution into the soda ash mix vessel. 34.75
5. Add the required amount of aluminum sulfate solution to the alum holding vessel. 7.11
6. Start addition of the aluminum solution to the reactor to lower pH to less than 4. 58.136
7. Start addition of the sodium carbonate/sodium aluminate mixture to the reactor.
8. Adjust feed rates to add the solutions over desired time period maintaining the pH between 5.5 and 7.
9. When all of the sodium carbonate/sodium aluminate solution has been added let the pH fall below 5.
10. When the pH falls below 5 increase the aluminum sulfate feed rate.
11. When all of the aluminim sulfate solution has been added start the phosphonic acid (75%) solution addition.
12. When phosphoric acid (75%) solution addition is completet let solution mix until all solids have dissolved.

TABLE 7-continued

| Analysis: | Calculated | Actual | |
|---|---|---|---|
| Specific Gravity | | 1.291 | |
| % $M_2O_3$ | 8.52 | 8.47 | |
| % $Al_2O_3$ | 8.52 | 8.47 | |
| % $Fe_2O_3$ | 0.00 | 0.00 | |
| % Basicity | 49.1 | 49.7 | 0.6 142.0 |
| % Sulfates | 16.65 | 16.46 | |
| Turbidity, NTU | | 3.8 | |
| Viscosity, cps | | 15.6 | |

Precipitation observations and data

| Time (min) | Bulk slurry Temp. (° C.) | Bulk slurry Temp. (° F.) | Bulk slurry pH | Alum/ UP290 pump setting | $H_2O$/ SA/SAX pump setting | Comments | Alum pump rate (ml/min.) | $H_2O$/ SA/SAX pump rate (ml/min.) | Pump Ratio | |
|---|---|---|---|---|---|---|---|---|---|---|
| 0 | 22.0 | 71.6 | 4.04 | 1.6 | 6 | Agitator @ 400 rpm. Started both feeds @ 2:55 pm. | 5.8 | 1.4 | 4.1 | |
| 1 | 22.4 | 72.3 | 5.71 | 1.6 | 6 | | 5.8 | 1.4 | 4.1 | |
| 2 | 22.9 | 73.2 | 5.72 | 1.6 | 6 | | 5.8 | 1.4 | 4.1 | |
| 3 | 24.9 | 76.8 | 5.73 | 1.6 | 6 | | 5.8 | 1.4 | 4.3 | |
| 4 | 27.6 | 81.7 | 5.58 | 1.5 | 6 | | 5.4 | 1.4 | 3.9 | |
| 5 | 31.3 | 88.3 | 5.78 | 1.5 | 6 | | 5.4 | 1.3 | 3.9 | |
| 6 | 35.1 | 95.2 | 5.91 | 1.5 | 6 | Hart accidently turned on hotplate for the reactor set at 40° C. Turned it off. | 5.4 | 1.4 | 3.9 | |
| 7 | 39.7 | 103.5 | 5.95 | 1.5 | 6 | | 5.4 | 1.4 | 3.9 | |
| 8 | 12.2 | 108.6 | 5.94 | 1.4 | 6 | | 5.0 | 1.4 | 3.6 | |
| 9 | 43.5 | 110.3 | 6.02 | 1.4 | 6 | | 5.0 | 1.6 | 3.6 | |
| 10 | 44.5 | 112.1 | 6.07 | 1.4 | 6 | | 5.0 | 1.4 | 3.6 | |
| 11 | 45.0 | 113.0 | 6.10 | 1.4 | 6 | | 5.0 | 1.4 | 3.6 | |
| 12 | 45.1 | 113.2 | 6.20 | 1.4 | 6 | | 5.0 | 1.4 | 3.6 | |
| 13 | 45.1 | 113.2 | 6.28 | 1.4 | 6 | | 5.0 | 1.4 | 3.6 | |
| 14 | 44.9 | 112.8 | 6.33 | 1.4 | 6 | | 5.0 | 1.4 | 3.6 | |
| 15 | 44.7 | 112.5 | 6.39 | 1.4 | 6 | | 5.0 | 1.4 | 3.6 | |
| 20 | 42.9 | 109.2 | 6.43 | 2.8 | 12 | | 16.0 | 2.6 | 3.9 | |
| 25 | 41.8 | 107.2 | 7.34 | 3.0 | 11 | | 10.7 | 2.4 | 4.5 | |
| 30 | 41.0 | 105.8 | 7.56 | 3.0 | 10 | | 10.7 | 2.2 | 4.9 | |
| 35 | 39.8 | 103.6 | 7.42 | 3.0 | 9 | | 10.7 | 2.0 | 5.4 | |
| 40 | 38.7 | 101.7 | 7.06 | 3.0 | 9 | | 10.7 | 2.0 | 5.4 | |
| 45 | 37.7 | 99.9 | 6.88 | 3.0 | 9 | | 10.7 | 2.0 | 5.4 | |
| 50 | 36.7 | 98.1 | 6.72 | 3.0 | 9 | | 10.7 | 2.0 | 5.4 | 4.2 |
| 54 | 36.2 | 97.2 | 6.61 | 3.0 | 0 | Water/soda ash/sodium aluminate mixture feed complete. | 10.7 | 0.0 | 0.0 | |
| 70 | 30.5 | 86.9 | 4.16 | 8.0 | 0 | | 21.3 | 0.0 | 0.0 | |
| 135 | 24.3 | 75.7 | 3.50 | 0.0 | 0 | Alum feed complete. | 0.0 | 0.0 | 0.0 | |
| 137 | 24.2 | 75.6 | 3.50 | 3.0 | 0 | Started phosphoric acid feed. | 10.7 | 0.0 | 0.0 | |
| 141 | 27.2 | 81.0 | 3.27 | 0.0 | 0 | Phosphoric acid feed complete | 0.0 | 0.0 | 0.0 | |
| 145 | 27.0 | 80.6 | 3.33 | 0.0 | 0 | Let slurry mix overnight. | | | | |
| 1085 | — | — | — | — | — | (Sep. 4, 2019) 9:00 am. (18 hours 5 minutes) Solution still very cloudy. Let solution mix. | | | | |
| 1505 | — | — | — | — | — | (Sep. 4, 2019) 5:00 pm. (25 hours 5 minutes) Solution still cloudy. Let solution mix overnight. | | | | |
| 2529 | — | — | — | — | — | (Sep. 5, 2019) 9:00 am. (42 hours 5 minutes) Solution still cloudy. Set hotplate to 40° C. Let solution mix | | | | |
| 3965 | — | — | — | — | — | (Sep. 6, 2019) 9:00 am. (66 hours 5 minutes) Solution clear, Turned off agitator. Turbidity 3.8 NTU | | | | |
| Average | 37.9 | 100.2 | 6.47 | | | | | | | |

TABLE 8

| | | | | | | | | | | | | | | | |
|---|---|---|---|---|---|---|---|---|---|---|---|---|---|---|---|
| | | | | | | | | | | | Headspace | | | | |
| | | | | | 50% Basic PAS + 2% Phos. Acid (75%) soln | | Conversion Gallons | | | | Target | Initial | Actual | | |
| | Working Examples MU-064 | | | | MU-064 | | 236.9466 | 14774.7 | | | 11.4 | 3.4 | 16.0 | 10.1 | |
| | Digest Temp. (° C.) | | | | Formulation | | Target | | | | Actual | | | | |
| Target | Overnight (° C.) | % $M_2O_3$ | % Basicity | Sp. Gr. | grams | % | Pounds | Gallons | % | Min. Gallons | Pounds | Gallons | % | | |
| 60.00 | Start Up Water | 0 | | 1.000 | 60.00 | 9.62 | 14,215 | 1,705 | 9.62 | 2,100 | 23,005 | 2759 | 15.56 | | |
| 0.00 | Ferric sulfate | 17.75 | 10.5 | 1.581 | 0.00 | 0.00 | 0 | 0 | 0.00 | 1,869 | 2,955 | 354 | 2.00 | | |
| 38.00 | Water (SA) | 0 | | 1.000 | 38.02 | 6.09 | 9,010 | 1,081 | 6.10 | 2,161 | 18,330 | 2348 | 12.40 | | |
| 11.35 | Soda Ash | 0 | | NA | 11.36 | 1.82 | 2,690 | NA | 1.82 | | 5,685 | NA | 3.85 | | |
| 72.90 | 43% SAX | 22.71 | 140.1 | 1.520 | 72.87 | 11.68 | 17,265 | 1,362 | 11.68 | 2,443 | 10,550 | 833 | 7.14 | % $Na_2O$ SAX | 18.74 |
| 452.20 | Alum | 8.08 | 2.3 | 1.325 | 452.51 | 72.54 | 107,220 | 9,706 | 72.54 | | 26,050 | 2358 | 17.62 | % $SO_4$ Alum | 24.16 |
| 0.00 | UP 290 | 17.29 | 41.8 | 1.370 | 0.00 | 0.00 | 0 | 0 | 0.00 | | 63,035 | 5519 | 42.65 | % Cl UP 290 | 20.99 |
| 12.80 | $H_3PO_4$ (75%) | 0 | | 1.570 | 12.78 | 2.05 | 3,030 | 231 | 2.05 | | 0 | 0 | 0.00 | | |
| | Flush Water | | | 1.000 | 0.00 | 0.00 | 0 | 0 | 0.00 | | 0 | 0 | 0.00 | | |
| 640.00 | UltraPAC 2230 | 8.51 | 8.9 | 1.200 | 647.54 | 103.80 | 153,430 | 15,336 | 101.75 | | 149,610 | 13,749 | 101.22 | | |
| | Check | | | | 623.82 | 100.00% | 153,430 | | | 148,507 | 147,806 | 14,239 | 100.00% | | |
| | % SA soln | 23.0% | | 1.227 | 519.9 | 96.34% | 147,810 | −5,620 | | −701 | −1,804 | 490 | 98.79% | | |

| Evaporation | | | | % $Al_2O_3$ | % Basicity | % $SO_4$ | % Cl | $Cl/SO_4$ ratio | Cl + $SO_4$ | Na | Cl + $SO_4$ + Na |
|---|---|---|---|---|---|---|---|---|---|---|---|
| Expected | 7.25 | 1.13% | Evap. & $CO_2$ | 8.51% | 49.0 | 16.57 | 0.00 | 0.00 | 16.57 | 2.37 | 18.93 |
| Actual | 23.72 | 3.80% | Just $CO_2$ | 8.25% | | 16.05 | 0.00 | | 16.05 | 2.37 | 18.41 |

1. Add required amount of start up water to the reactor and start agitation. 1
2. Add the required amount of water into the soda ash mix vessel and start agitator. 1804 1.22%
3. Add required amount of sodium carbonate (soda ash) to the soda ash mix vessel and agitate until dissolved.
4. Add the required amount of 43% sodium aluminate solution into the soda ash mix vessel. 31.10
5. Add the required amount of aluminum sulfate solution to the alum holding vessel. 9.29
6. Start addition of the aluminum solution to the reactor to lower pH to less than 4. 59.61
7. Start addition of the sodium carbonate/sodium aluminate mixture to the reactor.
8. Adjust feed rates to add the solutions over desired time period maintaining the pH between 5.5 and 7.
9. When all of the sodium carbonate/sodium aluminate solution has been added let the pH fail below 5.
10. When the pH falls below 5 increase the aluminum sulfate feed rate.
11. When all of the aluminim sulfate solution has been added start the phosphoric acid addition.
12. When phosphoric acid addition is completet let solution mix until all solids have dissolved.

TABLE 8-continued

| Analysis: | Calculated | Actual | |
|---|---|---|---|
| Specific Gravity | | 1.296 | |
| % $M_2O_3$ | 8.51 | | |
| % $Al_2O_3$ | 8.51 | 8.42 | |
| % $Fe_2O_3$ | 0.00 | 0.03 | |
| % Basicity | 49.0 | 49.1 | 0.1 140.5 143.6 |
| % Sulfates | 16.57 | 16.81 | |
| Turbidity, NTU | | 2.3 | |
| Viscosity, cps | | 11.8 | |

Precipitation observations and data

| Time (min) | Bulk slurry Temp. (° C.) | Bulk slurry Temp. (° F.) | Bulk slurry pH | Alum/ UP290 pump setting | $H_2O$/ SA/SAX pump setting | Comments | Alum pump rate (ml/min.) | $H_2O$/ SA/SAX pump rate (ml/min.) | Pump Ratio | |
|---|---|---|---|---|---|---|---|---|---|---|
| 0 | 23.1 | 73.6 | 3.77 | 1.4 | 6 | Agitator @ 400 rpm. Started both feeds @ 2:25 pm. | 5.0 | 1.4 | 3.6 | |
| 1 | 23.6 | 74.9 | 5.51 | 1.4 | 6 | | 5.0 | 1.4 | 3.6 | |
| 2 | 24.1 | 75.4 | 5.92 | 1.4 | 6 | | 5.0 | 1.4 | 3.6 | |
| 3 | 24.6 | 76.3 | 7.63 | 1.8 | 6 | | 6.5 | 1.4 | 4.6 | |
| 4 | 25.1 | 77.2 | 6.76 | 1.5 | 6 | | 5.4 | 1.4 | 3.9 | |
| 5 | 25.6 | 78.1 | 7.19 | 1.6 | 6 | | 5.8 | 1.4 | 4.1 | |
| 6 | 26.0 | 78.8 | 7.00 | 1.6 | 6 | | 5.8 | 1.4 | 4.1 | |
| 7 | 26.3 | 79.3 | 6.85 | 1.6 | 6 | | 5.8 | 1.4 | 4.1 | |
| 8 | 26.6 | 79.9 | 6.78 | 1.6 | 6 | | 5.8 | 1.4 | 4.1 | |
| 9 | 26.9 | 80.4 | 6.81 | 1.6 | 6 | | 5.8 | 1.4 | 4.1 | |
| 10 | 27.2 | 81.0 | 6.58 | 1.6 | 5 | | 5.8 | 1.4 | 4.1 | |
| 20 | 29.0 | 84.2 | 6.76 | 1.6 | 5 | | 5.8 | 1.4 | 4.1 | |
| 60 | 30.9 | 87.6 | 6.70 | 1.6 | 6 | | 5.8 | 1.4 | 4.1 | 4.1 |
| 71 | 31.2 | 88.2 | 6.71 | 1.6 | 0 | Water/soda ash/sodium aluminate mixture feed complete. | 5.8 | 0.0 | 0.0 | |
| 80 | 29.0 | 84.2 | 4.72 | 6.0 | 0 | | 21.3 | 0.0 | 0.0 | |
| 149 | 24.3 | 75.7 | 3.41 | 6.0 | 0 | Aluminum sulfate feed complete. Started phosphoric acid (75%) solution feed. | 21.3 | 0.0 | 0.0 | |
| 153 | 27.3 | 81.1 | 3.19 | 0.0 | 0 | Phosphoric acid (75%) solution feed complete | 0.0 | 0.0 | 0.0 | |
| 160 | 27.0 | 80.6 | 3.28 | 0.0 | 0 | Let slurry mix overnight. | 0.0 | 0.0 | 0.0 | |
| | | | | | | (Sep. 26, 2019) 9:00 am. (18 hours 35 minutes) Still very cloudy. Turned on hotplate to 40° C. and let mix . | | | | |
| | | | | | | (Sep. 26, 2019) 4:30 pm. (27 hours 5 minutes) Solution clear. Turned of hotplate and let cool overnight. | | | | |
| Average | 27.5 | 81.5 | 6.82 | | | | | | | |

TABLE 9

| | | | | | | | | | | | | | | | |
|---|---|---|---|---|---|---|---|---|---|---|---|---|---|---|---|
| | | | | | | | | | | | Headspace | | | | |
| | | | | 70% Basic PAS + 2% Phos. Acid (75%) soin | | | Conversion Gallons | | | | Target | Initial | Actual | | |
| | Working Examples MU-162 | | | MU-162 | | | 98.3931 | 14774.7 | | | 11.4 | 11.4 | 16.0 | 15.6 | |
| | Digest Temp. (° C.) | | | | Formulation | | Target | | | | Actual | | | | |
| Target | Overnight (° C.) | % $M_2O_3$ | % Basicity | Sp. Gr. | grams | % | Pounds | Gallons | % | Min. Gallons | Pounds | Gallons | % | | |
| 60.00 | Start Up Water | 0 | | 1.000 | 120.0 | 7.99 | 11,805 | 1,416 | 7.99 | 2,100 | 11,805 | 1416 | 7.99 | | |
| 0.00 | Ferric sulfate | 17.75 | 10.5 | 1.581 | 0.0 | 0.00 | 0 | 0 | 0.00 | 0 | 0 | 0 | 0.00 | | |
| 44.45 | Water (SA) | 0 | | 1.000 | 158.8 | 10.57 | 15,625 | 1,874 | 10.57 | 3,748 | 15,625 | 1946 | 10.57 | | |
| 9.00 | Sada Ash | 0 | | NA | 32.5 | 2.16 | 3,195 | NA | 2.1.6 | | 3,195 | NA | 2.3.6 | | |
| 73.70 | 43% SAX | 24.04 | 140.1 | 1.520 | 265.6 | 17.68 | 26,135 | 2,062 | 17.68 | 3,937 | 26,135 | 2062 | 17.68 | % $Na_2O$ SAX | 18.74 |
| 447.30 | Alum | 8.13 | 1.8 | 1.325 | 895.4 | 59.60 | 88,100 | 7,975 | 59.60 | | 88,100 | 7975 | 59.60 | | |
| 0.00 | UP 290 | 17.29 | 41.8 | 1.370 | 0.0 | 0.00 | 0 | 0 | 0.00 | | 0 | 0 | 0.00 | % Cl UP 290 | 20.99 |
| 12.80 | $H_3PO_4$ (75%) | 0 | | 1.570 | 30.0 | 2.00 | 2.950 | 225 | 2.00 | | 2,950 | 225 | 2.00 | | |
| | Flush Water | | | 1.000 | 0.0 | 0.00 | 0 | 0 | 0.00 | | 0 | 0 | 0.00 | | |
| 647.25 | UltraPAC 2230 | 9.10 | 9.1 | 1.200 | 1502.3 | 100.00 | 147,810 | 14,774 | 98.00 | | 147,810 | 13,749 | 100.00 | | |
| | Check | | | | 1502.3 | 100.00% | 147,810 | | | 0 | 147,810 | 13,785 | 100.00% | | |
| | % SA soln | 17.0% | | 1.160 | 1,251.9 | 100.00% | 147,810 | 0 | | 147,810 | 0 | 36 | 100.00% | | |

| Evaporation | | | | % $Al_2O_3$ | % Basicity | % $SO_4$ | % Cl | $Cl/SO_4$ ratio | Cl + $SO_4$ | Na | Cl + $SO_4$ + Na |
|---|---|---|---|---|---|---|---|---|---|---|---|
| Expected | 0.00 | 0.00% | Evap. & $CO_2$ | 9.10% | 71.2 | 13.70 | 0.00 | 0.00 | 13.70 | 3.35 | 17.03 |
| Actual | | 0.00% | Just $CO_2$ | 9.16% | | 13.79 | 0.00 | | 13.79 | 3.33 | 17.12 |

| | | |
|---|---|---|
| 1. Add required amount of start up water to the reactor and start agitation. | 1 | |
| 2. Add the required amount of water into the soda ash mix vessel and start agitator. | 0 | 0.00% |
| 3. Add required amount of sodium carbonate (soda ash) to the soda ash mix vessel and agitate until dissolved. | 3.58 | |
| 4. Add the required amount of 43% sodium aluminate solution into the soda ash mix vessel. | 34.76 | |
| 5. Add the required amount of aluminum sulfate solution to the alum holding vessel. | 7.11 | |
| 6. Start addition of the aluminum solution to the reactor to lower pH to less than 4. | 58.13 | |
| 7. Start addition of the sodium carbonate/sodium aluminate mixture to the reactor. | | |
| 8. Adjust feed rates to add the solutions over desired time period maintaining the pH between 5.5 and 7. | | |
| 9. When all of the sodium carbonate/sodium aluminate solution has been added let the pH fall below 5. | | |
| 10. When the pH falls below 5 increase the aluminum sulfate feed rate. | | |
| 11. When all of the alominim sulfate solution has been added start the phosphoric acid addition. | | |
| 12. When phosphoric acid addition is completet let solution mix until all solids have dissolved. | | |
| Initial calculations used 22.71% Al2O3 for the 43% sodium aluminate and 8.42% Al2O3 and 5.2% basicity for alum. | | |
| These were replaced with 24.04% Al2O3 for the 43% sodium aluminate and 8.13% Al2O3 and 1.8% basicity for alum. | | |
| This made the calculated and actual numbers much more consistant. | | |

TABLE 9-continued

| Analysis: | Calculated | Actual | |
|---|---|---|---|
| Specific Gravity | | | |
| % $M_2O_3$ | 9.10 | 9.25 | |
| % $Al_2O_3$ | 9.10 | 9.25 | 0.15 |
| % $Fe_2O_3$ | 0.00 | 0.00 | |
| % Basicity | 71.2 | 73.2 | 2.0 144.4 |
| % Sulfates | 13.70 | | |
| Turbidity, NTU | | | |
| Viscosity, cps | | | |

Precipitation observations and data

| Time (min) | Bulk slurry Temp. (° C.) | Bulk slurry Temp. (° F.) | Bulk slurry pH | Alum/ UP290 pump setting | $H_2O$/ SA/SAX pump setting | Comments | Alum pump rate (ml/min.) | $H_2O$/ SA/SAX pump rate (ml/min.) | Pump Ratio | |
|---|---|---|---|---|---|---|---|---|---|---|
| 0 | 22.4 | 72.3 | 3.80 | 0.6 | 6 | Agitator @ 250 rpm. Started both feeds @ 12:45 pm. | 2.2 | 1.4 | 1.6 | |
| 1 | 22.7 | 72.9 | 4.75 | 0.6 | 6 | | 2.2 | 1.4 | 1.6 | |
| 2 | 22.9 | 73.2 | 4.86 | 0.6 | 6 | | 2.2 | 1.4 | 1.6 | |
| 3 | 23.2 | 73.8 | 4.90 | 0.6 | 7 | | 2.2 | 1.6 | 1.4 | |
| 4 | 23.4 | 74.1 | 5.28 | 0.6 | 7 | | 2.2 | 1.6 | 1.4 | |
| 5 | 23.7 | 74.7 | 5.45 | 0.6 | 7 | | 2.2 | 2.6 | 1.4 | |
| 10 | 24.7 | 76.5 | 6.01 | 0.6 | 7 | | 2.2 | 3.6 | 1.4 | |
| 15 | 25.5 | 77.9 | 6.17 | 0.6 | 7 | | 2.2 | 2.6 | 1.4 | |
| 20 | 26.1 | 79.0 | 6.19 | 1.2 | 14 | | 4.3 | 3.0 | 1.5 | |
| 25 | 27.6 | 81.7 | 5.98 | 1.2 | 15 | | 4.3 | 3.2 | 1.4 | |
| 30 | 28.6 | 83.5 | 6.34 | 1.2 | 15 | | 4.3 | 3.2 | 1.4 | |
| 35 | 29.4 | 84.9 | 6.49 | 1.2 | 15 | | 4.3 | 3.2 | 1.4 | |
| 45 | 30.5 | 86.9 | 6.58 | 1.2 | 15 | | 4.3 | 3.2 | 1.4 | |
| 65 | 31.6 | 88.9 | 6.59 | 1.2 | 15 | | 4.3 | 3.2 | 1.4 | |
| 85 | 31.7 | 89.1 | 6.60 | 1.2 | 15 | | 4.3 | 3.2 | 1.4 | 1.4 |
| 114 | 21.9 | 71.4 | 6.56 | 1.2 | 0 | Water/soda ash/sodium aluminate mixture feed complete, | 4.3 | 0.0 | 0.0 | |
| 120 | 30.9 | 87.6 | 5.24 | 1.2 | 0 | | 4.3 | 0.0 | 0.0 | |
| 180 | 26.7 | 80.1 | 3.91 | 1.2 | 0 | Aluminum sulfate feed complete. Started phosphoric acid feed. | 0.0 | 0.0 | 0.0 | |
| 190 | 29.7 | 85.5 | 3.54 | 0.0 | 0 | Phosphoric acid feed complete. | 0.0 | 0.0 | 0.0 | |
| 240 | 27.4 | 81.3 | 3.84 | 0.0 | 0 | Solution cloudy. Let mix overnight. | 0.0 | 0.0 | 0.0 | |
| 1215 | 25.0 | 77.0 | — | — | — | (May 5, 2020) 9:00 am. (20 hours 15 minutes} Solution still cloudy. Turned on hotplate to 40° C. | | | | |
| 1230 | 40.0 | 104.0 | — | — | — | Solution has completely gelled. Turned off hotplate. Add 150 g of aluminum sulfate and let mix. Solution still turbid but fluid. | | | | |
| Average | 27.7 | 81.9 | 6.18 | | | | | | | |

TABLE 10

| | | | | | | | | | | | | | | | |
|---|---|---|---|---|---|---|---|---|---|---|---|---|---|---|---|
| | | | | | | | | | | | Headspace | | | | |
| | | | | | 60% Basic PAS + 2% Phos. Acid (75%) soln | | Conversion Gallons | | | | Target | Initial | Actual | | |
| | Working Examples MU-164 | | | | MU-164 | | 98.5413 | 14774.7 | | | 11.4 | 11.1 | 16.0 | 15.6 | |
| | Digest Temp. (° C.) | | | | Formulation | | Target | | | | Actual | | | | |
| Target | Overnight (° C.) | % $M_2O_3$ | % Basicity | Sp. Gr. | grams | % | Pounds | Gallons | % | Min. Gallons | Pounds | Gallons | % | | |
| 120.0 | Start Up Water | 0 | | 1.000 | 120.0 | 8.00 | 11,825 | 1,418 | 8.00 | 2,100 | 11,805 | 1416 | 7.99 | | |
| 0.0 | Ferric sulfate | 17.75 | 10.5 | 1.581 | 0.0 | 0.00 | 0 | 0 | 0.00 | 0 | 0 | 0 | 0.00 | | |
| 131.7 | Water (SA) | 0 | | 1.000 | 131.6 | 8.77 | 12,970 | 1,556 | 8.77 | 3,111 | 15,625 | 1946 | 10.57 | | |
| 26.9 | Soda Ash | 0 | | NA | 26.9 | 1.79 | 2,650 | NA | 1.79 | | 3,195 | NA | 2.16 | | |
| 220.3 | 43% SAX | 24.04 | 140.1 | 1.520 | 220.1 | 14.67 | 21,690 | 1,712 | 14.67 | 3,267 | 26,135 | 2062 | 17.68 | % $Na_2O$ SAX | 18.74 |
| 971.1 | Alum | 8.13 | 1.8 | 1.325 | 973.4 | 64.89 | 95,920 | 8,683 | 64.89 | | 88,100 | 7975 | 59.60 | | |
| 0.0 | UP 290 | 17.29 | 41.8 | 1.370 | 0.0 | 0.00 | 0 | 0 | 0.00 | | 0 | 0 | 0.00 | % Cl UP 290 | 20.99 |
| 30.0 | $H_3PO_4$ (75%) | 0 | | 1.570 | 30.0 | 2.00 | 2,955 | 226 | 2.00 | | 2,950 | 225 | 2.00 | | |
| 0.0 | Flush Water | | | 1.000 | 0.0 | 0.00 | 0 | 0 | 0.00 | | 0 | 0 | 0.00 | | |
| 1500.0 | UltraPAC 2230 | 8.80 | 8.8 | 1.200 | 1502.0 | 100.12 | 148,010 | 14,794 | 98.13 | | 147,810 | 13,749 | 100.00 | | |
| | Check | | | | 1500.0 | 99.99% | 148,010 | | | | 147,810 | 13,785 | 100.00% | | |
| | % SA soln | 17.0% | | 1.160 | 1,250.0 | 99.87% | 147,813 | −197 | | 147,810 | 0 | 36 | 100.00% | | |

| Evaporation | | | | % $Al_2O_3$ | % Basicity | % $SO_4$ | % Cl | Cl/$SO_4$ ratio | Cl + $SO_4$ | Na | Cl + $SO_4$ + Na |
|---|---|---|---|---|---|---|---|---|---|---|---|
| Expected | 0.00 | 0.00% | Evap. & $CO_2$ | 8.80% | 60.8 | 14.91 | 0.00 | 0.00 | 14.91 | 2.76 | 17.68 |
| Actual | 2.00 | 0.13% | Just $CO_2$ | 8.84% | | 14.98 | 0.00 | | 14.98 | 2.76 | 17.74 |

| | | | |
|---|---|---|---|
| 1. Add required amount of start up water to the reactor and start agitation. | | 1 | |
| 2. Add the required amount of water into the soda ash mix vessel and start agitator. | 0 | | 0.00% |
| 3. Add required amount of sodium carbonate (soda ash) to the soda ash mix vessel and agitate until dissolved. | | | |
| 4. Add the required amount of 43% sodium aluminate solution into the soda ash mix vessel. | 34.76 | | |
| 5. Add the required amount of aluminum sulfate solution to the alum holding vessel. | 7.11 | | |
| 6. Start addition of the aluminum solution to the reactor to lower pH to less than 4. | 58.14 | | |
| 7. Start addition of the sodium carbonate/sodium aluminate mixture to the reactor. | | | |
| 8. Adjust feed rates to add the solutions over desired time period maintaining the pH between 5.5 and 7. | | | |
| 9. When all of the sodium carbonate/sodium aluminate solution has been added let the pH fall below 5. | | | |
| 10. When the pH falls below 5 increase the aluminum sulfate feed rate. | | | |
| 11. When all of the aluminim sulfate solution has been added start the phosphoric acid addition. | | | |
| 12. When phosphoric acid addition is completet let solution mix until all solids have dissolved. | | | |
| Initial calculations used 22.71% Al2O3 for the 43% sodium aluminate and 8.42% Al2O3 and 5.2% basicity for alum. | | | |
| These were replaced with 24.04% Al2O3 for the 43% sodium aluminate and 8.13% Al2O3 and 1.8% basicity for alum. | | | |
| This made the calculated and actual numbers much more consistant. | | | |

TABLE 10-continued

| Analysis: | Calculated | Actual | |
|---|---|---|---|
| Specific Gravity | | | |
| % $M_2O_3$ | 8.80 | 9.85 | |
| % $Al_2O_3$ | 8.80 | 9.85 | Final weight not recorded |
| % $Fe_2O_3$ | 0.00 | | 0.3 140.9 |
| % Basicity | 60.8 | 61.1 | |
| % Sulfates | 14.91 | | |
| Turbidity, NTU | | | |
| Viscosity, cps | | | |

Precipitation observations and data

| Time (min) | Bulk slurry Temp. (° C.) | Bulk slurry Temp. (° F.) | Bulk slurry pH | Alum/ UP290 pump setting | $H_2O$/ SA/SAX pump setting | Comments | Alum pump rate (ml/min.) | $H_2O$/ SA/SAX pump rate (ml/min.) | Pump Ratio | |
|---|---|---|---|---|---|---|---|---|---|---|
| 0 | 22.1 | 71.8 | 3.20 | 1.2 | 14 | Agitator @ 200 rpm. Started both feeds @ 11:55 am. | 4.3 | 3.0 | 1.5 | |
| 1 | 22.1 | 71.8 | 4.25 | 1.2 | 14 | | 4.3 | 3.0 | 1.5 | |
| 2 | 22.3 | 72.1 | 4.60 | 1.2 | 15 | | 4.3 | 3.2 | 1.4 | |
| 3 | 22.4 | 72.3 | 5.24 | 1.2 | 15 | Agitator @ 250 rpm. | 4.3 | 3.2 | 1.4 | |
| 4 | 23.9 | 75.0 | 5.54 | 1.2 | 15 | | 4.3 | 3.2 | 1.4 | |
| 5 | 24.5 | 76.1 | 5.75 | 1.2 | 15 | | 4.3 | 3.2 | 1.4 | |
| 10 | 26.2 | 79.2 | 6.13 | 1.2 | 15 | | 4.3 | 3.2 | 1.4 | |
| 15 | 27.3 | 81.1 | 6.28 | 1.2 | 15 | | 4.3 | 3.2 | 1.4 | |
| 40 | 29.9 | 85.8 | 6.31 | 1.2 | 16 | | 4.3 | 3.4 | 1.3 | 1.3 |
| 105 | 28.5 | 83.3 | 5.07 | 1.2 | 0 | Water/soda ash/sodium aluminate mixture feed complete. | 4.3 | 0.0 | 0.0 | |
| 201 | 29.6 | 85.3 | 3.64 | 1.2 | 0 | Aluminum sulfate feed complete. Started phosphoric acid feed. | 4.3 | 0.0 | 0.0 | |
| 215 | 27.6 | 81.7 | 3.54 | 0 | 0 | Phosphoric acid feed complete. Let mix overnight. | 0.0 | 0.0 | 0.0 | |
| | | | | | | May 5, 2020 9:00 am (20.9 hrs) solution still cloudy. Turned on hotplate to 40° C. | | | | |
| | | | | | | May 11, 2020 9:00 am (116.9 hrs) solution clear. | | | | |
| Average | 27.7 | 81.8 | 6.12 | | | | | | | |

TABLE 11

| | | | | | | | | | | | | | | | |
|---|---|---|---|---|---|---|---|---|---|---|---|---|---|---|---|
| | | | | | | | | | | | Headspace | | | | |
| | | | UltraPAC 2286 (55% Basic PAS) + 2% Phos | | | | Conversion Gallons | | | | Target | Initial | Actual | | |
| | Working Examples MU-166 | | | | MU-166 | | 101.3105 | 14774.7 | | | 11.4 | 4.9 | 16.0 | 11.3 | |
| | Digest Temp. (° C.) | | | | Formulation | | Target | | | | Actual | | | | |
| Target | Overnight (° C.) | % $M_2O_3$ | % Basicity | Sp. Gr. | grams | % | Pounds | Gallons | % | Min. Gallons | Pounds | Gallons | % | | |
| 120.0 | Start Up Water | 0 | | 1.000 | 120.0 | 8.22 | 12,155 | 1,458 | 8.22 | 2,100 | 23,005 | 2759 | 15.56 | | |
| 0.0 | Ferric sulfate | 17.75 | 10.5 | 1.581 | 0.00 | 0.00 | 0 | 0 | 0.00 | 1,869 | 2,955 | 354 | 2.00 | | |
| 139.0 | Water (SA) | 0 | | 1.000 | 138.9 | 9.52 | 14,070 | 1,688 | 9.52 | 3,375 | 18,330 | 2247 | 12.40 | | |
| 54.0 | Soda Ash | 0 | | NA | 54.0 | 3.70 | 5,470 | NA | 3.70 | | 5,685 | NA | 3.85 | | |
| 143.0 | 43% SAX | 24.04 | 140.1 | 1.520 | 142.9 | 9.79 | 14,475 | 1,142 | 9.79 | 2,830 | 10,550 | 835 | 7.14 | % $Na_2O$ SAX | 19.57 |
| 1014.0 | Alum | 8.13 | 1.8 | 1.325 | 1018.1 | 69.78 | 103,145 | 9,337 | 69.78 | | 26,050 | 2358 | 17.62 | | |
| 0.0 | UP 290 | 16.88 | 41.8 | 1.370 | 0.00 | 0.00 | 0 | 0 | 0.00 | | 63,035 | 5519 | 42.65 | % Cl UP 290 | 20.99 |
| 30.0 | $H_3PO_4$ (75%) | 0 | | 1.570 | 30.00 | 2.06 | 3,040 | 232 | 2.06 | | 0 | 0 | 0.00 | | |
| | Flush Water | | | 1.000 | 0.00 | 0.00 | 0 | 0 | 0.00 | | 0 | 0 | 0.00 | | |
| 1500.0 | UltraPAC 2230 | 8.03 | 8.0 | 1.200 | 1503.9 | 103.07 | 152,360 | 15,229 | 101.02 | | 149,610 | 13,749 | 101.22 | | |
| | Check | | | | 1459.0 | 99.99% | 152,355 | | | 0 | 147,806 | 14,137 | 100.00% | | |
| | % SA soln | 28.0% | | 1.282 | 1,215.8 | 97.01% | 147,806 | −4,549 | | 147,806 | −1,804 | 388 | 98.79% | | |

| | Evaporation | | | % $Al_2O_3$ | % Basicity | % $SO_4$ | % Cl | $Cl/SO_4$ ratio | Cl + $SO_4$ | Na | Cl + $SO_4$ + Na |
|---|---|---|---|---|---|---|---|---|---|---|---|
| Expected | 0.0 | 0.00% | Evap. & $CO_2$ | 8.03% | $3.8 | 16.03 | 0.00 | 0.00 | 16.03 | 2.96 | 18.99 |
| Actual | 44.9 | 3.08% | Just $CO_2$ | 7.88% | | 15.73 | 0.00 | | 15.73 | 2.96 | 18.69 |

1. Add required amount of start up water to the reactor and start agitation. 1
2. Add the required amount of water into the soda ash mix vessel and start agitator. 1804 1.22%
3. Add required amount of sodium carbonate (soda ash) to the soda ash mix vessel and agitate until dissolved.
4. Add the required amount of 43% sodium aluminate solution into the soda ash mix vessel.
5. Add the required amount of aluminum sulfate solution to the alum holding vessel. 41.36
6. Start addition of the aluminum solution to the reactor to lower pH to less than 4. 16.08
7. Start addition of the sodium carbonate/sodium aluminate mixture to the reactor. 42.56
8. Adjust feed rates to add the solutions over desired time period maintaining the pH between 5.5 and 7.
9. When all of the sodium carbonate/sodium aluminate solution has been added let the pH fall below 5.
10. When the pH falls below 5 increase the aluminum sulfate feed rate.
11. When all of the aluminim sulfate solution has been added start the phosphoric acid addition,
12. When phosphoric acid addition is completet let solution mix until all solids have dissolved.

Initial calculations used 23.38% Al2O3 and 168.2% effective basicity for the 43% sodium aluminate and 8.35% Al2O3 and 2.09% basicity for alum.
These were replaced with 24.04% Al2O3 and 140.1% effective basicity for the 43%
sodium aluminate and 8.13% Al2O3 and 1.80% basicity for alum. This made the calculated and actual numbers much more consistant.

TABLE 11-continued

| Analysis: | Calculated | Actual | |
|---|---|---|---|
| Specific Gravity | | | |
| % $M_2O_3$ | | | |
| % $Al_2O_3$ | 8.03 | 7.89 | −0.14 |
| % $Fe_2O_3$ | 0.00 | | |
| % Basicity | 53.8 | 54.6 | 0.8 142.8 |
| % Sulfates | 16.03 | | |
| Turbidity, NTU | | | |
| Viscosity, cps | | | |

Precipitation observations and data

| Time (min) | Bulk slurry Temp. (° C.) | Bulk slurry Temp. (° F.) | Bulk slurry pH | Alum/ UP290 pump setting | $H_2O$/ SA/SAX pump setting | Comments | Alum pump rate (ml/min.) | $H_2O$/ SA/SAX pump rate (ml/min.) | Pump Ratio | |
|---|---|---|---|---|---|---|---|---|---|---|
| 0 | 22.4 | 72.3 | 3.82 | 0.6 | 6 | Agitator @ 200 rpm. Started both feeds @ 2:30 pm. | 2.2 | 1.4 | 1.6 | |
| 1 | 22.4 | 72.3 | 4.53 | 0.6 | 7 | | 2.2 | 1.6 | 1.4 | |
| 2 | 22.5 | 72.5 | 4.90 | 0.6 | 7 | | 2.2 | 1.6 | 1.4 | |
| 3 | 22.7 | 72.9 | 5.16 | 0.6 | 7 | | 2.2 | 1.6 | 1.4 | |
| 4 | 22.8 | 73.0 | 5.42 | 0.6 | 7 | | 2.2 | 1.6 | 1.4 | |
| 5 | 23.1 | 73.6 | 5.56 | 0.6 | 7 | | 2.2 | 1.6 | 1.4 | |
| 10 | 23.9 | 75.0 | 5.83 | 0.6 | 7 | | 2.2 | 1.6 | 1.4 | |
| 15 | 24.5 | 76.1 | 5.88 | 1.2 | 14 | | 4.3 | 3.0 | 1.5 | |
| 20 | 26.1 | 79.0 | 5.64 | 1.2 | 15 | | 4.3 | 3.2 | 1.4 | |
| 25 | 27.1 | 80.8 | 5.73 | 1.2 | 16 | | 4.3 | 3.4 | 1.3 | |
| 30 | 28.1 | 82.6 | 6.00 | 1.2 | 16 | | 4.3 | 3.4 | 1.3 | |
| 35 | 29.0 | 84.2 | 6.09 | 1.2 | 16 | | 4.3 | 3.4 | 1.3 | |
| 40 | 29.7 | 85.5 | 6.06 | 1.2 | 17 | Agitator @ 300 rpm. | 4.3 | 3.6 | 1.2 | |
| 60 | 29.7 | 85.5 | 6.18 | 1.2 | 17 | | 4.3 | 3.6 | 1.2 | |
| 70 | 29.7 | 85.5 | 6.31 | 1.2 | 17 | | 4.3 | 3.6 | 1.2 | 1.3 |
| 85 | 29.9 | 85.8 | 5.90 | 4.2 | 0 | Water/soda ash/sodium aluminate mixture feed complete. | 15.0 | 0.0 | 0.0 | |
| 116 | 24.0 | 75.2 | 3.64 | 0.6 | 0 | Aluminum sulfate feed complete. Started phosphoric acid feed. | 2.2 | 0.0 | 0.0 | |
| 130 | 27.2 | 81.0 | 3.56 | 0 | 0 | Phosphoric acid feed complete. Let mix overnight. May 12, 2020 9:00 am (18.5 hrs) solution clear. | 0.0 | 0.0 | 0.0 | |
| Average | 25.6 | 78.0 | 5.85 | | | | | | | |

TABLE 12

| | | | | | | | | | | | | | | | |
|---|---|---|---|---|---|---|---|---|---|---|---|---|---|---|---|
| | | | | | | | | | | | Headspace | | | | |
| | | | | UltraPAC 2361 (50% Basic PAS) | | | Conversion Gallons | | | | Target | Initial | Actual | | |
| | Working Examples MU-168 | | | MU-168 | | | 101.3800 | 14774.7 | | | 11.4 | 5.4 | 16.0 | 10.7 | |
| | Digest Temp. (° C.) | | | | Formulation | | Target | | | | Actual | | | | |
| Target | Overnight (° C.) | % $M_2O_3$ | % Basicity | Sp. Gr. | grams | % | Pounds | Gallons | % | Min. Gallons | Pounds | Gallons | % | | |
| 120.0 | Start Up Water | 0 | | 1.000 | 120.0 | 8.23 | 12,165 | 1,459 | 8.23 | 2,100 | 23,005 | 2759 | 15.56 | | |
| 0.0 | Ferric sulfate | 17.75 | 10.5 | 1.581 | 0.00 | 0.00 | 0 | 0 | 0.00 | 1,869 | 2,955 | 354 | 2.00 | | |
| 127.5 | Water (SA) | 0 | | 1.000 | 127.4 | 8.74 | 12,915 | 1,549 | 8.74 | 3,098 | 18,330 | 2297 | 12.40 | | |
| 43.5 | Soda Ash | 0 | | NA | 43.5 | 2.98 | 4,410 | NA | 2.98 | | 5,685 | NA | 3.85 | | |
| 118.0 | 43% SAX | 24.04 | 140.1 | 1.520 | 117.9 | 8.09 | 11,955 | 943 | 8.09 | 2,493 | 10,550 | 833 | 7.14 | % $Na_2O$ SAX | 19.57 |
| 1061.0 | Alum | 8.13 | 1.8 | 1.325 | 1060.8 | 72.76 | 107,545 | 9,736 | 72.76 | | 26,050 | 2358 | 17.62 | | |
| 0.0 | UP 290 | 16.88 | 41.8 | 1.370 | 0.00 | 0.00 | 0 | 0 | 0.00 | | 63,035 | 5519 | 42.65 | % Cl UP 290 | 20.99 |
| 30.0 | $H_3PO_4$ (75%) | 0 | | 1.570 | 30.00 | 2.06 | 3.040 | 232 | 2.06 | | 0 | 0 | 0.00 | | |
| | Flush Water | | | 1.000 | 0.00 | 0.00 | 0 | 0 | 0.00 | | 0 | 0 | 0.00 | | |
| 1500.0 | UltraPAC 2230 | 7.86 | 7.9 | 1.200 | 1499.6 | 102.86 | 152,030 | 15,196 | 100.80 | | 149,610 | 13,749 | 101.22 | | |
| | Check | | | | 1458.0 | 100.01% | 152,030 | | | 0 | 147,806 | 14,188 | 100.00% | | |
| | % SA soln | 25.5% | | 1.254 | 1,215.0 | 97.23% | 147,813 | −4,217 | | 147,806 | −1,804 | 439 | 98.79% | | |

| Evaporation | | | | % $Al_2O_3$ | % Basicity | % $SO_4$ | % Cl | Cl/$SO_4$ ratio | Cl + $SO_4$ | Na | Cl + $SO_4$ + Na |
|---|---|---|---|---|---|---|---|---|---|---|---|
| Expected | 0.0 | 0.00% | Evap. & $CO_2$ | 7.86% | 44.8 | 16.72 | 0.00 | 0.00 | 16.72 | 2.41 | 19.13 |
| Actual | 41.6 | 2.85% | Just $CO_2$ | 7.71% | | 16.40 | 0.00 | | 16.40 | 2.41 | 18.82 |

1. Add required amount of start up water to the reactor and start agitation. 0.9541
2. Add the required amount of water into the soda ash mix vessel and start agitator. 1804 1.22%
3. Add required amount of sodium carbonate (soda ash) to the soda ash mix vessel and agitate until dissolved.
4. Add the required amount of 43% sodium aluminate solution into the soda ash mix vessel.
5. Add the required amount of aluminum sulfate solution to the alum holding vessel.
6. Start addition of the aluminum solution to the reactor to lower pH to less than 4.
7. Start addition of the sodium carbonate/sodium aluminate mixture to the reactor.
8. Adjust feed rates to add the solutions over desired time period maintaining the pH between 5.5 and 7.
9. When all of the sodium carbonate/sodium aluminate solution has been added let the pH fall below 5.
10. When the pH falls below 5 increase the aluminum sulfate feed rate.
11. When all of the aluminim sulfate solution has been added start the phosphoric acid addition.
12. When phosphoric acid addition is completet let solution mix until all solids have dissolved.

Initial calculations used 23.38% Al2O3 and 168.2% effective basicity for the 43% sodium aluminate and 8.35% Al2O3 and 2.09% basicity for alum. These were replaced with 24.04% Al2O3 and 140.1% effective basicity for the 43% sodium aluminate and 8.13% Al2O3 and 1.80% basicity for alum. This made the calculated and actual numbers much more consistant.

TABLE 12-continued

| Analysis: | Calculated | Actual | |
|---|---|---|---|
| Specific Gravity | | | |
| % $M_2O_3$ | | | |
| % $Al_2O_3$ | 7.86 | 7.67 | −0.19 |
| % $Fe_2O_3$ | 0.00 | | |
| % Basicity | 44.8 | 43.6 | −1.2 135.3 |
| % Sulfates | 16.72 | | |
| Turbidity, NTU | | | |
| Viscosity, cps | | | |

Precipitation observations and data

| Time (min) | Bulk slurry Temp. (° C.) | Bulk slurry Temp. (° F.) | Bulk slurry pH | Alum/ UP290 pump setting | $H_2O$/ SA/SAX pump setting | Comments | Alum pump rate (ml/min.) | $H_2O$/ SA/SAX pump rate (ml/min.) | Pump Ratio | |
|---|---|---|---|---|---|---|---|---|---|---|
| 0 | 21.6 | 70.9 | 3.70 | 1.2 | 17 | Agitator @ 200 rpm. Started both feeds @ 2:37 pm. | 4.3 | 3.6 | 1.2 | |
| 1 | 21.8 | 71.2 | 7.72 | 1.7 | 17 | Stopped Water/soda ash/sodium aluminate mixture feed for a few minutes. | 6.1 | 3.6 | 1.7 | |
| 2 | 22.2 | 72.0 | 4.74 | 1.7 | 17 | | 6.1 | 3.6 | 1.7 | |
| 3 | 22.6 | 72.7 | 5.24 | 1.7 | 17 | | 6.1 | 3.6 | 1.7 | |
| 4 | 23.0 | 73.4 | 5.36 | 1.7 | 17 | | 6.1 | 3.6 | 1.7 | |
| 5 | 23.3 | 73.9 | 5.27 | 1.7 | 17 | | 6.3 | 3.6 | 1.7 | |
| 7 | 24.0 | 75.2 | 5.24 | 1.7 | 18 | | 6.1 | 3.8 | 1.6 | |
| 8 | 24.4 | 75.9 | 5.31 | 1.7 | 19 | | 5.1 | 4.0 | 1.5 | |
| 9 | 24.9 | 76.8 | 5.33 | 1.7 | 20 | Water/soda ash/sodium aluminate mixture feed line clogged. | 6.1 | 4.2 | 1.5 | |
| 11 | 25.6 | 78.1 | 5.50 | 1.7 | 20 | | 6.1 | 4.2 | 1.5 | |
| 12 | 26.0 | 78.8 | 5.63 | 1.7 | 20 | | 6.1 | 4.2 | 1.5 | |
| 13 | 26.5 | 79.7 | 5.73 | 1.7 | 20 | | 6.1 | 4.2 | 1.5 | |
| 15 | 27.3 | 81.1 | 5.86 | 1.7 | 20 | | 6.1 | 4.2 | 1.5 | |
| 30 | 29.7 | 85.9 | 5.98 | 1.7 | 20 | | 6.1 | 4.2 | 1.5 | |
| 45 | 27.6 | 81.7 | 4.42 | 0 | 20 | Water/soda ash/sodium aluminate mixture feed line pushed against bottom of vessel. | 0.1 | 4.2 | 0.0 | |
| 49 | 28.3 | 82.9 | 5.62 | 1.7 | 20 | | 6.1 | 4.2 | 1.5 | |
| 50 | 28.6 | 83.5 | 5.75 | 1.7 | 20 | | 6.1 | 4.2 | 1.5 | 1.4 |
| 53 | 24.2 | 75.6 | 6.09 | 4.5 | 0 | Water/soda ash/sodium aluminate mixture feed complete. | 16.0 | 0.0 | 0.0 | |
| 90 | 24.7 | 76.5 | 3.40 | 0 | 3 | Aluminum sulfate feed complete. | 0.0 | 0.0 | 0.0 | |
| 95 | 24.7 | 76.5 | 3.41 | 1.7 | 0 | Started phosphoric acid feed. | 6.1 | 0.0 | 0.0 | |
| 100 | 27.4 | 81.3 | 3.34 | 0 | 0 | Phosphoric acid feed complete. Let mix overnight. May 13, 2020 9:00 am (18.4 hrs) solution clear. | 0.0 | 0.0 | 0.0 | |
| Average | 26.1 | 78.9 | 5.54 | | | | | | | |

TABLE 13

| | | | | | | | | | | | | | | | |
|---|---|---|---|---|---|---|---|---|---|---|---|---|---|---|---|
| | | | | | | | | | | | Headspace | | | | |
| | | | | UltraPAC 2362 (60% Basic PAS} | | | Conversion Gallons | | | | Target | Initial | Actual | | |
| | Working Examples MU-180 | | | | MU-180 | | 104.5273 | 14774.7 | | | 11.4 | −1.6 | 16.0 | 10.7 | |
| | Digest Temp. (C) | | | | Formulation | | Target | | | | Actual | | | | |
| Target | Overnight (° C.) | % $M_2O_3$ | % Basicity | Sp. Gr. | grams | % | Pounds | Gallons | % | Min. Gallons | Pounds | Gallons | % | | |
| 120.0 | Start Up Water | 0 | | 1.000 | 120.0 | 8.49 | 12,545 | 1,505 | 8.49 | 2,100 | 12,545 | 1505 | 8.00 | | |
| 0.00 | Ferric sulfate | 17.75 | 10.5 | 1.581 | 0.00 | 0.00 | 0 | 0 | 0.00 | 0 | 0 | 0 | 0.00 | | |
| 135.0 | Water (SA) | 0 | | 1.000 | 134.9 | 9.54 | 14,100 | 1,691 | 9.54 | 3,383 | 14,100 | 1806 | 8.99 | | |
| 45.0 | Sada Ash | 0 | | NA | 45.1 | 3.19 | 4,715 | NA | 3.19 | | 4,715 | NA | 3.01 | | |
| 187.0 | 43% SAX | 23.14 | 148.2 | 1.520 | 187.3 | 13.25 | 19,580 | 1,545 | 13.25 | 3,236 | 19,580 | 1545 | 12.48 | % $Na_2O$ SAX | 16.57 |
| 983.0 | Alum | 8.13 | 1.8 | 1.325 | 983.2 | 69.53 | 102,770 | 9,303 | 69.53 | | 102,770 | 9303 | 65.51 | | |
| 0.00 | UP 290 | 16.88 | 41.8 | 1.370 | 0.00 | 0.00 | 0 | 0 | 0.00 | | 0 | 0 | 0.00 | % Cl UP 290 | 20.99 |
| 30.00 | $H_3PO_4$ (75%) | 0 | | 1.570 | 30.30 | 2.14 | 3,165 | 242 | 2.14 | | 3,165 | 242 | 2.02 | | |
| | Flush Water | | | 1.000 | 0.00 | 0.00 | 0 | 0 | 0.00 | | 0 | 0 | 0.00 | | |
| 1500.0 | UltraPAC 2230 | 8.72 | 8.7 | 1.200 | 1500.8 | 106.14 | 156,875 | 15,681 | 103.99 | | 156,875 | 13,749 | 100.00 | | |
| | Check | | | | 1414.1 | 100.01% | 156,875 | | | 0 | 156,875 | 14,636 | 100.00% | | |
| | % SA soln | 25.1% | | 1.250 | 1,178.4 | 94.22% | 147,812 | −9,063 | | 156,875 | 0 | 887 | 100.00% | | |

| | Evaporation | | | % $Al_2O_3$ | % Basicity | % $SO_4$ | % Cl | Cl/$SO_4$ ratio | Cl + $SO_4$ | Na | Cl + $SO_4$ + Na |
|---|---|---|---|---|---|---|---|---|---|---|---|
| Expected | 0.0 | 0.00% | Evap. & $CO_2$ | 8.72% | 61.8 | 15.98 | 0.00 | 0.00 | 15.98 | 3.24 | 19.21 |
| Actual | 86.7 | 6.13% | Just $CO_2$ | 8.29% | | 15.20 | 0.00 | | 15.20 | 3.24 | 18.44 |

1. Add required amount of start up water to the reactor and start agitation. 0.9541
2. Add the required amount of water into the soda ash mix vessel and start agitator. 1804 1.22%
3. Add required amount of sodium carbonate (soda ash) to the soda ash mix vessel and agitate until dissolved.
4. Add the required amount of 43% sodium aluminate solution into the soda ash mix vessel.
5. Add the required amount of aluminum sulfate solution to the alum holding vessel.
6. Start addition of the aluminum solution to the reactor to lower pH to less than 4.
7. Start addition of the sodium carbonate/sodium aluminate mixture to the reactor.
8. Adjust feed rates to add the solutions over desired time period maintaining the pH between 6 and 7.
9. When all of the sodium carbonate/sodium aluminate solution has been added let the pH fall below 5.
10. When the pH falls below 5 increase the aluminum sulfate feed rate.
11. When all of the aluminim sulfate solution has been added start the phosphoric acid addition.
12. When phosphoric acid addition is completet let solution mix until all solids have dissolved.

TABLE 13-continued

| Analysis: | Calculated | Actual | |
|---|---|---|---|
| Specific Gravity | | | |
| % $M_2O_3$ | | | |
| % $Al_2O_3$ | 8.72 | 8.68 | −0.04 |
| % $Fe_2O_3$ | 0.00 | | |
| % Basicity | 61.8 | 62.1 | 0.3 149.0 |
| % Sulfates | 15.98 | | |
| Turbidity, NTU | | | |
| Viscosity, cps | | | |

Precipitation observations and data

| Time (min) | Bulk slurry Temp. (° C.) | Bulk slurry Temp. (° F.) | Bulk slurry pH | Alum/ UP290 pump setting | $H_2O$/ SA/SAX pump setting | Comments | Alum pump rate (ml/min.) | $H_2O$/ SA/SAX pump rate (ml/min.) | Pump Ratio | |
|---|---|---|---|---|---|---|---|---|---|---|
| 0 | 21.5 | 70.7 | 3.58 | 0.6 | 6 | Agitator @ 200 rpm. Started both feeds @ 10:30 am. | 2.2 | 1.4 | 3.6 | |
| 1 | 22.7 | 71.1 | 5.23 | 0.6 | 6 | | 2.2 | 1.4 | 1.6 | |
| 2 | 23.9 | 71.4 | 5.36 | 0.6 | 6 | | 2.2 | 1.4 | 1.6 | |
| 3 | 22.1 | 71.8 | 5.44 | 0.6 | 7 | | 2.2 | 1.6 | 1.4 | |
| 4 | 22.3 | 72.1 | 5.62 | 0.6 | 7 | | 2.2 | 1.6 | 1.4 | |
| 5 | 22.5 | 72.5 | 5.93 | 0.6 | 7 | | 2.2 | 1.6 | 1.4 | |
| 6 | 22.7 | 72.9 | 6.03 | 0.6 | 7 | | 2.2 | 1.6 | 1.4 | |
| 7 | 22.9 | 73.2 | 6.21 | 0.6 | 7 | | 2.2 | 1.6 | 1.4 | |
| 8 | 23.1 | 73.6 | 6.32 | 0.6 | 7 | | 2.2 | 1.6 | 1.4 | |
| 9 | 23.3 | 73.9 | 6.38 | 0.6 | 7 | | 2.2 | 1.6 | 1.4 | |
| 10 | 23.5 | 74.3 | 6.43 | 0.6 | 7 | | 2.2 | 1.6 | 1.4 | |
| 15 | 24.4 | 75.9 | 6.53 | 1.2 | 14 | | 4.3 | 3.0 | 1.5 | |
| 20 | 26.0 | 78.8 | 6.32 | 2.4 | 28 | Agitator @ 300 rpm. | 8.6 | 5.8 | 1.5 | |
| 25 | 28.7 | 83.7 | 6.00 | 2.4 | 30 | | 8.6 | 6.2 | 1.4 | |
| 30 | 30.0 | 86.0 | 5.72 | 2.4 | 32 | Cleared blockage in water/soda ash/sodium aluminate mixture feed line. | 8.6 | 6.5 | 1.3 | |
| 35 | 31.2 | 88.2 | 6.40 | 2.4 | 32 | | 8.6 | 6.5 | 1.3 | |
| 40 | 32.4 | 90.3 | 6.77 | 2.4 | 32 | | 8.6 | 6.5 | 1.3 | |
| 50 | 33.8 | 92.8 | 7.26 | 2.4 | 30 | | 8.6 | 6.2 | 1.4 | 1.4 |
| 55 | 34.2 | 93.6 | 7.17 | 2.4 | 0 | Water/soda ash/sodium aluminate mixture feed complete. | 8.6 | 0.0 | 0.0 | |
| 60 | 32.0 | 89.6 | 5.13 | 2.4 | 0 | | 8.6 | 0.0 | 0.0 | |
| 110 | 25.7 | 78.3 | 3.66 | 0.6 | 0 | Aluminum sulfate feed complete. Started phosphoric acid feed. | 2.2 | 0.0 | 0.0 | |
| 125 | 28.6 | 83.5 | 3.57 | 0 | 0 | Phosphoric acid feed complete. | 0.0 | 0.0 | 0.0 | |
| 155 | 27.3 | 81.1 | 3.59 | 0 | 0 | Let mix overnight. | 0.0 | 0.0 | 0.0 | |
| | | | | | | Jun. 16, 2020 9:00 am (22.5 hrs) solution still cloudy. Turned hotplate on to 40° C. | | | | |
| | | | | | | Jun. 16, 2020 12:00 noon (25.5 hrs) solution mostly clear. | | | | |
| | | | | | | Jun. 16, 2020 1:00 pm (26.5 hrs) turned off heat and let cool. | | | | |
| Average | 27.4 | 81.2 | 6.39 | | | | | | | |

TABLE 14

| | | | | | | | | | | | | | | | |
|---|---|---|---|---|---|---|---|---|---|---|---|---|---|---|---|
| | | | | | | | | | | | Headspace | | | | |
| | | | | UltraPAC 25495GO (45% Basic PAS) | | | Conversion Gallons | | | | Target | Initial | Actual | | |
| | Working Examples MV-057 | | | MV-057 | | | 99.1960 | 14774.7 | | | 11.4 | 9.5 | 16.0 | 17.2 | |
| | Digest Temp. (° C.) | | | | Formulation | | Target | | | | Actual | | | | |
| Target | Overnight (° C.) | % $M_2O_3$ | % Basicity | Sp. Gr. | grams | % | Pounds | Gallons | % | Min. Gallons | Pounds | Gallons | % | | |
| 120.0 | Start Up Water | 0 | | 1.000 | 120.0 | 8.05 | 11,905 | 1,428 | 8.05 | 2,100 | 11,905 | 1428 | 7.98 | | |
| 3.00 | Sodicum Gluconate | | | NA | 3.00 | 0.20 | 300 | 36 | 0.20 | | 300 | 36 | 0.20 | | |
| 0.0 | Water (SA) | 0 | | 1.000 | 0.0 | 0.00 | 0 | 0 | 0.00 | 0 | 0 | 0 | 0.00 | | |
| 0.0 | Soda Ash | 0 | | NA | 0.0 | 0.00 | 0 | NA | 0.00 | | 0 | NA | 0.00 | | |
| 181.8 | 43% SAX | 22.99 | 148.6 | 1.520 | 183.6 | 12.32 | 18,210 | 1,437 | 12.32 | 1,437 | 18,210 | 1437 | 12.21 | % $Na_2O$ SAX | 19.41 |
| 1195.2 | Alum | 8.17 | 0.7 | 1.325 | 1196.7 | 80.31 | 118,710 | 10,746 | 80.31 | | 118,710 | 10746 | 79.60 | | |
| 0.00 | UP 290 | 16.91 | 42.2 | 1.370 | 0.0 | 0.00 | 0 | 0 | 0.00 | | 0 | 0 | 0.00 | % Cl UP 290 | 20.97 |
| 0.00 | $H_3PO_4$ (75%) | 0 | | 1.570 | 0.0 | 0.00 | 0 | 0 | 0.00 | | 0 | 0 | 0.00 | | |
| | Flush Water | | | 1.000 | 0.00 | 0.00 | 0 | 0 | 0.00 | | 0 | 0 | 0.00 | | |
| 1500.0 | UltraPAC 2230 | 9.39 | 9.4 | 1.200 | 1503.3 | 100.88 | 149,120 | 14,905 | 100.89 | | 149,120 | 13,749 | 100.00 | | |
| | Check | | | | 1490.1 | 99.99% | 149,125 | | | 150,765 | 149,125 | 13,647 | 100.00% | | |
| | % SA soln | | | | 1,241.8 | 99.12% | 147,816 | −1,309 | | −1,640 | 5 | −101 | 100.00% | | |

| Evaporation | | | | % $Al_2O_3$ | % Basicity | % $SO_4$ | % Cl | $Cl/SO_4$ ratio | Cl + $SO_4$ | Na | Cl + $SO_4$ + Na |
|---|---|---|---|---|---|---|---|---|---|---|---|
| Expected | 0.0 | 0.00% | Evap. & $CO_2$ | 9.39% | 45.3 | 18.54 | 0.00 | 0.00 | 18.54 | 1.75 | 20.29 |
| Actual | 13.2 | 0.89% | Just $CO_2$ | 9.31% | | 18.38 | 0.00 | | 18.38 | 1.75 | 20.13 |
| | | | | | | | | 0.9541 | | | |
| | | | | | | | | 0 | | | 0.00% |

1. Add required amount of start up water to the reactor and start agitation.
2. Add the required amount of 43% sodium aluminate solution into the holding vessel,
3. Add the required amount of aluminum sulfate solution to the alum holding vessel.
4. Start addition of the aluminum solution to the reactor to lower pH to less than 4.
5. Start addition of the sodium aluminate to the reactor.
6. Adjust feed rates to add the solutions over desired time period maintaining the pH between 5.5 and 7.
7. When all of the sodium aluminate solution has been added increase the aluminum sulfate feed rate.
8. When all of the aluminim sulfate solution addition is complete add the sodium gluconate.
9. Let solution mix until all solids have dissolved.

TABLE 14-continued

| Analysis: | Calculated | Actual | |
|---|---|---|---|
| Specific Gravity | | 1.315 | |
| % $M_2O_3$ | | | |
| % $Al_2O_3$ | 9.39 | 9.33 | −0.06 |
| % $Fe_2O_3$ | 0.00 | | |
| % Basicity | 45.3 | 46.4 | 1.1 152.3 |
| % Sulfates | 18.54 | 19.1 | |
| Turbidity, NTU | | 3.1 | |
| Viscosity, cps | | 14.4 | |

Precipitation observations and data

| Time (min) | Bulk slurry Temp. (° C.) | Bulk slurry Temp. (° F.) | Bulk slurry pH | Alum/ UP290 pump setting | $H_2O$/ SA/SAX pump setting | Comments | Alum pump rate (ml/min.) | $H_2O$/ SA/SAX pump rate (ml/min.) | Pump Ratio | |
|---|---|---|---|---|---|---|---|---|---|---|
| 0 | 19.0 | 66.2 | 3.80 | 0.6 | 6 | Agitator @ 200 rpm. Started both feeds @ 11.45 am. | 2.2 | 1.4 | 1.6 | |
| 1 | 19.6 | 67.3 | 10.05 | 1.2 | 6 | | 4.3 | 1.4 | 3.1 | |
| 2 | 20.0 | 68.0 | 6.08 | 0.9 | 6 | | 3.3 | 1.4 | 2.3 | |
| 3 | 20.4 | 68.7 | 5.22 | 0.8 | 6 | | 2.9 | 1.4 | 2.1 | |
| 4 | 21.2 | 70.2 | 5.18 | 0.8 | 6 | Agitator up to 250 rpm. | 2.9 | 1.4 | 2.1 | |
| 5 | 21.5 | 70.7 | 5.07 | 0.7 | 6 | | 2.6 | 1.4 | 1.8 | |
| 6 | 21.8 | 71.2 | 5.35 | 0.7 | 6 | | 2.6 | 1.4 | 1.8 | |
| 7 | 22.2 | 72.0 | 5.67 | 0.7 | 6 | | 2.6 | 1.4 | 1.8 | |
| 8 | 22.6 | 72.7 | 5.83 | 0.7 | 6 | | 2.6 | 1.4 | 1.8 | |
| 9 | 22.4 | 72.3 | 5.95 | 0.7 | 6 | | 2.6 | 1.4 | 1.8 | |
| 10 | 23.2 | 73.8 | 6.04 | 0.7 | 6 | | 2.6 | 1.4 | 1.8 | |
| 15 | 24.3 | 75.7 | 6.39 | 0.7 | 6 | | 2.6 | 1.4 | 1.8 | |
| 20 | 25.1 | 77.2 | 6.43 | 0.7 | 6 | | 2.6 | 1.4 | 1.8 | |
| 30 | 26.2 | 79.2 | 6.58 | 0.7 | 6 | | 2.6 | 1.4 | 1.8 | |
| 40 | 27.0 | 80.6 | 6.68 | 0.7 | 6 | | 2.6 | 1.4 | 1.8 | |
| 111 | 28.8 | 83.8 | 7.02 | 0.7 | 6 | Sodium aluminate feed complete. | 2.6 | 1.4 | 1.8 | 1.8 |
| 120 | 26.1 | 79.0 | 4.32 | 2.4 | 0 | | 8.6 | 0.0 | 0.0 | |
| 199 | 22.5 | 72.5 | 3.18 | 0 | 0 | Aluminum sulfate feed complete. | 0.0 | 0.0 | 0.0 | |
| 200 | 22.5 | 72.5 | 3.18 | 0 | 0 | Added sodium gluconate. | 0.0 | 0.0 | 0.0 | |
| 240 | 22.2 | 72.0 | 3.20 | 0 | 0 | Let solution mix over night. | 0.0 | 0.0 | 0.0 | |
| 1200 | 17.8 | 64.0 | — | — | — | Nov. 24, 2020 (20 hrs) Solution still cloudy. Began heating to 35° C. | | | | |
| 1220 | 17.8 | 64.0 | — | — | — | | | | | |
| 1340 | 35.6 | 96.1 | — | — | — | (22 hrs, 20 min) Solution still cloudy. Increased to 40° C. Let mix overnight. | | | | |
| 2520 | 40.2 | 104.4 | — | — | — | Nov. 25, 2020 (42 hrs) Solution clear. Let cool. | | | | |
| Average | 23.9 | 75.0 | 6.09 | | | | | | | |

TABLE 15

| | | | | | | | | | | | | Headspace | | | |
|---|---|---|---|---|---|---|---|---|---|---|---|---|---|---|---|
| | | | | UltraPAC 2549SG1 (45% Basic PAS) | | | Conversion Gallons | | | | Target | initial | Actual | | |
| | Working Examples MV-061 | | | | MV-061 | | 99.5099 | 14774.7 | | | 11.4 | 9.3 | 16.0 | 17.0 | |
| | Digest Temp. (° C.) | | | | Formulation | | Target | | | | Actual | | | | |
| Target | Overnight (° C.) | % $M_2O_3$ | % Basicity | Sp. Gr. | grams | % | Pounds | Gallons | % | Min. Gallons | Pounds | Gallons | % | | |
| 120.0 | Start Up Water | 0 | | 1.000 | 120.0 | 3.08 | 11,940 | 1,432 | 8.08 | 2,100 | 11,825 | 1418 | 8.00 | | |
| 3.00 | Sodicum Gluconate | | | | 3.00 | 0.20 | 300 | 36 | 0.20 | | 295 | 35 | 0.20 | | |
| 45.0 | Water (SA) | 0 | | 1.000 | 45.1 | 8.04 | 4,490 | 539 | 3.04 | 1,077 | 4,435 | 568 | 3.00 | | |
| 15.0 | Soda Ash | 0 | | NA | 15.1 | 1.02 | 1,505 | NA | 1.02 | | 1,480 | NA | 1.00 | | |
| 156.4 | 43% SAX | 22.99 | 148.6 | 1.520 | 156.6 | 10.54 | 15,585 | 1,230 | 10.54 | 1,768 | 15,410 | 1216 | 10.43 | % $Na_2O$ SAX | 19.41 |
| 1160.6 | Alun | 8.17 | 0.7 | 1.325 | 1160.3 | 78.11 | 115,460 | 10,452 | 78.11 | | 114,365 | 10353 | 77.37 | | |
| 0.00 | UP 290 | 16.91 | 42.2 | 1.370 | 0.0 | 0.00 | 0 | 0 | 0.00 | | 0 | 0 | 0.00 | % Cl UP 290 | 20.97 |
| 0.00 | $H_3PO_4$ (75%) | 0 | | 1.570 | 0.0 | 0.00 | 0 | 0 | 0.00 | | 0 | 0 | 0.00 | | |
| | flush Water | | | 1.000 | 0.00 | 0.00 | 0 | 0 | 0.00 | | 0 | 0 | 0.00 | | |
| 1500.0 | UltraPAC 2230 | 8.81 | 8.8 | 1.200 | 1500.1 | 100.99 | 149,275 | 14,921 | 100.99 | | 147,8.10 | 13,749 | 100.00 | | |
| | Check | | | | 1485.4 | 100.00% | 149,280 | | | 0 | 147,810 | 13,664 | 100.00% | | |
| | % SA soln | 25.1% | | 1.250 | 1,237.8 | 99.02% | 147,817 | −1,463 | | 147,810 | 0 | −85 | 100.00% | | |

| | Evaporation | | | % $Al_2O_3$ | % Basicity | % $SO_4$ | % Cl | $Cl/SO_4$ ratio | Cl + $SO_4$ | Na | Cl + $SO_4$ + Na |
|---|---|---|---|---|---|---|---|---|---|---|---|
| Expected | 0.0 | 0.00% | Evap. & $CO_2$ | 8.31% | 45.11 | 18.04 | 0.00 | 0.00 | 18.04 | 1.92 | 19.96 |
| Actual | 14.7 | 0.99% | Just $CO_2$ | 8.75% | | 17.92 | 0.00 | | 17.92 | 1.92 | 19.84 |

1. Add required amount of start up water to the reactor and start agitation.
2. Add the required amount of water into the soda ash mix vessel and start agitator.
3. Add required amount of sodium carbonate (soda ash) to the soda ash mix vessel and agitate until dissolved.
4. Add the required amount of 43% sodium aluminate solution Into the soda ash mix vessel.
5. Add the required amount of aluminum sulfate solution to the alum holding vessel.
6. Start addition of the aluminum solution to the reactor to lower pH to less than 4.
7. Stort addition of the sodium carbonate/sodium aluminate mixture to the reactor.
8. Adjust feed rates to add the solutions over desired time period maintaining the pH between 5.5 and 7.
9. When all of the sodium carbonate/sodium aluminate solution has been added let the pH fall below 5.
10. When the pH falls below S increase the aluminum sulfate feed rate.
11. When all of the aluminim sulfate solution addition is complete acid the sodium gluconate.
12. Lat solution mix until all solids have dissolved.

0.9541

0 0.00%

TABLE 15-continued

| Analysis: | Calculated | Actual |
|---|---|---|
| Specific Gravity | | |
| % $M_2O_3$ | | |
| % $Al_2O_3$ | 8.81 | −8.81 |
| % $Fe_2O_3$ | 0.00 | |
| % Basicity | 45.1 | −45.1 −15.3 |
| % Sulfates | 18.04 | |
| Turbidity, NTU | | |
| Viscosity, cps | | |

Precipitation observations and data

| Time (min) | Bulk slurry Temp. (° C.) | Bulk slurry Temp. (° F.) | Bulk slurry pH | Alum/ UP290 pump setting | $H_2O$/ SA/SAX pump setting | Comments | Alum pump rate (ml/min.) | $H_2O$/ SA/SAX pump rate (ml/min.) | Pump Ratio |
|---|---|---|---|---|---|---|---|---|---|
| 0 | 19.1 | 66.4 | 3.94 | 0.6 | 6 | Agitator @ 200 rpm. Started both feeds @ 12.50 pm. | 2.2 | 1.4 | 1.6 |
| 1 | 19.6 | 67.3 | 5.59 | 0.6 | 6 | Water/soda ash/sodium aluminate mixture at 35° C. | 2.2 | 1.4 | 1.6 |
| 2 | 20.0 | 68.0 | 6.41 | 0.6 | 6 | | 2.2 | 1.4 | 1.6 |
| 3 | 20.4 | 63.7 | 6.97 | 0.7 | 6 | | 2.6 | 1.4 | 1.8 |
| 4 | 20.8 | 69.4 | 6.84 | 0.7 | 6 | | 2.6 | 1.4 | 1.8 |
| 5 | 21.2 | 70.2 | 6.52 | 0.7 | 6 | | 2.6 | 1.4 | 1.8 |
| 6 | 21.5 | 70.7 | 6.30 | 0.6 | 6 | Agitator up to 250 rpm. | 2.2 | 1.4 | 1.6 |
| 7 | 21.7 | 71.1 | 6.60 | 0.6 | 6 | | 2.2 | 1.4 | 1.6 |
| 8 | 22.0 | 71.6 | 6.89 | 0.6 | 6 | | 2.2 | 1.4 | 1.6 |
| 9 | 22.3 | 72.1 | 7.08 | 0.7 | 6 | | 2.6 | 1.4 | 1.8 |
| 10 | 22.5 | 72.5 | 6.94 | 0.7 | 6 | | 2.6 | 1.4 | 1.8 |
| 11 | 22.7 | 72.9 | 6.68 | 0.7 | 6 | | 2.6 | 1.4 | 1.8 |
| 12 | 22.5 | 73.2 | 6.57 | 0.7 | 6 | | 2.6 | 1.4 | 1.8 |
| 13 | 23.1 | 73.6 | 6.45 | 0.7 | 6 | | 2.5 | 1.4 | 1.8 |
| 14 | 23.4 | 74.1 | 6.34 | 0.6 | 6 | | 2.2 | 1.4 | 1.6 |
| 15 | 23.5 | 74.3 | 6.48 | 0.6 | 6 | | 2.2 | 1.4 | 1.6 |
| 20 | 24.3 | 75.7 | 6.98 | 0.7 | 6 | Some crystals forming In water/soda ash/sodium aluminate mixture. increased heat to 40° C. | 2.6 | 1.4 | 1.8 |
| 25 | 24.8 | 76.6 | 5.54 | 0.6 | 6 | | 2.2 | 1.4 | 1.6 |
| 30 | 25.2 | 77.4 | 6.84 | 0.6 | 6 | More crystals forming in water/soda ash/sodium aluminate mixture. | 2.2 | 1.4 | 1.6 |
| 35 | 25.5 | 77.9 | 6.96 | 0.7 | 6 | Added 5 g water to the water/soda ash/sodium aluminate mixture. | 2.5 | 1.4 | 1.8 |
| 40 | 25.8 | 78.4 | 6.54 | 0.6 | 6 | | 2.2 | 1.4 | 1.6 |
| 45 | 25.9 | 78.6 | 6.45 | 0.6 | 6 | Water/soda ash/sodium: aluminate mixture feed complete. | 2.2 | 1.4 | 1.6 |
| 50 | 26.1 | 79.0 | 5.45 | 0.6 | 6 | Flushed several grams of water through water/soda ash/sodium aluminate mixture. Stopped alum feed. | 2.2 | 1.4 | 1.6 |
| 55 | 26.2 | 79.2 | 6.55 | 0.6 | 6 | Restarted alum feed. Crystals dissolving in water/soda ash/sodium aluminate mixture | 2.2 | 1.4 | 1.6 |
| 60 | 26.4 | 79.5 | 6.57 | 0.5 | 6 | | 2.2 | 1.4 | 1.6 |
| 65 | 26.5 | 79.7 | 6.59 | 0.6 | 6 | Still some small crystals in the water/soda ash/sodium aluminate mixture. | 2.2 | 1.4 | 1.6 |

TABLE 15-continued

| | | | | | | | | | | |
|---|---|---|---|---|---|---|---|---|---|---|
| 75 | 26.7 | 80.1 | 6.58 | 0.6 | 6 | | 2.2 | 1.4 | 1.6 | |
| 80 | 26.8 | 80.2 | 6.28 | 0 | 6 | Water/soda ash/sodium aluminate mixture feed line stopped up. Stopped alum feed. | 0.0 | 1.4 | 0.0 | |
| 82 | 26.9 | 80.4 | 6.62 | 0.6 | 6 | Water/soda ash/sodium aluminate mixture feed line cleared. Restarted alum feed. | 2.2 | 1.4 | 1.6 | 1.8 |
| 125 | 26.7 | 80.1 | 6.33 | 0.6 | 0 | Water/soda ash/sodium aluminate mixture feed complete. | 2.2 | 0.0 | 0.0 | |
| 135 | 25.7 | 78.3 | 4.99 | 3.5 | 0 | | 12.8 | 0.0 | 0.0 | |
| 195 | 22.8 | 73.0 | 3.27 | 0 | 0 | Aluminum sulfate feed complete. Added sodium gluconate. Let slurry mix overnight. | 0.0 | 0.0 | 0.0 | |
| 1245 | | | | | | Dec. 1, 2020 (20 hrs) Solution still cloudy. Began heating to 40° C. | | | | |
| 1680 | | | | | | Dec. 1, 2020 (27 hrs) Solution clear. Turned off heat and let cool. | | | | |
| | | | | | | Dec. 2, 2020 Due to lthe large amount of evaporation during heating added 120.0 g Di water to the reactor. | | | | |
| | | | | | | Dec. 7, 2020 A white percipitate has formed on the bottom of the stability study vial at ~5% by volume. | | | | |
| Average | 24.4 | 75.9 | 6.61 | | | | | | | |

TABLE 16

| | | | | | | | | | | | | | | | |
|---|---|---|---|---|---|---|---|---|---|---|---|---|---|---|---|
| | | | | | | | | | | | Headspace | | | | |
| | | | | UltraPAC 2549SG2 (45% Basic PAS) | | | Conversion Gallons | | | | Target | Initial | Actual | | |
| | Working Examples MV-064 | | | MV-064 | | | 101.4844 | 14774.7 | | | 11.4 | 5.0 | 16.0 | 3.8 | |
| | Digest Temp. (° C.) | | | | Formulation | | Target | | | | Actual | | | | |
| Target | Overnight (° C.) | % $M_2O_3$ | % Basicity | Sp. Gr. | grams | % | Pounds | Gallons | % | Min. Gallons | Pounds | Gallons | % | | |
| 120.0 | Start Up Water | 0 | | 1.000 | 120.0 | 8.24 | 12,180 | 1,461 | 8.24 | 2,100 | 12,180 | 1461 | 7.77 | | |
| 3.00 | Sodicum Gluconate | | | NA | 3.00 | 0.21 | 305 | 37 | 0.21 | | 305 | 37 | 0.19 | | |
| 90.0 | Water (SA) | 0 | | 1.000 | 90.2 | 6.19 | 9,155 | 1,098 | 6.19 | 2,196 | 9,155 | 1172 | 5.84 | | |
| 30.0 | Soda Ash | 0 | | NA | 30.1 | 2.07 | 3,055 | NA | 2.07 | | 3,055 | NA | 1.95 | | |
| 130.9 | 43% SAX | 22.99 | 148.6 | 1.520 | 131.2 | 9.01 | 13,315 | 1,051 | 9.01 | 2,149 | 13,315 | 1051 | 8.49 | % $Na_2O$ SAX | 19.41 |
| 1126.1 | Alum | 8.17 | 0.7 | 1.325 | 1126.2 | 77.32 | 114,290 | 10,346 | 77.32 | | 114,290 | 10346 | 72.90 | | |
| 0.00 | UP 290 | 16.91 | 42.2 | 1.370 | 0.0 | 0.00 | 0 | 0 | 0.00 | | 0 | 0 | 0.00 | % Cl UP 290 | 20.97 |
| 0.00 | $H_3PO_4$ (75%) | 0 | | 1.570 | 0.0 | 0.00 | 0 | 0 | 0.00 | | 0 | 0 | 0.00 | | |
| | Flush Water | | | 1.000 | 0.00 | 0.00 | 0 | 0 | 0.00 | | 0 | 0 | 0.00 | | |
| 1500.0 | UltraPAC 2230 | 8.39 | 8.4 | 1.200 | 1500.7 | 103.04 | 152,300 | 15,223 | 103.03 | | 152,300 | 13,749 | 97.14 | | |
| | Check | | | | 1456.5 | 100.01% | 152,300 | | | 148,828 | 156,786 | 14,757 | 100.00% | | |
| | % SA soln | 25.0% | | 1.249 | 1,213.8 | 97.05% | 147,814 | −4,486 | | 7,958 | 4,486 | 1,009 | 102.95% | | |

| | Evaporation | | | % $Al_2O_3$ | % Basicity | % $SO_4$ | % Cl | Cl/$SO_4$ ratio | Cl + $SO_4$ | Na | Cl + $SO_4$ + Na |
|---|---|---|---|---|---|---|---|---|---|---|---|
| Expected | 0.0 | 0.00% | Evap. & $CO_2$ | 8.39% | 45.1 | 17.85 | 0.00 | 0.00 | 17.85 | 2.15 | 20.00 |
| Actual | 44.2 | 3.03% | Just $CO_2$ | 8.19% | | 17.44 | 0.00 | | 17,44 | 2.15 | 19.59 |

1. Add required amount of start up water to the reactor and start agitation. 0.9541
2. Add the required amount of water into the soda ash mix vessel and start agitator. −4486 −2.86%
3. Add required amount of sodium carbonate (soda ash) to the soda ash mix vessel and agitate until dissolved.
4. Add the required amount of 43% sodium aluminate solution into the soda ash mix vessel.
5. Add the required amount of aluminum sulfate solution to the alum holding vessel.
6. Start addition of the aluminum solution to the reactor to lower pH to less than 4.
7. Start addition of the sodium carbonate/sodium aluminate mixture to the reactor.
8. Adjust feed rates to add the solutions over desired time period maintaining the pH between 5.5 and 7.
9. When all of the sodium carbonate/sodium aluminate solution has been added let the pH fall below 5.
10. When the pH falls below 5 increase the aluminum sulfate feed rate.
11. When all of the aluminim sulfate solution addition is complete add the sodium gluconate.
12. Let solution mix until all solids have dissolved.

| Analysis: | Calculated | Actual | |
|---|---|---|---|
| Specific Gravity | | 1.2984 | |
| % $M_2O_3$ | | | |
| % $Al_2O_3$ | 8.39 | 8.46 | 0.07 |
| % $Fe_2O_3$ | 0.00 | | |
| % Basicity | 45.1 | 48.0 | 2.9 160.3 |
| % Sulfates | 17.85 | | |
| Turbidity, NTU | | 2.4 | |
| Viscosity, cps | | 13.3 | |

TABLE 16-continued

| Precipitation observations and data | | | | | | | | | | |
|---|---|---|---|---|---|---|---|---|---|---|
| Time (min) | Bulk slurry Temp. (° C.) | Bulk slurry Temp. (° F.) | Bulk slurry pH | Alum/ UP290 pump setting | $H_2O$/ SA/SAX pump setting | Comments | Alum pump rate (ml/min.) | $H_2O$/ SA/SAX pump rate (ml/min.) | Pump Ratio | |
| 0 | 21.5 | 70.7 | 3.69 | 0.6 | 6 | Agitator @ 200 rpm. Started both feeds @ 1:00 pm. | 2.2 | 1.4 | 1.6 | |
| 1 | 21.7 | 71.1 | 5.50 | 0.6 | 6 | | 2.2 | 1.4 | 1.6 | |
| 2 | 21.9 | 71.4 | 5.69 | 0.6 | 6 | | 2.2 | 1.4 | 1.6 | |
| 3 | 22.2 | 72.0 | 5.66 | 0.6 | 7 | | 2.2 | 1.6 | 1.4 | |
| 4 | 22.5 | 72.5 | 6.02 | 0.6 | 7 | | 2.2 | 1.6 | 1.4 | |
| 5 | 22.7 | 72.9 | 6.24 | 0.6 | 7 | | 2.2 | 1.6 | 1.4 | |
| 6 | 23.0 | 73.4 | 6.42 | 0.6 | 7 | | 2.2 | 1.6 | 1.4 | |
| 7 | 23.2 | 73.8 | 6.58 | 0.6 | 7 | | 2.2 | 1.6 | 1.4 | |
| 8 | 23.4 | 74.1 | 6.68 | 0.6 | 7 | | 2.2 | 1.6 | 1.4 | |
| 9 | 23.6 | 74.5 | 6.77 | 0.6 | 7 | | 2.2 | 1.6 | 1.4 | |
| 10 | 23.8 | 74.8 | 6.83 | 0.6 | 7 | | 2.2 | 1.6 | 1.4 | |
| 15 | 24.6 | 76.3 | 6.99 | 0.7 | 7 | | 2.6 | 1.6 | 1.6 | |
| 20 | 25.3 | 77.5 | 6.35 | 0.7 | 7 | | 2.6 | 1.6 | 1.6 | |
| 25 | 25.4 | 77.7 | 6.59 | 0.7 | 8 | | 2.6 | 1.8 | 1.4 | |
| 30 | 26.4 | 79.5 | 6.65 | 0.7 | 8 | Sodium aluminate feed complete. | 2.6 | 1.8 | 1.4 | |
| 40 | 27.2 | 81.0 | 6.71 | 0.7 | 8 | | 2.6 | 1.8 | 1.4 | |
| 60 | 28.3 | 82.9 | 6.76 | 0.7 | 8 | | 2.6 | 1.8 | 1.4 | |
| 80 | 28.8 | 83.8 | 6.82 | 0.7 | 8 | | 2.6 | 1.8 | 1.4 | 1.4 |
| 98 | 29.0 | 84.2 | 6.90 | 0.7 | 0 | Water/soda ash/sodium aluminate mixture feed complete. | 2.6 | 0.0 | 0.0 | |
| 100 | 29.0 | 84.2 | 6.48 | 0.7 | 0 | | 2.6 | 0.0 | 0.0 | |
| 115 | 26.6 | 79.9 | 4.78 | 4.8 | 0 | | 17.1 | 0.0 | 0.0 | |
| 160 | 24.0 | 75.2 | 3.38 | 0 | 0 | Aluminum sulfate feed complete. Added sodium gluconate. | 0.0 | 0.0 | 0.0 | |
| 320 | 23.8 | 74.8 | 3.41 | 0 | 0 | Let slurry mix overnight. | 0.0 | 0.0 | 0.0 | |
| | | | | | | Dec. 4, 2020 (19.5 hrs) Solution mostly clear. | 0.0 | 0.0 | 0.0 | |
| Average | 25.5 | 78.0 | 6.66 | | | | | | | |

TABLE 17

| Target | Overnight (° C.) | % $M_2O_3$ | % Basicity | Sp. Gr. | grams | % | Pounds | Gallons | % | Min. Gallons | Pounds | Gallons | % | | |
|---|---|---|---|---|---|---|---|---|---|---|---|---|---|---|---|
| | | | | | | | | | | | | Headspace | | | |
| | | | | UltraPAC 23615G2 (50% Basic PAS) | | | Conversion Gallons | | | | Target | Initial | Actual | | |
| | Working Examples MV-067 | | | MV-067 | | | 104.0051 | 14774.7 | | | 11.4 | −1.5 | 16.0 | 15.7 | |
| | Digest Temp. (° C.) | | | | Formulation | | Target | | | | Actual | | | | |
| 120.0 | Start Up Water | 0 | | 1.000 | 120.0 | 8.44 | 12,480 | 1,497 | 8.44 | 2,100 | 11,825 | 1418 | 8.00 | | |
| 3.00 | Sodicum Gluconate | | | 1.581 | 3.00 | 0.21 | 310 | 37 | 0.21 | 187 | 295 | 35 | 0.20 | | |
| 90.0 | Water (SA) | 0 | | 1.000 | 90.2 | 6.35 | 9,380 | 2,125 | 6.35 | 2,250 | 8,870 | 1135 | 6.60 | | |
| 30.0 | Soda Ash | 0 | | NA | 30.1 | 2.12 | 3,130 | NA | 2.12 | | 2,955 | NA | 2.00 | | |
| 155.0 | 13% SAX | 22.99 | 148.6 | 1.520 | 155.1 | 10.91 | 16,130 | 3,273 | 10.91 | 2,398 | 15,275 | 1205 | 10.33 | % $Na_2O$ SAX | 19.41 |
| 1102.0 | Alum | 8.18 | 0.71 | 1.325 | 1109.8 | 78.09 | 115,425 | 10,449 | 78.05 | | 108,595 | 9831 | 23.47 | | |
| 0.0 | UP 290 | 16.91 | 31.8 | 1.370 | 0.0 | 0.00 | 0 | 0 | 0.00 | | | | 0.00 | % Cl UP 290 | 20.97 |
| 0.0 | $H_3PO_4$ (75%) | 0 | | 1.570 | 0.0 | 0.00 | 0 | 0 | 0.00 | | 0 | 0 | 0.00 | | |
| 0.00 | Flush Water | | | 1.000 | 0.00 | 0.00 | 0 | 0 | 0.00 | | 0 | C | 0.00 | | |
| 1500.0 | UltraPAC 2230 | 8.90 | 8.9 | 1.200 | 1508.2 | 106.12 | 156,860 | 15,679 | 106.12 | | 147,815 | 13,749 | 100.00 | | |
| | Check | | | | 1421.2 | 100.00% | 156,855 | | | 149,928 | 147,815 | 13,773 | 100.00% | | |
| | % SA soln | 25.0% | | 1.249 | 1,184.3 | 94.23% | 147,807 | −9,048 | | −2,113 | 0 | 2.4 | 100.00% | | |

| | Evaporation | | | % $Al_2O_3$ | % Basicity | % $SO_4$ | % Cl | Cl/$SO_4$ ratio | Cl + $SO_4$ | Na | Cl + $SO_4$ + Na |
|---|---|---|---|---|---|---|---|---|---|---|---|
| Expected | 0.0 | 0.00% | Evap. & $CO_2$ | 8.90% | 50.1 | 18.05 | 0.80 | 0.00 | 18.05 | 2.44 | 20.49 |
| Actual | 87.0 | 6.12% | Just $CO_2$ | 8.44% | | 17.12 | 0.00 | | 17.12 | 2.44 | 19.56 |

1. Add required amount of start up water to the reactor and start agitation. 0.9541
2. Add the required amount of water into the soda ash mix vessel and start agitator. 0 0.00%
3. Add required amount of sodium carbonate (soda ash) to the soda ash mix vessel and agitate until dissolved.
4. Add the required amount of 43% sodium aluminate solution into the soda ash mix vessel.
5. Add the required amount of aluminum sulfate solution to the alum holding vessel.
6. Start addition of the aluminum solution to the reactor to lower pH to less than 4.
7. Start addition of the sodium carbonate/sodium aluminate mixture to the reactor.
8. Adjust feed rates to add the solutions over desired time period maintaining the pH between 5.5 and 7.
9. When all of the sodium carbonate/sodium: aluminate solution has been added let the pH fall below 5.
10. When the pH falls below 5 increase the aluminum sulfate feed rate.
11. When all of the aluminim sulfate solution addition is complete add the sodium gluconate.
12. Let solution mix until all solids have dissolved.

| Analysis: | Calculated | Actual | |
|---|---|---|---|
| Specific Gravity | | 1.3080 | |
| % $M_2O_3$ | | | |
| % $Al_2O_3$ | 8.90 | 8.84 | −0.06 |
| % $Fe_2O_3$ | 0.00 | | |
| % Basicity | 50.1 | 52.9 | 2.8 158.7 |
| % Sulfates | 18.05 | | |
| Turbidity, NTU | | 3.4 | |
| Viscosity, cps | | 12.9 | |

TABLE 17-continued

| Precipitation observations and data | | | | | | | | | | |
|---|---|---|---|---|---|---|---|---|---|---|
| Time (min) | Bulk slurry Temp. (° C.) | Bulk slurry Temp. (° F.) | Bulk slurry pH | Alum/ UP290 pump setting | $H_2O$/ SA/SAX pump setting | Comments | Alum pump rate (ml/min.) | $H_2O$/ SA/SAX pump rate (ml/min.) | Pump Ratio | |
| 0 | 21.0 | 69.8 | 3.73 | 0.6 | 6 | Agitator @ 200 rpm. Started both feeds @ 1:30 pm. | 2.2 | 1.4 | 1.6 | |
| 1 | 21.3 | 70.3 | 5.24 | 0.6 | 6 | | 2.2 | 1.4 | 1.6 | |
| 2 | 21.6 | 70.9 | 5.58 | 0.6 | 6 | | 2.2 | 1.4 | 1.6 | |
| 3 | 22.0 | 71.6 | 5.75 | 0.6 | 6 | | 2.2 | 1.4 | 1.8 | |
| 4 | 22.3 | 72.1 | 5.85 | 0.6 | 6 | | 2.2 | 1.4 | 1.6 | |
| 5 | 22.5 | 72.5 | 5.94 | 0.6 | 6 | | 2.2 | 1.4 | 1.6 | |
| 6 | 22.7 | 72.9 | 5.98 | 0.6 | 6 | | 2.2 | 1.4 | 1.6 | |
| 7 | 22.9 | 73.2 | 5.02 | 0.6 | 7 | | 2.2 | 1.6 | 1.4 | |
| 8 | 23.2 | 73.8 | 6.22 | 0.6 | 7 | | 2.2 | 1.6 | 1.4 | |
| 9 | 23.5 | 74.3 | 6.47 | 0.6 | 7 | | 2.2 | 1.6 | 1.4 | |
| 10 | 23.1 | 74.7 | 5.68 | 0.6 | 7 | | 2.2 | 1.6 | 1.4 | |
| 11 | 23.9 | 75.0 | 6.87 | 0.6 | 7 | | 2.2 | 1.6 | 1.4 | |
| 12 | 24.1 | 75.4 | 6.96 | 0.6 | 6 | | 2.2 | 1.4 | 1.6 | |
| 13 | 24.2 | 75.6 | 6.90 | 0.6 | 6 | | 2.2 | 1.4 | 1.6 | |
| 14 | 24.4 | 75.9 | 6.74 | 0.6 | 6 | | 2.2 | 1.4 | 1.6 | |
| 15 | 24.5 | 76.1 | 6.65 | 0.6 | 6 | | 2.2 | 1.4 | 1.6 | |
| 20 | 25.0 | 77.0 | 6.34 | 0.6 | 7 | | 2.2 | 1.6 | 1.4 | |
| 25 | 25.6 | 78.1 | 6.76 | 0.6 | 7 | | 2.2 | 1.6 | 1.4 | |
| 30 | 26.1 | 79.0 | 7.01 | 0.7 | 7 | | 2.6 | 1.6 | 1.6 | |
| 40 | 26.9 | 80.4 | 6.48 | 0.7 | 8 | | 2.6 | 1.8 | 1.4 | |
| 50 | 27.7 | 81.9 | 6.85 | 0.7 | 8 | | 2.6 | 1.8 | 1.4 | |
| 60 | 28.3 | 82.0 | 6.98 | 0.7 | 7 | | 2.6 | 1.6 | 1.6 | |
| 70 | 28.5 | 83.3 | 6.69 | 0.7 | 7 | | 2.6 | 1.6 | 1.6 | |
| 80 | 28.6 | 83.5 | 6.52 | 0.7 | 8 | | 2.6 | 1.8 | 1.4 | |
| 90 | 28.9 | 84.0 | 6.74 | 0.7 | 8 | | 2.6 | 1.8 | 1.4 | |
| 100 | 29.1 | 84.4 | 6.87 | 0.7 | 8 | | 2.6 | 1.8 | 1.4 | |
| 110 | 29.3 | 84.7 | 6.97 | 0.7 | 8 | | 2.6 | 1.8 | 1.4 | 1.5 |
| 114 | 29.3 | 84.7 | 7.01 | 0.7 | 0 | Water/soda ash/sodium aluminate mixture feed complete. | 2.6 | 0.0 | 0.0 | |
| 135 | 26.5 | 79.7 | 4.69 | 4.8 | 0 | Aluminum sulfate feed complete. | 17.1 | 0.0 | 0.0 | |
| 175 | 24.2 | 75.6 | 3.43 | 0 | 0 | Added sodium gluconate | 0.0 | 0.0 | 0.0 | |
| 185 | 24.1 | 75.4 | 3.49 | 0 | 0 | | 0.0 | 0.0 | 0.0 | |
| 190 | 24.0 | 75.2 | 3.44 | 0 | 0 | Let slurry mix overnight. | 0.0 | 0.0 | 0.0 | |
| 1170 | 22.3 | 72.1 | | | | Dec. 8, 2020 (19.5 hrs) Solution still cloudy. Set heat at 35° C. Reactor gross weight 2273.5 g. | | | | |
| 1230 | 35.7 | 96.3 | | | | Solution clearing. | | | | |
| 1500 | 35.6 | 96.1 | | | | (25 hrs) Solution clear. Turned off heat and let cool. | | | | |
| Average | 25.7 | 78.2 | 6.64 | | | | | | | |

TABLE 18

| | | | | | | | | | | | Headspace | | | | |
|---|---|---|---|---|---|---|---|---|---|---|---|---|---|---|---|
| | | | | UltraPAC 2361562.5 (50% Basic PAS)} | | | Conversion Gallons | | | | Target | Initial | Actual | | |
| | Working Examples MV-070 | | | | MV-070 | | 101.2688 | 14774.7 | | | 11.4 | 5.5 | 16.0 | 16.2 | |
| | Digest Temp. (° C.) | | | | Formulation | | Target | | | | Actual | | | | |
| Target | Overnight (° C.) | % $M_2O_3$ | % Basicity | Sp. Gr. | grams | % | Pounds | Gallons | % | Min. Gallons | Pounds | Gallons | % | | |
| 120.0 | Start Up Water | 0 | | 1.000 | 120.0 | 8.22 | 12,150 | 1,457 | 8.22 | 2,100 | 12,150 | 1457 | 8.22 | | |
| 3.00 | Sodicum Gluconate | | | 1.581 | 3.00 | 0.21 | 305 | 37 | 0.21 | 193 | 305 | 37 | 0.21 | | |
| 112.5 | Water (SA) | 0 | | 1.000 | 112.5 | 7.71 | 11,395 | 1,367 | 7.71 | 2,734 | 11,395 | 1459 | 7.71 | | |
| 37.5 | Soda Ash | 0 | | NA | 37.5 | 2.57 | 3,800 | NA | 2.57 | | 3,800 | NA | 2.57 | | |
| 141.0 | 43% SAX | 22.99 | 148.6 | 1.520 | 141.0 | 9.66 | 14,280 | 1,127 | 9.6 | 2,494 | 14,280 | 1127 | 9.66 | % $Na_2O$ SAX | 19.41 |
| 1086.0 | Alum | 8.18 | 0.71 | 1.325 | 1086.0 | 74.40 | 109,980 | 9,956 | 74.40 | | 109,980 | 9956 | 74.40 | | |
| 0.00 | UP 290 | 16.91 | 41.8 | 1.370 | 0.0 | 0.00 | 0 | 0 | 0.00 | | 0 | 0 | 0.00 | % Cl UP 290 | 20.97 |
| 0.00 | $H_3PO_4$ (75%) | 0 | | 1.570 | 0.0 | 0.00 | 0 | 0 | 0.00 | | 0 | 0 | 0.00 | | |
| 0.00 | Flush Water | | | 1.000 | 0.00 | 0.00 | 0 | 0 | 0.00 | | 0 | 0 | 0.00 | | |
| 1500.0 | UltraPAC 2230 | 8.31 | 8.3 | 1.200 | 1500.0 | 102.77 | 151,905 | 15,184 | 102.77 | | 151,910 | 13,749 | 102.77 | | |
| | Check | | | | 1459.6 | 100.00% | 151,910 | | | 147,979 | 147,819 | 13,735 | 100.00% | | |
| | % SA soln | 25.0% | | 1.249 | 1,216.3 | 97.31% | 147,819 | −4,091 | | −160 | −4,091 | −14 | 97.31% | | |

| Evaporation | | | | % $Al_2O_3$ | % Basicity | % $SO_4$ | % Cl | $Cl/SO_4$ ratio | Cl + $SO_4$ | Na | Cl + $SO_4$ + Na |
|---|---|---|---|---|---|---|---|---|---|---|---|
| Expected | 0.0 | 0.00% | Evap. & $CO_2$ | 8.31% | 50.2 | 17.20 | 0.00 | 0.00 | 17.20 | 2.45 | 19.66 |
| Actual | 40.4 | 2.77% | Just $CO_2$ | 8.15% | | 16.87 | 0.00 | | 16.87 | 2.45 | 19.32 |

1. Add required amount of start tip water to the reactor and start agitation.
2. Add the required amount of water into the soda ash mix vessel and start agitator.
3. Add required amount of sodium carbonate (soda ash) to the soda ash mix vessel and agitate until dissolved.
4. Add the required amount of 43% sodium aluminate solution Into the soda ash mix vessel.
5. Add the required amount of aluminum sulfate solution to the alum holding vessel.
6. Start addition of the aluminum solution to the reactor to lower pH to less than 4.
7. Start addition of the sodium carbonate/sodium aluminate mixture to the reactor.
8. Adjust feed rates to add the solutions over desired time period maintaining the pH between 5.5 and 7.
9. When all of the sodium carbonate/sodium aluminate solution has been added let the pH fall below 5.
10. When the pH falls below 5 increase the aluminum sulfate feed rate.
11. When all of the aluminim sulfate solution addition is complete add the sodium gluconate.
12. Let solution mix until all solids have dissolved.

0.9541 4091 2.77%

| Analysis: | Calculated | Actual | |
|---|---|---|---|
| Specific Gravity | | 1.291 | |
| % $M_2O_3$ | | | |
| % $Al_2O_3$ | 8.31 | 8.30 | −0.01 |
| % $Fe_2O_3$ | 0.00 | | |
| % Basicity | 50.2 | 52.4 | 2.2 157.0 |
| % Sulfates | 17.20 | | |
| Turbidity, NTU | | 12.6 | |
| Viscosity, cps | | | |

TABLE 18-continued

| Precipitation observations and data | | | | | | | | | | |
|---|---|---|---|---|---|---|---|---|---|---|
| Time (min) | Bulk slurry Temp. (° C.) | Bulk slurry Temp. (° F.) | Bulk slurry pH | Alum/ UP290 pump setting | $H_2O$/ SA/SAX pump setting | Comments | Alum pump rate (ml/min.) | $H_2O$/ SA/SAX pump rate (ml/min.) | Pump Ratio | |
| 0 | 21.5 | 70.7 | 3.67 | 0.6 | 6 | Agitator @ 200 rpm. Started both feeds @ 2:00 pm. | 2.2 | 1.4 | 1.6 | |
| 1 | 21.6 | 70.9 | 5.07 | 0.6 | 7 | | 2.2 | 1.6 | 1.4 | |
| 2 | 21.8 | 71.2 | 5.14 | 0.6 | 7 | | 2.2 | 1.6 | 1.4 | |
| 3 | 22.1 | 71.8 | 5.58 | 0.6 | 8 | | 2.2 | 1.8 | 1.2 | |
| 4 | 22.5 | 72.5 | 6.23 | 0.6 | 8 | | 2.2 | 1.8 | 1.2 | |
| 5 | 22.8 | 73.0 | 6.72 | 0.6 | 8 | | 2.2 | 1.8 | 1.2 | |
| 6 | 23.0 | 73.4 | 7.07 | 0.7 | 8 | | 2.6 | 1.8 | 1.4 | |
| 7 | 23.2 | 73.8 | 6.86 | 0.7 | 8 | | 2.6 | 1.8 | 1.4 | |
| 8 | 23.5 | 74.3 | 6.72 | 0.7 | 8 | | 2.6 | 1.8 | 1.4 | |
| 9 | 23.6 | 74.5 | 6.53 | 0.7 | 9 | | 2.6 | 2.0 | 1.3 | |
| 10 | 23.8 | 74.8 | 5.70 | 0.7 | 9 | | 2.6 | 2.0 | 1.3 | |
| 11 | 24.0 | 75.2 | 6.89 | 0.7 | 9 | | 2.6 | 2.0 | 1.3 | |
| 12 | 24.2 | 75.6 | 6.93 | 0.7 | 9 | | 2.6 | 2.0 | 1.3 | |
| 13 | 24.4 | 75.9 | 7.05 | 0.8 | 9 | | 2.9 | 2.0 | 1.5 | |
| 14 | 24.5 | 76.1 | 6.93 | 0.8 | 9 | | 2.9 | 2.0 | 1.5 | |
| 15 | 24.6 | 76.3 | 6.78 | 1.6 | 20 | | 5.8 | 4.2 | 1.4 | |
| 16 | 25.0 | 77.0 | 6.46 | 1.6 | 20 | | 5.8 | 4.2 | 1.4 | |
| 17 | 25.5 | 77.9 | 6.60 | 1.6 | 20 | | 5.8 | 4.2 | 1.4 | |
| 18 | 26.0 | 78.8 | 6.68 | 1.6 | 20 | | 5.8 | 4.2 | 1.4 | |
| 19 | 26.4 | 79.5 | 6.80 | 1.6 | 20 | | 5.8 | 4.2 | 1.4 | |
| 20 | 26.8 | 80.2 | 6.86 | 1.6 | 20 | | 5.8 | 4.2 | 1.4 | |
| 35 | 30.1 | 86.2 | 6.90 | 1.6 | 20 | | 5.8 | 4.2 | 1.4 | |
| 50 | 31.4 | 88.5 | 6.96 | 1.6 | 20 | | 5.8 | 4.2 | 1.4 | 1.4 |
| 56 | 31.4 | 88.5 | 6.96 | 1.6 | 0 | Water/soda ash/sodium aluminate mixture feed complete. | 5.8 | 0.0 | 0.0 | |
| 63 | 29.1 | 84.4 | 5.08 | 4.2 | 0 | | 15.0 | 0.0 | 0.0 | |
| 104 | 29.1 | 84.4 | 3.50 | 0 | 0 | Aluminum sulfate feed complete. Addled sodium gluconate | 0.0 | 0.0 | 0.0 | |
| 110 | 24.6 | 76.3 | 3.50 | 0 | 0 | Let slurry mix overnight. | 0.0 | 0.0 | 0.0 | |
| 1065 | — | — | — | — | — | Dec. 10, 2020 (18 hrs) Solution clear. Filtered solution through #41 Whatman paper. | | | | |
| Average | 25.8 | 78.4 | 6.81 | | | | | | | |

TABLE 19

| | | | | | | | | | | | | | | | |
|---|---|---|---|---|---|---|---|---|---|---|---|---|---|---|---|
| | | | | | | | | | | | Headspace | | | | |
| | | | | | UltraPAC 22865G2.75 (55% Basic PAS) | | Conversion Gallons | | | | Target | Initial | Actual | | |
| | Working Examples MY-073 | | | MV-073 | | | 97.0532 | 14774.7 | | | 11.4 | 0.6 | 16.0 | 5.6 | |
| | Digest Temp. (° C.) | | | | Formulation | | Target | | | | Actual | | | | |
| Target | Overnight (° C.) | % $M_2O_3$ | % Basicity | Sp. Gr. | grams | % | Pounds | Gallons | % | Min. Gallons | Pounds | Gallons | % | | |
| 120.0 | Start Up Water | 0 | | 1.000 | 120.0 | 7.88 | 11,645 | 1,397 | 7.88 | 2,100 | 12,475 | 1496 | 8.00 | | |
| 3.00 | Sodicum Gluconate | | | 1.582 | 3.00 | 0.20 | 290 | 35 | 0.20 | 196 | 310 | 37 | 0.20 | | |
| 124.0 | Water (SA) | 0 | | 1.000 | 124.2 | 8.15 | 12,055 | 1,446 | 8.1 | 2,892 | 12,890 | 1650 | 8.27 | | |
| 41.3 | Soda Ash | 0 | | NA | 41.4 | 2.72 | 4,020 | NA | 2.72 | | 4,295 | NA | 2.75 | | |
| 156.5 | 43% SAX | 22.99 | 148.6 | 1.520 | 156.6 | 10.28 | 15,200 | 1,199 | 10.28 | 2,645 | 16,270 | 128 | 10.43 | % $Na_2O$ SAX | 19.41 |
| 1055.2 | Alum | 8.18 | 0.71 | 1.325 | 1155.8 | 75.89 | 112.175 | 10,155 | 75.89 | | 109,685 | 9929 | 70.34 | | |
| 0.0 | UP 290 | 16.91 | 41.8 | 1.370 | 0.0 | 0.00 | 0 | 0 | 0.00 | | 0 | 0 | 0.00 | % Cl UP 290 | 20.97 |
| 0.0 | $H_3PO_4$ (75%) | 0 | | 1.570 | 0.0 | 0.00 | 0 | 0 | 0.00 | | 0 | 0 | 0.00 | | |
| | Flush Water | | | 1.000 | 0.00 | 0.00 | 0 | 0 | 0.00 | | 0 | 0 | 0.00 | | |
| 1500.0 | UltraPAC 2230 | 8.57 | 8.6 | 1.200 | 1601.0 | 105.12 | 155,380 | 15,531 | 105.12 | | 155,925 | 13,749 | 100.00 | | |
| | Check | | | | 1523.0 | 100.00% | 155,385 | | | 149,194 | 155,925 | 14,611 | 100.00% | | |
| | % SA soln | 23.0% | | 1.249 | 1,269.2 | 95.13% | 147,815 | −7,570 | | 6,731 | 0 | 863 | 100.00% | | |

| | Evaporation | | | % $Al_2O_3$ | % Basicity | % $SO_4$ | % Cl | Cl/$SO_4$ ratio | Cl + $SO_4$ | Na | Cl + $SO_4$ + Na |
|---|---|---|---|---|---|---|---|---|---|---|---|
| Expected | 0.0 | 0.00% | Evap. & $CO_2$ | 8.57% | 51.7 | 17.55 | 0.00 | 0.00 | 17.55 | 2.60 | 20.15 |
| Actual | 78.0 | 5.12% | Just $CO_2$ | 8.22% | | 16.83 | 0.00 | | 16.83 | 2.60 | 19.43 |

1. Add required amount of start up water to the reactor and start agitation.
2. Add the required amount of water into the soda ash mix vessel and start agitator.
3. Add required amount of sodium carbonate (soda ash) to the soda ash mix vessel and agitate until dissolved.
4. Add the required amount of 43% sodium aluminate solution into the soda ash mix vessel.
5. Add the required amount of aluminum sulfate solution to the alum holding vessel.
6. Start addition of the aluminum solution to the reactor to lower pH to less than 4.
7. Start addition of the sodium carbonate/sodium aluminate mixture to the reactor.
8. Adjust feed rates to add the solutions over desired time period maintaining the pH between 5.5 and 7.
9. When all of the sodium carbonate/sodium aluminate solution has been added let the pH fall below 5.
10. When the pH falls below 5 increase the aluminum sulfate feed rate.
11. When all of the aluminim sulfate solution addition is complete add the sodium gluconate.
12. Let solution mix until all solids have dissolved.

0.9541
0 0.00%

| Analysis: | Calculated | Actual | |
|---|---|---|---|
| Specific Gravity | | 1.3016 | |
| % $M_2O_3$ | | | |
| % $Al_2O_3$ | 8.57 | 8.56 | −0.01 |
| % $Fe_2O_3$ | 0.00 | | |
| % Basicity | 51.7 | 54.0 | 2.3 157.1 |
| % Sulfates | 17.55 | | |
| Turbidity, NTU | | 2.7 | |
| Viscosity, cps | | 12.9 | |

TABLE 19-continued

| Precipitation observations and data | | | | | | | | | | |
|---|---|---|---|---|---|---|---|---|---|---|
| Time (min) | Bulk slurry Temp. (° C.) | Bulk slurry Temp. (° F.) | Bulk slurry pH | Alum/ UP290 pump setting | $H_2O$/ SA/SAX pump setting | Comments | Alum pump rate (ml/min.) | $H_2O$/ SA/SAX pump rate (ml/min.) | Pump Ratio | |
| 0 | 20.9 | 69.6 | 3.94 | 0.6 | 6 | Agitator @ 200 rpm. Started both feeds @ 2:50 pm. | 2.2 | 1.4 | 1.6 | |
| 1 | 21.2 | 70.2 | 4.93 | 0.6 | 6 | | 2.2 | 1.4 | 1.6 | |
| 4 | 22.0 | 71.6 | 5.39 | 0.6 | 6 | | 2.2 | 1.4 | 1.6 | |
| 5 | 22.2 | 72.0 | 5.47 | 0.6 | 7 | | 2.2 | 1.6 | 1.4 | |
| 6 | 22.4 | 72.3 | 5.47 | 0.6 | 7 | | 2.2 | 1.5 | 1.4 | |
| 7 | 22.8 | 73.0 | 5.65 | 0.6 | 7 | | 2.2 | 1.6 | 1.4 | |
| 9 | 23.4 | 74.1 | 5.97 | 0.6 | 7 | | 2.2 | 1.6 | 1.4 | |
| 10 | 23.7 | 24.7 | 6.05 | 0.6 | 7 | | 2.2 | 1.5 | 1.4 | |
| 12 | 24.2 | 75.6 | 6.18 | 0.6 | 7 | | 2.2 | 1.6 | 1.4 | |
| 14 | 24.5 | 76.1 | 6.29 | 0.6 | 8 | | 2.2 | 1.8 | 1.2 | |
| 16 | 24.8 | 76.6 | 6.30 | 0.6 | 8 | | 2.2 | 1.8 | 1.2 | |
| 18 | 25.1 | 77.2 | 6.59 | 0.6 | 8 | | 2.2 | 1.8 | 1.2 | |
| 20 | 25.2 | 77.4 | 6.82 | 0.6 | 8 | | 2.2 | 1.8 | 1.2 | |
| 25 | 25.8 | 78.4 | 7.19 | 0.7 | 8 | | 2.6 | 1.8 | 1.4 | |
| 30 | 26.3 | 79.3 | 6.87 | 0.7 | 8 | | 2.6 | 1.8 | 1.4 | |
| 35 | 26.6 | 79.9 | 6.67 | 0.7 | 8 | | 2.6 | 1.8 | 1.4 | |
| 40 | 26.9 | 80.4 | 6.58 | 0.7 | 8 | | 2.6 | 1.8 | 1.4 | |
| 45 | 27.7 | 81.9 | 6.50 | 0.7 | 8 | | 2.6 | 1.8 | 1.4 | |
| 50 | 27.7 | 81.9 | 6.45 | 0.7 | 8 | | 2.6 | 1.8 | 1.4 | |
| 60 | 27.8 | 82.0 | 6.40 | 0.7 | 9 | | 2.6 | 2.0 | 1.3 | |
| 70 | 28.2 | 82.8 | 6.70 | 0.7 | 9 | | 2.6 | 2.0 | 1.3 | |
| 80 | 28.5 | 83.3 | 6.87 | 0.7 | 9 | | 2.6 | 2.0 | 1.3 | |
| 90 | 28.7 | 83.7 | 7.01 | 0.7 | 8 | | 2.6 | 1.8 | 1.4 | |
| 100 | 28.8 | 83.8 | 6.85 | 0.7 | 8 | | 2.6 | 1.8 | 1.4 | |
| 110 | 28.8 | 83.8 | 6.77 | 0.7 | 8 | | 2.6 | 1.8 | 1.4 | 1.4 |
| 123 | 28.8 | 83.8 | 6.74 | 0.7 | 0 | Water/soda ash/sodium aluminate mixture feed complete. | 2.6 | 0.0 | 0.0 | |
| 140 | 26.5 | 29.7 | 4.94 | 4.2 | 0 | | 15.0 | 0.0 | 0.0 | |
| 182 | 23.8 | 74.8 | 3.53 | 0 | 0 | Aluminum sulfate feed complete. Added sodium gluconate. | 0.0 | 0.0 | 0.0 | |
| 230 | 23.7 | 74.7 | 3.57 | 0 | 0 | Let slurry mix overnight. | 0.0 | 0.0 | 0.0 | |
| 1060 | 22.5 | 22.5 | — | — | — | Dec. 16, 2020 (17 hrs 40 mins) Solution still cloudy clear. Set heat to 35° C. | | | | |
| 1300 | 35.4 | 95.7 | — | — | — | Dec. 16, 2020 (21 hrs 40 mins) Solution clear. Let cool. Filtered solution through #41 Whatman paper. | | | | |
| Average | 25.9 | 78.6 | 6.45 | | | | | | | |

TABLE 20

| | | | | | | | | | | | | | | | |
|---|---|---|---|---|---|---|---|---|---|---|---|---|---|---|---|
| | | | | | | | | | | | Headspace | | | | |
| | | | | | UltraPAC 2286SG3 (55% Basic PAS) | | Conversion Gallons | | | | Target | Initial | Actual | | |
| | Working Examples MV-076 | | | | MV-076 | | 101.5192 | 14774.7 | | | 11.4 | 4.7 | 16.0 | 14.3 | |
| | Digest Temp. (° C.) | | | | Formulation | | Target | | | | Actual | | | | |
| Target | Overnight (° C.) | % $M_2O_3$ | % Basicity | Sp. Gr. | grams | % | Pounds | Gallons | % | Min. Gallons | Pounds | Gallons | % | | |
| 120.0 | Start Up Water | 0 | | 1.000 | 120.0 | 8.24 | 12,180 | 1,461 | 8.24 | 2.100 | 11,825 | 1418 | 8.00 | | |
| 3.00 | Sodicum Gluconate | | | 1.581 | 3.0 | 0.21 | 305 | 37 | 0.21 | 187 | 295 | 35 | 0.20 | | |
| 135.0 | Water (SA) | 0 | | 1.000 | 135.2 | 9.29 | 13,725 | 1,646 | 9.29 | 3,293 | 13,305 | 1704 | 9.00 | | |
| 45.0 | Soda Ash | 0 | | NA | 45.1 | 3.10 | 4,580 | NA | 3.10 | | 4,435 | NA | 3.00 | | |
| 149.0 | 43% SAX | 22.99 | 148.6 | 1.520 | 149.4 | 10.26 | 15,165 | 1,197 | 10.26 | 2,843 | 14,685 | 1159 | 9.93 | % $Na_2O$ SAX | 19.41 |
| 1048.0 | Alum | 8.18 | 0.71 | 1.325 | 1049.5 | 72.09 | 106,555 | 9,646 | 72.09 | | 103,270 | 9349 | 69.86 | | |
| 0.0 | UP 290 | 16.91 | 41.8 | 1.370 | 0.0 | 0.00 | 0 | 0 | 0.00 | | 0 | 0 | 0.00 | % Cl UP 290 | 20.97 |
| 0.0 | $H_3PO_4$ (75%) | 0 | | 1.570 | 0.0 | 0.00 | 0 | 0 | 0.00 | | 0 | 0 | 0.00 | | |
| | Flush Water | | | 1.000 | 0.00 | 0.00 | 0 | 0 | 0.00 | | 0 | 0 | 0.00 | | |
| 1500.0 | UltraPAC 2230 | 8.26 | 8.3 | 1.200 | 1502.3 | 103.19 | 152,510 | 15,244 | 103.18 | | 147,815 | 13,749 | 1.00.00 | | |
| | Check | | | | 1456.0 | 100.01% | 152,510 | | | 147,647 | 147,815 | 13,886 | 100.00% | | |
| | % SA soln | 25.0% | | 1.249 | 1,213.3 | 96.92% | 147,810 | −4,700 | | 168 | 0 | 137 | 100.00% | | |

| Evaporation | | | | % $Al_2O_3$ | % Basicity | % $SO_4$ | % Cl | $Cl/SO_4$ ratio | Cl + $SO_4$ | Na | Cl + $SO_4$ + Na |
|---|---|---|---|---|---|---|---|---|---|---|---|
| Expected | 0.0 | 0.00% | Evap. & $CO_2$ | 8.26% | 55.0 | 16.67 | 0.00 | 0.00 | 16.67 | 2.76 | 19.43 |
| Actual | 46.3 | 3.18% | Just $CO_2$ | 8.08% | | 16.31 | 0.00 | | 16.31 | 2.76 | 19.07 |

1. Add required amount of start up water to the reactor and start agitation. 0.9541
2. Add the required amount of water into the soda ash mix vessel and start agitator. 0 0.00%
3. Add required amount of sodium carbonate (soda ash) to the soda ash mix vessel and agitate until dissolved.
4. Add the required amount of 43% sodium aluminate solution into the soda ash mix vessel.
5. Add the required amount of aluminum sulfate solution to the alum holding vessel.
6. Start addition of the aluminum solution to the reactor to lower pH to less than 4.
7. Start addition of the sodium carbonate/sodium aluminate mixture to the reactor.
8. Adjust feed rates to add the solutions over desired time period maintaining the pH between 5.5 and 7.
9. When all of the sodium carbonate/sodium aluminate solution has been added let the pH fall below 5.
10. When the pH falls below 5 increase the aluminum sulfate feed rate.
11. When all of the aluminim sulfate solution addition is complete add the sodium gluconate.
12. Let solution mix until all solids have dissolved.

| Analysis: | Calculated | Actual | |
|---|---|---|---|
| Specific Gravity | | 1.2881 | |
| % $M_2O_3$ | | | |
| % $Al_2O_3$ | 8.26 | 8.22 | −0.04 |
| % $Fe_2O_3$ | 0.00 | | |
| % Basicity | 55.0 | 58.3 | 3.3 160.2 |
| % Sulfates | 16.67 | | |
| Turbidity, NTU | | 4.1 | |
| Viscosity, cps | | 12.5 | |

TABLE 20-continued

| Precipitation observations and data | | | | | | | | | | |
|---|---|---|---|---|---|---|---|---|---|---|
| Time (min) | Bulk slurry Temp. (° C.) | Bulk slurry Temp. (° F.) | Bulk slurry pH | Alum/ UP290 pump setting | $H_2O$/ SA/SAX pump setting | Comments | Alum pump rate (ml/min.) | $H_2O$/ SA/SAX pump rate (ml/min.) | Pump Ratio | |
| 0 | 21.1 | 70.0 | 3.63 | 0.6 | 6 | Agitator @ 200 rpm. Started both feeds @ 2:50 pm. | 2.2 | 1.4 | 1.6 | |
| 1 | 21.3 | 70.3 | 4.87 | 0.6 | 6 | | 2.2 | 1.4 | 1.6 | |
| 2 | 21.5 | 70.7 | 4.90 | 0.6 | 7 | | 2.2 | 1.6 | 1.4 | |
| 3 | 21.9 | 71.4 | 5.49 | 0.6 | 7 | | 2.2 | 1.6 | 1.4 | |
| 4 | 22.0 | 71.6 | 5.65 | 0.6 | 8 | | 2.2 | 1.8 | 1.2 | |
| 5 | 22.3 | 72.1 | 6.01 | 0.6 | 8 | | 2.2 | 1.8 | 1.2 | |
| 6 | 22.7 | 72.9 | 6.30 | 0.6 | 8 | | 2.2 | 1.8 | 1.2 | |
| 7 | 23.0 | 73.4 | 6.47 | 1.2 | 16 | | 4.3 | 3.4 | 1.3 | |
| 8 | 23.6 | 74.5 | 6.90 | 1.2 | 16 | | 4.3 | 3.4 | 1.3 | |
| 9 | 24.2 | 25.6 | 7.05 | 1.3 | 16 | | 4.7 | 3.4 | 1.4 | |
| 10 | 24.6 | 76.3 | 6.97 | 1.3 | 24 | | 4.7 | 5.0 | 0.9 | |
| 11 | 25.0 | 77.0 | 6.87 | 2.0 | 24 | | 7.2 | 5.0 | 1.4 | |
| 12 | 25.6 | 78.1 | 6.62 | 2.0 | 25 | | 7.2 | 5.2 | 1.4 | |
| 13 | 26.2 | 79.2 | 6.43 | 2.0 | 25 | | 7.2 | 5.2 | 1.4 | |
| 14 | 26.7 | 80.1 | 6.55 | 2.0 | 25 | | 7.2 | 5.2 | 1.4 | |
| 15 | 27.2 | 81.0 | 6.60 | 2.0 | 25 | | 7.2 | 5.2 | 1.4 | |
| 20 | 28.4 | 33.1 | 6.58 | 2.0 | 25 | | 7.2 | 5.2 | 1.4 | |
| 30 | 31.0 | 87.8 | 6.63 | 2.0 | 25 | | 7.2 | 5.2 | 1.4 | |
| 40 | 32.1 | 89.8 | 6.68 | 2.0 | 25 | | 7.2 | 5.2 | 1.4 | 14.3 |
| 49 | 32.0 | 89.6 | 6.02 | 2.0 | 0 | Water/soda ash/sodium aluminate mixture feed complete. | 7.2 | 0.0 | 0.0 | |
| 55 | 30.0 | 86.0 | 4.90 | 4.8 | 0 | | 17.1 | 0.0 | 0.0 | |
| 90 | 25.1 | 77.2 | 3.64 | 0 | 0 | Aluminum sulfate feed complete. Added sodium gluconate. | 0.0 | 0.0 | 0.0 | |
| 95 | 25.0 | 77.0 | 3.64 | 0 | 0 | Let slurry mix overnight. | 0.0 | 0.0 | 0.0 | |
| 1080 | 22.7 | 72.9 | | | | Dec. 18, 2020 (18 hrs) Solution clear. Filtered solution through #41 Whatman paper. | | | | |
| Average | 26.2 | 79.1 | 6.58 | | | | | | | |

TABLE 21

| | | | | | | | | | | | | | | | |
|---|---|---|---|---|---|---|---|---|---|---|---|---|---|---|---|
| | | | | | | | | | | | Headspace | | | | |
| | | | | UltraPAC 2362SG3 (60% Basic PAS) | | | Conversion Gallons | | | | Target | Initial | Actual | | |
| | Working Examples MV-080 | | | MV-080 | | | 103.2784 | 14774.7 | | | 11.4 | 1.2 | 16.0 | 14.3 | |
| | Digest Temp. (° C.) | | | | Formulation | | Target | | | | Actual | | | | |
| Target | Overnight (° C.) | % $M_2O_3$ | % Basicity | Sp. Gr. | grams | % | Pounds | Gallons | % | Min. Gallons | Pounds | Gallons | % | | |
| 120.0 | Start Up Water | 0 | | 1.000 | 120.0 | 8.38 | 12,395 | 1,487 | 8.39 | 2,100 | 11,825 | 1418 | 8.00 | | |
| 3.00 | Sodicum Gluconate | | | 1.581 | 3.00 | 0.21 | 310 | 37 | 0.21 | 187 | 295 | 35 | 0.20 | | |
| 135.0 | Water (SA) | 0 | | 1.000 | 135.1 | 9.44 | 13,955 | 1,674 | 9.44 | 3,348 | 13,305 | 1704 | 9.00 | | |
| 45.0 | Soda Ash | 0 | | NA | 45.0 | 3.14 | 4,650 | NA | 3.15 | | 4,435 | NA | 3.00 | | |
| 162.8 | 43% SAX | 22.99 | 155.6 | 1.520 | 163.2 | 11.40 | 16,855 | 1,330 | 11.40 | 3,004 | 14,685 | 1159 | 9.93 | % $Na_2O$ SAX | 19.41 |
| 1034.2 | Alum | 8.18 | 0.71 | 1.325 | 1034.3 | 72.27 | 106,820 | 9,670 | 72.26 | | 103,270 | 9349 | 69.86 | | |
| 0.0 | UP 290 | 16.91 | 41.8 | 1.370 | 0.0 | 0.00 | 0 | 0 | 0.00 | | 0 | 0 | 0.00 | % Cl UP 290 | 20.97 |
| 0.0 | $H_3PO_4$ (75%) | 0 | | 1.570 | 0.0 | 0.00 | 0 | 0 | 0.00 | | 0 | 0 | 0.00 | | |
| | Flush Water | | | 1.000 | 0.00 | 0.00 | 0 | 0 | 0.00 | | 0 | 0 | 0.00 | | |
| 1500.0 | UltraPAC 2230 | 8.53 | 8.5 | 1.200 | 1500.6 | 104.84 | 154,980 | 15,491 | 104.85 | | 147,815 | 13,749 | 100.00 | | |
| | Check | | | | 1431.2 | 99.99% | 154,985 | | | 148,495 | 147,815 | 13,886 | 100.00% | | |
| | % SA soln | 25.0% | | 1.249 | 1,192.7 | 95.38% | 147,817 | −7,168 | | −680 | 0 | 137 | 100.00% | | |

| | Evaporation | | | % $Al_2O_3$ | % Basicity | % $SO_4$ | % Cl | Cl/$SO_4$ ratio | Cl + $SO_4$ | Na | Cl + $SO_4$ + Na |
|---|---|---|---|---|---|---|---|---|---|---|---|
| Expected | 0.0 | 0.00% | Evap. & $CO_2$ | 8.53% | 60.1 | 16.71 | 0.00 | 0.00 | 16.71 | 2.94 | 19.65 |
| Actual | 69.4 | 4.85% | Just $CO_2$ | 8.22% | | 16.09 | 0.00 | | 16.09 | 2.94 | 19.03 |

1. Add required amount of start up water to the reactor and start agitation. 0.9541
2. Add the required amount of water into the soda ash mix vessel and start agitator. 0 0.00%
3. Add required amount of sodium carbonate (soda ash) to the soda ash mix vessel and agitate until dissolved.
4. Add the required amount of 43% sodium aluminate solution into the soda ash mix vessel.
5. Add the required amount of aluminum sulfate solution to the alum holding vessel.
6. Start addition of the aluminum solution to the reactor to lower pH to less than 4.
7. Start addition of the sodium carbonate/sodium aluminate mixture to the reactor.
8. Adjust feed rates to add the solutions over desired time period maintaining the pH between 5.5 and 7.
9. When all of the sodium carbonate/sodium aluminate solution has been added let the pH fall below 5.
10. When the pH fails below 5 increase the aluminum sulfate feed rate.
11. When all of the aluminim sulfate solution addition is complete add the sodium gluconate.
12. Let solution mix until all solids have dissolved.

| Analysis: | Calculated | Actual | |
|---|---|---|---|
| Specific Gravity | | 1.2955 | |
| % $M_2O_3$ | | | |
| % $Al_2O_3$ | 8.53 | 8.55 | 0.02 |
| % $Fe_2O_3$ | 0.00 | | |
| % Basicity | 60.1 | 61.6 | |
| % Sulfates | 16.71 | | 1.5 160.4 |
| Turbidity, NTU | | 1.6 | |
| Viscosity, cps | | 12.0 | |

TABLE 21-continued

| Precipitation observations and data | | | | | | | | | | |
|---|---|---|---|---|---|---|---|---|---|---|
| Time (min) | Bulk slurry Temp. (° C.) | Bulk slurry Temp. (° F.) | Bulk slurry pH | Alum/ UP290 pump setting | $H_2O$/ SA/SAX pump setting | Comments | Alum pump rate (ml/min.) | $H_2O$/ SA/SAX pump rate (ml/min.) | Pump Ratio | |
| 0 | 21.0 | 69.8 | 3.96 | 0.6 | 6 | Agitator @ 200 rpm. Started both feeds @ 3:05 pm. | 2.2 | 1.4 | 1.6 | |
| 1 | 21.2 | 70.2 | 4.73 | 0.6 | 6 | | 2.2 | 1.4 | 1.6 | |
| 2 | 21.3 | 70.3 | 4.64 | 0.6 | 8 | | 2.2 | 1.8 | 1.2 | |
| 3 | 21.5 | 70.7 | 4.49 | 0.6 | 8 | | 2.2 | 1.8 | 1.2 | |
| 4 | 21.7 | 71.1 | 4.53 | 0.6 | 8 | Water/soda ash/sodium aluminate mixture feed line clogged. | 2.2 | 1.8 | 1.2 | |
| 6 | 22.2 | 72.0 | 5.80 | 0.6 | 8 | | 2.2 | 1.8 | 1.2 | |
| 7 | 22.5 | 72.5 | 6.16 | 0.6 | 8 | | 2.2 | 1.8 | 1.2 | |
| 8 | 22.9 | 73.2 | 6.43 | 0.6 | 8 | | 2.2 | 1.8 | 1.2 | |
| 23 | 25.3 | 77.5 | 7.79 | 0.8 | 8 | | 2.9 | 1.8 | 1.6 | |
| 25 | 25.5 | 77.9 | 7.10 | 1.6 | 16 | | 5.8 | 3.4 | 1.7 | |
| 26 | 25.8 | 78.4 | 6.67 | 1.6 | 17 | | 5.8 | 3.6 | 1.6 | |
| 27 | 26.2 | 79.2 | 6.44 | 1.6 | 18 | | 5.8 | 3.8 | 1.5 | |
| 28 | 26.7 | 80.3 | 6.39 | 3.2 | 38 | | 11.4 | 7.7 | 1.5 | |
| 30 | 27.6 | 81.7 | 6.51 | 3.2 | 38 | | 11.4 | 7.7 | 1.5 | |
| 35 | 30.4 | 86.7 | 6.70 | 3.2 | 38 | | 11.4 | 7.7 | 1.5 | |
| 40 | 32.0 | 89.6 | 6.71 | 3.2 | 38 | | 11.4 | 7.7 | 1.5 | 1.5 |
| 50 | 33.9 | 93.0 | 6.84 | 3.2 | 0 | Water/soda ash/sodium aluminate mixture feed complete. | 11.4 | 0.0 | 0.0 | |
| 52 | 33.4 | 92.1 | 6.13 | 3.2 | 0 | | 11.4 | 0.0 | 0.0 | |
| 67 | 31.0 | 87.8 | 4.87 | 4.2 | 0 | | 15.0 | 0.0 | 0.0 | |
| 90 | 25.9 | 78.6 | 3.76 | 0.0 | 0 | Aluminum sulfate feed complete. Added sodium gluconate. | 0.0 | 0.0 | 0.0 | |
| 105 | 25.7 | 78.3 | 3.79 | 0 | 0 | Let slurry mix overnight. | 0.0 | 0.0 | 0.0 | |
| 1110 | | | | | | Jan. 7, 2021 (18.5 hrs) Solution still cloudy clear. Set heat to 35° C. | | | | |
| 1300 | | | | | | (21.6 hrs) Solution clear. Filtered solution through #41 Whatman paper. | | | | |
| Average | 27.3 | 81.2 | 6.63 | | | | | | | |

TABLE 22

| | | | | | | | | | | | | | | | |
|---|---|---|---|---|---|---|---|---|---|---|---|---|---|---|---|
| | | | | | | | | | | | Headspace | | | | |
| | | | | UltraPAC XXXXSG3 (65% Basic PAS) | | | Conversion Gallons | | | | Target | Initial | Actual | | |
| | Working Examples MV-085 | | | MV-085 | | | 103.9246 | 34774.7 | | | 11.4 | −0.2 | 16.0 | 14.3 | |
| | Digest Temp. (° C.) | | | | Formulation | | Target | | | | Actual | | | | |
| Target | Overnight (C) | % $M_2O_3$ | % Basicity | Sp. Gr. | grams | % | Pounds | Gallons | % | Min. Gallons | Pounds | Gallons | % | | |
| 120.0 | Start Up Water | 0 | | 1.000 | 120.0 | 8.44 | 12,470 | 1,496 | 8.44 | 2,100 | 11,825 | 1418 | 8.00 | | |
| 3.00 | Sodicum Gluconate | | | 1.581 | 3.00 | 0.21 | 310 | 37 | 0.21 | 187 | 295 | 35 | 0.20 | | |
| 157.5 | Water (SA) | 0 | | 1.000 | 157.7 | 11.09 | 16,390 | 1,966 | 11.09 | 3,932 | 13,305 | 1704 | 9.00 | | |
| 52.5 | Sada Ash | 0 | | NA | 52.6 | 3.70 | 5,465 | NA | 3.70 | | 4,435 | NA | 3.00 | | |
| 169.7 | 43% SAX | 22.99 | 156,4 | 1.520 | 169.9 | 11.95 | 17,655 | 1,393 | 11.94 | 3,359 | 14,685 | 1159 | 9.93 | % $Na_2O$ SAX | 19.41 |
| 997.3 | Alum | 8.18 | 0.71 | 1.325 | 997.1 | 70.10 | 103,625 | 9,381 | 70.11 | | 103,270 | 9349 | 69.86 | | |
| 0.0 | UP 290 | 16.91 | 41.8 | 1.370 | 0.0 | 0.00 | 0 | 0 | 0.00 | | 0 | 0 | 0.00 | % Cl UP 290 | 20.97 |
| 0.0 | $H_3PO_4$ (75%) | 0 | | 1.570 | 0.0 | 0.00 | 0 | 0 | 0.00 | | 0 | 0 | 0.00 | | |
| | Flush Water | | | 1.000 | 0.00 | 0.00 | 0 | 0 | 0.00 | | 0 | 0 | 0.00 | | |
| 1500.0 | UltraPAC 2230 | 8.48 | 8.5 | 1.200 | 1500.3 | 105.49 | 155,920 | 15,585 | 105.48 | | 147,815 | 13,749 | 100.00 | | |
| | Check | | | | 1422.3 | 100.01% | 155,915 | | | 148,105 | 147,815 | 13,886 | 100.00% | | |
| | % SA soln | 25.0% | | 1.249 | 1,185.3 | 94.80% | 147,809 | −8,106 | | −290 | 0 | 137 | 100.00% | | |

| | Evaporation | | | % $Al_2O_3$ | % Basicity | % $SO_4$ | % Cl | Cl/$SO_4$ ratio | Cl + $SO_4$ | Na | Cl + $SO_4$ + Na |
|---|---|---|---|---|---|---|---|---|---|---|---|
| Expected | 0.0 | 0.00% | Evap. & $CO_2$ | 8.48% | 65.1 | 16.21 | 0.00 | 0.00 | 16.21 | 3.25 | 19.46 |
| Actual | 78.0 | 5.48% | Just $CO_2$ | 8.13% | | 15.54 | 0.00 | | 15.54 | 3.25 | 18.79 |

1. Add required amount of start up water to the reactor and start agitation. 0.9541
2. Add the required amount of water into the soda ash mix vessel and start agitator. 0 0.00%
3. Add required amount of sodium carbonate (soda ash) to the soda ash mix vessel and agitate until dissolved.
4. Add the required amount of 43% sodium aluminate solution into the soda ash mix vessel.
5. Add the required amount of aluminum sulfate solution to the alum holding vessel.
6. Start addition of the aluminum solution to the reactor to lower pH to less than 4.
7. Start addition of the sodium carbonate/sodium aluminate mixture to the reactor.
8. Adjust feed rates to add the solutions over desired time period maintaining the pH between 5.5 and 7.
9. When all of the sodium carbonate/sodium aluminate solution has been added let the pH fall below 5.
10. When the phi falls below 5 increase the aluminum sulfate feed rate.
11. When all of the aluminim sulfate solution addition is complete add the sodium gluconate.
12. Let solution mix until all solids have dissolved.

| Analysis: | Calculated | Actual | |
|---|---|---|---|
| Specific Gravity | | 1.2921 | |
| % $M_2O_3$ | | | |
| % $Al_2O_3$ | 8.48 | 8.51 | 0.03 |
| % $Fe_2O_3$ | 0.00 | | |
| % Basicity | 65.1 | 65.0 | −0.1 156.1 |
| % Sulfates | 16.21 | | |
| Turbidity, NTU | | 2.8 | |
| Viscosity, cps | | 12.5 | |

TABLE 22-continued

| Time (min) | Bulk slurry Temp. (° C.) | Bulk slurry Temp. (° F.) | Bulk slurry pH | Alum/ UP290 pump setting | $H_2O$/ SA/SAX pump setting | Comments | Alum pump rate (ml/min.) | $H_2O$/ SA/SAX pump rate (ml/min.) | Pump Ratio | |
|---|---|---|---|---|---|---|---|---|---|---|
| Precipitation observations and data | | | | | | | | | | |
| 0 | 21.6 | 70.9 | 3.70 | 0.6 | 6 | Agitator @ 200 rpm. Started both feeds @ 10:45 pm. | 2.2 | 1.4 | 1.6 | |
| 1 | 21.6 | 70.9 | 5.35 | 0.6 | 6 | | 2.2 | 1.4 | 1.6 | |
| 2 | 21.7 | 71.1 | 5.28 | 0.6 | 6 | | 2.2 | 1.4 | 1.6 | |
| 3 | 21.7 | 71.1 | 5.26 | 0.6 | 7 | | 2.2 | 1.6 | 1.4 | |
| 4 | 22.2 | 72.3 | 5.59 | 0.6 | 7 | | 2.2 | 1.6 | 1.4 | |
| 5 | 22.8 | 72.7 | 5.73 | 0.6 | 8 | | 2.2 | 1.8 | 1.2 | |
| 6 | 23.0 | 73.4 | 6.02 | 0.6 | 8 | | 2.2 | 1.8 | 1.2 | |
| 7 | 23.3 | 73.9 | 6.21 | 0.6 | 8 | | 2.2 | 1.8 | 1.2 | |
| 8 | 23.6 | 74.5 | 6.39 | 1.2 | 16 | | 4.3 | 3.4 | 1.3 | |
| 9 | 24.3 | 75.4 | 6.68 | 1.2 | 16 | | 4.3 | 3.4 | 1.3 | |
| 10 | 24.6 | 76.3 | 6.85 | 2.4 | 30 | | 8.6 | 6.2 | 1.4 | |
| 11 | 25.5 | 77.9 | 6.66 | 2.4 | 30 | | 8.6 | 6.2 | 1.4 | |
| 17 | 26.2 | 79.2 | 6.80 | 2.4 | 29 | | 8.6 | 6.0 | 1.4 | |
| 13 | 26.9 | 80.2 | 6.88 | 2.4 | 28 | | 8.6 | 5.8 | 1.5 | |
| 14 | 27.3 | 81.1 | 6.74 | 2.4 | 28 | | 8.6 | 5.8 | 1.5 | |
| 15 | 27.5 | 82.2 | 6.65 | 2.4 | 28 | | 8.6 | 5.8 | 1.5 | |
| 20 | 29.6 | 85.3 | 6.53 | 2.4 | 28 | Water/soda ash/sodium aluminate mixture feed complete. | 8.6 | 5.8 | 1.5 | |
| 30 | 31.5 | 88.1 | 6.48 | 2.4 | 28 | | 8.6 | 5.8 | 1.5 | |
| 40 | 32.5 | 90.5 | 6.48 | 2.4 | 28 | | 8.6 | 5.8 | 1.5 | 1.4 |
| 50 | 32.8 | 91.0 | 6.51 | 2.4 | 0 | | 8.6 | 0.0 | 0.0 | |
| 57 | 30.5 | 86.9 | 5.04 | 4.8 | 0 | | 17.1 | 0.0 | 0.0 | |
| 110 | 25.3 | 77.5 | 3.94 | 0 | 0 | Aluminum sulfate feed complete. Added sodium gluconate. | 0.0 | 0.0 | 0.0 | |
| 115 | 25.2 | 77.4 | 3.95 | 0 | 0 | Let slurry mix overnight. | 0.0 | 0.0 | 0.0 | |
| 1350 | 22.5 | 72.5 | | | | Jan. 13, 2021 (22.5 hrs) Still cloudy. Set heat to 35° C. | | | | |
| 1440 | 35.8 | 96.4 | | | | (24 hrs) Solution clear, filtered through #41 Whatman paper. | | | | |
| Average | 26.8 | 80.2 | 6.51 | | | | | | | |

TABLE 23

| | | | | | | | | | | | | | | | |
|---|---|---|---|---|---|---|---|---|---|---|---|---|---|---|---|
| | | | | | | | | | | | | Headspace | | | |
| | | | | | 50% Basic PAS | | Conversion Gallons | | | | Target | Initial | Actual | | |
| | Working Examples MV-110 | | | | MV-110 | | 105.9717 | 14774.7 | | | 11.4 | 9.2 | 16.0 | 2.9 | |
| | Digest Temp. (° C.) | | | | Formulation | | Target | | | | Actual | | | | |
| Target | Overnight (° C.) | % $M_2O_3$ | % Basicity | Sp. Gr. | grams | % | Pounds | Gallons | % | Min. Gallons | Pounds | Gallons | % | | |
| 120.0 | Start Up Water | 0 | | 1.000 | 120.0 | 8.00 | 12,715 | 1,525 | 8.00 | 2,100 | 12,715 | 1525 | 8.00 | | |
| 0.00 | Sodicum Gluconate | | | 1.581 | 0.00 | 0.00 | 0 | 0 | 0.00 | 0 | 0 | 0 | 0.00 | | |
| 112.3 | Water (SA) | 0 | | 1.000 | 112.7 | 7.53 | 11,945 | 1,433 | 2.51 | 2,866 | 11,945 | 1530 | 7.51 | | |
| 37.5 | Soda Ash | 0 | | NA | 37.6 | 2.51 | 3,985 | NA | 2.51 | | 3,985 | NA | 2.51 | | |
| 126.3 | 43% SAX | 22.96 | 149.0 | 1.520 | 141.4 | 9.42 | 14,985 | 1,183 | 9.42 | 2,615 | 14,985 | 1183 | 9.42 | % $Na_2O$ SAX | 19.35 |
| 1103.9 | Alum | 7.98 | 3.8 | 1.325 | 1104.4 | 73.60 | 117,035 | 10,595 | 73.60 | | 117,035 | 10595 | 73.60 | | |
| 0.0 | UP 290 | 16.91 | 41.8 | 1.370 | 0.0 | 0.00 | 0 | 0 | 0.00 | | 0 | 0 | 0.00 | % Cl UP 290 | 20.97 |
| 0.0 | $H_3PO_4$ (75%) | 0 | | 1.570 | 0.0 | 0.00 | 0 | 0 | 0.00 | | 0 | 0 | 0.00 | | |
| 0.00 | Flush Water | | | 1.000 | 0.00 | 0.00 | 0 | 0 | 0.00 | | 0 | 0 | 0.00 | | |
| 1500.0 | 50% Basic PAS | 8.04 | 8.0 | 1.291 | 1516.1 | 101.04 | 160,665 | 14,927 | 101.03 | | 160,665 | 13,749 | 101.03 | | |
| | Check | | | | 1500.6 | 100.01% | 160,665 | | | 0 | 159,022 | 14,834 | 100.00% | | |
| | % SA soln | 25.0% | | 1.249 | 1,162.4 | 98.98% | 159,022 | −1,643 | | 159,022 | −1,643 | 1,085 | 98.98% | | |

| Evaporation | | | | % $Al_2O_2$ | % Basicity | % $SO_4$ | % Cl | $Cl/SO_4$ ratio | Cl + $SO_4$ | Na | Cl + $SO_4$ + Na |
|---|---|---|---|---|---|---|---|---|---|---|---|
| Expected | 0.0 | 0.00% | Evap. & $CO_2$ | 8.04% | 52.9 | 16.60 | 0.00 | 0.00 | 16.60 | 2.39 | 18.99 |
| Actual | 15.5 | 1.03% | Just $CO_2$ | 8.02% | | 16.56 | 0.00 | | 16.56 | 2.39 | 18.95 |

1. Add required amount of start up water to the reactor and start agitation. 0.9541
2. Add the required amount of water into the soda ash mix vessel and start agitator. 1,643 1.03%
3. Add required amount of sodium carbonate (soda ash) to the soda ash mix vessel and agitate until dissolved.
4. Add the required amount of 43% sodium aluminate solution into the soda ash mix vessel.
5. Add the required amount of aluminum sulfate solution to the alum holding vessel.
6. Start addition of the aluminum solution to the reactor to lower pH to less than 4.
7. Start addition of the sodium carbonate/sodium aluminate mixture to the reactor.
8. Adjust feed rates to add the solutions over desired time period maintaining the pH between: 5.5 and 7.
9. When all of the sodium carbonate/sodium aluminate solution has been added let the pH fall below 5.
10. When the pH falls below 5 increase the aluminum sulfate feed rate.
11. When all of the aluminim sulfate solution addition is complete add the sodium gluconate.
12. Let solution mix until all solids have dissolved.

| Analysis: Specific Gravity | Calculated | Actual | |
|---|---|---|---|
| % $M_2O_3$ | | | |
| % $Al_2O_3$ | 8.04 | 8.13 | 0.09 (final weight prior to digestion) |
| % $Fe_2O_3$ | 0.00 | | |
| % Basicity | 52.6 | 54.6 | 1.7 155.4 (average % Basicity of 5 fractions) |
| % Sulfates | 16.60 | | |
| Turbidity, NTU | | 2.6 | |

TABLE 23-continued

| | | | | | | | | | | |
|---|---|---|---|---|---|---|---|---|---|---|
| Viscosity, cps | | | | | | 14.2 | | | | |
| Precipitation observations and data | | | | | | | | | | |
| Time (min) | Bulk slurry Temp. (° C.) | Bulk slurry Temp. (° F.) | Bulk slurry pH | Alum/ UP290 pump setting | $H_2O$/ SA/SAX pump setting | Comments | Alum pump rate (ml/min.) | $H_2O$/ SA/SAX pump rate (ml/min.) | Pump Ratio | |
| 0 | 21.1 | 70.0 | 3.89 | 0.6 | 6 | Agitator @ 200 rpm. Started both feeds @ 3:20 pm. | 2.2 | 1.4 | 1.6 | |
| 1 | 21.3 | 70.3 | 4.89 | 0.6 | 6 | | 2.2 | 1.4 | 1.6 | |
| 2 | 21.5 | 70.7 | 5.07 | 0.6 | 7 | | 2.2 | 1.6 | 1.4 | |
| 3 | 21.9 | 71.4 | 5.65 | 0.6 | 7 | | 2.2 | 1.6 | 1.4 | |
| 6 | 22.2 | 72.0 | 5.83 | 0.6 | 7 | | 2.2 | 1.6 | 1.4 | |
| 10 | 22.7 | 72.9 | 6.11 | 1.8 | 21 | | 6.5 | 4.4 | 1.5 | |
| 12 | 23.8 | 74.8 | 5.79 | 1.8 | 24 | Agitator up to 250 rpm. | 6.5 | 5.0 | 1.3 | |
| 15 | 25.7 | 78.3 | 6.72 | 3.6 | 48 | | 12.8 | 9.7 | 1.3 | |
| 17 | 27.5 | 81.5 | 6.90 | 3.6 | 48 | | 12.8 | 9.7 | 1.3 | |
| 18 | 28.2 | 82.8 | 7.06 | 3.6 | 46 | | 12.8 | 9.3 | 1.4 | |
| 19 | 28.9 | 84.0 | 7.05 | 3.6 | 44 | | 12.8 | 8.9 | 1.4 | |
| 20 | 29.5 | 85.1 | 6.97 | 3.6 | 44 | | 12.8 | 8.9 | 1.4 | |
| 25 | 21.4 | 70.5 | 6.82 | 3.6 | 44 | | 12.8 | 8.9 | 1.4 | |
| 30 | 32.6 | 90.7 | 6.80 | 3.6 | 44 | | 12.8 | 8.9 | 1.4 | |
| 32 | 32.9 | 91.2 | 6.74 | 3.7 | 44 | | 13.2 | 8.9 | 1.5 | 1.4 |
| 36 | 30.5 | 86.9 | 5.09 | 4.8 | 0 | Water/soda ash/sodium aluminate mixture feed complete. | 17.1 | 0.0 | 0.0 | |
| 110 | 25.0 | 77.0 | 3.99 | 0 | 0 | Aluminum sulfate feed complete.<br>Split samples into six fractions and added required amount of sodium gluconate to each.<br>Sample MV-110 - 0.0% sodium gluconate.<br>Sample MV-111A - 0.2% sodium: gluconate.<br>Sample MV-111B - 0.4% sodium gluconate.<br>Sample MV-113C - 0.6% sodium gluconate.<br>Sample MV-111D - 0.8% sodium gluconate.<br>Sample MV-111E - 1.0% sodium gluconate,<br>Let slurries mix overnight.<br>Sep. 22, 2021 9:00 am (18.2 hrs) - all samples clear. Filtered all through # 541 Whatman paper.<br>Samples used for accelerated stability studies. | 0.0 | 0.0 | 0.0 | |
| Average | 27.2 | 80.9 | 6.49 | | | | | | | |

TABLE 24

| | | | | | | | | | | | | | | | |
|---|---|---|---|---|---|---|---|---|---|---|---|---|---|---|---|
| | | | | | | | UltraPAC 2361 | | | | Headspace | | | | |
| | | | | | (50% Basic PAS) | | Conversion Gallons | | | | Target | Initial | Actual | | |
| | Working Examples MV-115 | | | | MV-115 | | 305.8833 | 14774.7 | | | 11.4 | 3.8 | 16.0 | 17.1 | |
| | Digest Temp. (° C.) | | | | Formulation | | Target | | | | Actual | | | | |
| Target | Overnight (° C.) | % $M_2O_3$ | % Basicity | Sp. Gr. | grams | % | Pounds | Gallons | % | Min. Gallons | Pounds | Gallons | % | | |
| 40.00 | Start Up Water | 0 | | 1.000 | 40.00 | 8.28 | 12,235 | 1,468 | 8.28 | 2,100 | 12,235 | 1468 | 8.28 | | |
| 0.00 | Ferric sulfate | 17.75 | 10.5 | 1.583 | 0.00 | 0.00 | 0 | 0 | 0.00 | 0 | 0 | 0 | 0.00 | | |
| 37.41 | Water (SA) | 0 | | 1.000 | 37.49 | 7.76 | 11,470 | 1,376 | 7.76 | 2,752 | 11,470 | 1469 | 7.76 | | |
| 12.50 | Soda Ash | 0 | | NA | 12.53 | 2.59 | 3,835 | NA | 2.59 | | 3,835 | NA | 2.59 | | |
| 45.60 | 43% SAX | 22.96 | 149.0 | 1.520 | 45.69 | 9.46 | 13,975 | 1,103 | 9.45 | 2,479 | 13,975 | 1103 | 9.45 | % $Na_2O$ SAX | 19.35 |
| 354.50 | Alum | 7.98 | 3.8 | 1.325 | 354.57 | 73.37 | 108,455 | 9,818 | 73.37 | | 108,455 | 9818 | 73.37 | | |
| 0.00 | UP 290 | 16.88 | 41.8 | 1.370 | 0.00 | 0.00 | 0 | 0 | 0.00 | | 0 | 0 | 0.00 | % Cl UP 290 | 20.99 |
| 10.00 | $H_3PO_4$ (75%) | 0 | | 1.570 | 10.26 | 2.12 | 3,140 | 240 | 2.12 | | 3,140 | 240 | 2.12 | | |
| | Flush Water | | | 1.000 | 0.00 | 0.00 | 0 | 0 | 0.00 | | 0 | 0 | 0.00 | | |
| 500.0 | UltraPAC 2230 | 8.03 | 8.0 | 1.200 | 500.5 | 103.58 | 153,105 | 15,304 | 101.46 | | 153,110 | 13,749 | 103.58 | | |
| | Check | | | | 483.2 | 100.00% | 153,110 | | | 0 | 147,820 | 13,654 | 100.00% | | |
| | % SA soln | 25.0% | | 1.249 | 402.7 | 96.54% | 147,815 | −5,295 | | 147,820 | −5,290 | −95 | 96.55% | | |

| | Evaporation | | | % $Al_2O_2$ | % Basicity | % $SO_4$ | % Cl | $Cl/SO_4$ ratio | Cl + $SO_4$ | Na | Cl + $SO_4$ + Na |
|---|---|---|---|---|---|---|---|---|---|---|---|
| Expected | 0.0 | 0.00% | Evap. & $CO_2$ | 8.03% | 46.6 | 16.55 | 0.00 | 0.00 | 16.55 | 2.43 | 18.98 |
| Actual | 17.3 | 3.58% | Just $CO_2$ | 7.81% | | 16.10 | 0.00 | | 16.10 | 2.43 | 18.53 |

1. Add required amount of start up water to the reactor and start agitation. 0.9541
2. Add the required amount of water into the soda ash mix vessel and start agitator. 5,290 3.58%
3. Add required amount of sodium carbonate (soda ash) to the soda ash mix vessel and agitate until dissolved.
4. Add the required amount of 43% sodium aluminate solution into the soda ash mix vessel.
5. Add the required amount of aluminum sulfate solution to the alum holding vessel.
6. Start addition of the aluminum solution to the reactor to lower pH to less than 4.
7. Start addition of the sodium carbonate/sodium aluminate mixture to the reactor.
8. Adjust feed rates to add the solutions over desired time period maintaining the pH between 5.5 and 7.
9. When all of the sodium carbonate/sodium aluminate solution has been added let the pH fall below 5.
10. When the pH falls below 5 increase the aluminum sulfate reed rate.
11. When all of the aluminim sulfate solution has been added start the phosphoric acid addition.
12. When phosphoric acid addition is completet let solution mix until all sulids have dissolved.

| Analysis: Specific Gravity | Calculated | Actual | |
|---|---|---|---|
| % $M_2O_3$ | | | |
| % $Al_2O_3$ | 8.03 | 7.98 | −0.05 |
| % $Fe_2O_3$ | 0.00 | | |
| % Basicity | 46.6 | 46.2 | −0.4 147.7 |
| % Sulfates | 16.55 | | |
| Turbidity, NTU | | | |

TABLE 24-continued

| Viscosity, cps | | | | | | | | | | |
|---|---|---|---|---|---|---|---|---|---|---|
| Precipitation observations and data | | | | | | | | | | |
| Time (min) | Bulk slurry Temp. (° C.) | Bulk slurry Temp. (° F.) | Bulk slurry pH | Alum/ UP290 pump setting | $H_2O$/ SA/SAX pump setting | Comments | Alum pump rate (ml/min.) | $H_2O$/ SA/SAX pump rate (ml/min.) | Pump Ratio | |
| 0 | 20.4 | 68.7 | 3.53 | 0.6 | 6 | Agitator at 175 rpm. Started both feeds at 4:30 pm. | 2.2 | 1.4 | 1.6 | |
| 1 | 21.0 | 69.8 | 4.50 | 0.6 | 6 | | 2.2 | 1.4 | 1.6 | |
| 2 | 21.4 | 70.5 | 4.66 | 0.6 | 6 | | 2.2 | 1.4 | 1.6 | |
| 3 | 21.7 | 71.3 | 4.79 | 0.6 | 7 | | 2.2 | 1.6 | 1.4 | |
| 4 | 22.3 | 72.1 | 5.08 | 0.6 | 7 | | 2.2 | 1.6 | 1.4 | |
| 5 | 22.6 | 72.7 | 5.16 | 0.6 | 7 | | 2.2 | 1.6 | 1.4 | |
| 6 | 23.2 | 73.8 | 5.32 | 0.6 | 7 | | 2.2 | 1.6 | 1.4 | |
| 7 | 23.8 | 74.8 | 5.77 | 0.6 | 7 | | 2.2 | 1.6 | 1.4 | |
| 8 | 24.3 | 75.7 | 5.63 | 0.6 | 8 | | 2.2 | 1.8 | 1.2 | |
| 9 | 24.8 | 76.6 | 5.75 | 0.6 | 8 | | 2.2 | 1.8 | 1.2 | |
| 10 | 25.3 | 77.5 | 5.89 | 0.6 | 8 | | 2.2 | 1.8 | 1.2 | |
| 12 | 26.1 | 79.0 | 6.10 | 0.6 | 8 | | 2.2 | 1.8 | 1.2 | |
| 14 | 26.7 | 80.3 | 6.27 | 0.6 | 8 | | 2.2 | 1.8 | 1.2 | |
| 16 | 27.1 | 80.8 | 6.40 | 0.6 | 8 | | 2.2 | 1.8 | 1.2 | |
| 18 | 27.5 | 81.5 | 6.27 | 0.6 | 9 | Agitator at 200 rpm. | 2.2 | 2.0 | 1.1 | |
| 20 | 27.9 | 82.2 | 7.12 | 0.6 | 8 | | 2.2 | 1.8 | 1.2 | |
| 22 | 28.1 | 82.6 | 7.19 | 0.6 | 6 | | 2.2 | 1.4 | 1.6 | |
| 24 | 28.1 | 82.6 | 6.82 | 0.6 | 6 | | 2.2 | 1.4 | 1.6 | |
| 26 | 28.1 | 82.6 | 6.49 | 0.6 | 6 | | 2.2 | 1.4 | 1.6 | |
| 28 | 28.1 | 82.6 | 6.51 | 0.6 | 7 | | 2.2 | 1.6 | 1.4 | |
| 30 | 28.3 | 82.9 | 6.36 | 0.6 | 8 | | 2.2 | 1.8 | 1.2 | |
| 32 | 28.5 | 83.3 | 6.49 | 0.6 | 8 | | 2.2 | 1.8 | 1.2 | |
| 34 | 28.6 | 83.5 | 6.62 | 0.6 | 8 | | 2.2 | 1.8 | 1.2 | |
| 36 | 28.7 | 83.7 | 6.70 | 0.6 | 8 | | 2.2 | 1.8 | 1.2 | |
| 40 | 29.0 | 84.2 | 6.91 | 0.6 | 8 | | 2.2 | 1.8 | 1.2 | 1.3 |
| 41 | 29.0 | 84.2 | 6.84 | 0.6 | 0 | Water/soda ash/sodium aluminate mixture feed complete. | 2.2 | 0.0 | 0.0 | |
| 50 | 26.3 | 79.3 | 5.01 | 4.8 | 0 | | 17.1 | 0.0 | 0.0 | |
| 60 | 23.2 | 73.8 | 3.98 | 0.6 | 0 | Aluminum sulfate feed complete. Started Phosphoric acid (75%) solution feed. | 2.2 | 0.0 | 0.0 | |
| 66 | 26.1 | 79.0 | 3.91 | 0.0 | 0 | Phosphoric acid (75%) solution feed complete. Let mix overnight. Sep. 24, 2021 - 9:00 am (19.5 hrs) Solution clear, Filtered through # 541 Whatman paper. | 0.0 | 0.0 | 0.0 | |
| Average | 26.6 | 80.0 | 6.31 | | | | | | | |

TABLE 25

| | | | | | | | | | | | | | | | |
|---|---|---|---|---|---|---|---|---|---|---|---|---|---|---|---|
| | | | | UltraPAC 2361 (50% Basic PAS) | | | | | | | Headspace | | | | |
| | | | | 2.0% Phosphoric acid (75%) solution | | | Conversion Gallons | | | | Target | Initial | Actual | | |
| | Working Examples MV-119 | | | MV-119 | | | 305.9720 | 14774.7 | | | 11.4 | 3.8 | 16.0 | 17.4 | |
| | Digest Temp. (° C.) | | | | Formulation | | | Target | | | | Actual | | | |
| Target | Overnight (° C.) | % $M_2O_3$ | % Basicity | Sp. Gr. | grams | % | Pounds | Gallons | % | Min. Gallons | Pounds | Gallons | % | | |
| 40.00 | Start Up Water | 0 | | 1.000 | 40.00 | 8.28 | 12,240 | 1,468 | 8.28 | 2,100 | 12,240 | 1468 | 8.28 | | |
| 0.00 | Ferric sulfate | 17.75 | 10.5 | 1.581 | 0.00 | 0.00 | 0 | 0 | 0.00 | 0 | 0 | 0 | 0.00 | | |
| 37.41 | Solution Water | 0 | | 1.000 | 37.44 | 7.75 | 11,455 | 1,374 | 7.75 | 2,748 | 11,455 | 1467 | 7.75 | | |
| 12.50 | Sodium carbonate | 0 | | NA | 12.52 | 2.59 | 3,830 | NA | 2.59 | | 3,830 | NA | 2.59 | | |
| 50.58 | 43% Sodium aluminate | 22.96 | 149.0 | 1.520 | 51.09 | 10.58 | 15,630 | 1,233 | 10.57 | 2,607 | 15,630 | 1235 | 10.57 | % $Na_2O$ SAX | 19.35 |
| 349.52 | Alumium sulfate | 7.98 | 3.8 | 1.325 | 349.28 | 72.30 | 106,870 | 9,675 | 72.30 | | 106,870 | 9675 | 72.30 | | |
| 0.00 | Pressure PAC (UP 290) | 16.88 | 41.8 | 1.370 | 0.00 | 0.00 | 0 | 0 | 0.00 | | 0 | 0 | 0.00 | % Cl UP 290 | 20.99 |
| 10.00 | Phosphoric acid (75%) | 0 | | 1.570 | 10.11 | 2.09 | 3,095 | 236 | 2.09 | | 3,095 | 236 | 2.09 | | |
| | Flush Water | | | 1.000 | 0.00 | 0.00 | 0 | 0 | 0.00 | | 0 | 0 | 0.00 | | |
| 500.0 | Final product | 8.20 | 8.20 | 1.200 | 500.4 | 1.03.59 | 153,120 | 15,305 | 101.50 | | 153,120 | 13,749 | 103.59 | | |
| | Check | | | | 483.1 | 100.00% | 153,120 | | | 0 | 147,811 | 13,634 | 100.00% | | |
| | % SA soln | 25.1% | | 1.250 | 402.6 | 96.53% | 147,811 | −5,309 | | 147,811 | −5,309 | −115 | 96.53% | | |

| | Evaporation | | | % $Al_2O_2$ | % Basicity | % $SO_4$ | % Cl | $Cl/SO_4$ ratio | Cl + $SO_4$ | Na | Cl + $SO_4$ + Na |
|---|---|---|---|---|---|---|---|---|---|---|---|
| Expected | 0.0 | 0.00% | Evap. & $CO_2$ | 8.20% | 50.3 | 16.31 | 0.00 | 0.00 | 16.31 | 2.59 | 18.89 |
| Actual | 17.4 | 3.59% | Just $CO_2$ | 7.98% | | 15.87 | 0.00 | | 15.87 | 2.59 | 18.45 |

1. Add required amount of start up water to the reactor and start agitation. 0.9541
2. Add the required amount of water into the soda ash mix vessel and start agitator. 5,309 3.59%
3. Add required amount of sodium carbonate (soda ash) to the soda ash mix vessel and agitate until dissolved.
4. Add the required amount of 43% sodium aluminate solution into the soda ash mix vessel.
5. Add the required amount of aluminum sulfate solution to the alum holding vessel.
6. Start addition of the aluminum solution to the reactor to lower pH to less than 4.
7. Start addition of the sodium carbonate/sodium aluminate mixture to the reactor.
8. Adjust feed rates to add the solutions over desired time period maintaining the pH between 5.5 and 7.
9. When all of the sodium carbonate/sodium aluminate solution has been added let the pH fall below 5.
10. When the pH falls below 5 increase the aluminum sulfate feed rate.
11. When all of the aluminim sulfate solution has been added start the phosphoric acid addition.
12. When phosphoric acid addition is completet let solution mix until all solids have dissolved.

| Analysis:<br>Specific Gravity | Calculated | Actual | |
|---|---|---|---|
| % $M_2O_3$ | | | |
| % $Al_2O_3$ | 8.21 | 8.10 | −0.10 |
| % $Fe_2O_3$ | 0.00 | | |
| % Basicity | 50.3 | 49.9 | −0.4 147.6 |
| % Sulfates | 16.31 | | |
| Turbidity, NTU | | | |

TABLE 25-continued

Viscosity, cps

Precipitation observations and data

| Time (min) | Bulk slurry Temp. (° C.) | Bulk slurry Temp. (° F.) | Bulk slurry pH | Alum/ UP290 pump setting | $H_2O$/ SA/SAX pump setting | Comments | Alum pump rate (ml/min.) | $H_2O$/ SA/SAX pump rate (ml/min.) | Pump Ratio | |
|---|---|---|---|---|---|---|---|---|---|---|
| 0 | 22.2 | 72.0 | 3.66 | 0.6 | 6 | Agitator at 200 rpm. Started both feeds at 2:55 pm. | 2.2 | 1.4 | 1.6 | |
| 1 | 22.5 | 72.5 | 8.77 | 0.6 | 6 | | 2.2 | 1.4 | 1.6 | |
| 2 | 22.9 | 73.2 | 4.48 | 0.6 | 6 | | 2.2 | 1.4 | 1.6 | |
| 3 | 23.1 | 73.6 | 4.69 | 0.6 | 8 | | 2.2 | 1.8 | 1.2 | |
| 4 | 23.7 | 74.7 | 4.94 | 0.6 | 8 | | 2.2 | 1.8 | 1.2 | |
| 5 | 24.3 | 75.7 | 5.77 | 0.6 | 8 | | 2.2 | 1.8 | 1.2 | |
| 6 | 24.9 | 76.8 | 6.02 | 0.6 | 8 | | 2.2 | 1.8 | 1.2 | |
| 7 | 25.6 | 78.1 | 5.84 | 0.6 | 8 | Agitator at 250 rpm. | 2.2 | 1.8 | 1.2 | |
| 8 | 25.9 | 78.8 | 6.11 | 0.6 | 8 | | 2.2 | 1.8 | 1.2 | |
| 9 | 26.3 | 79.3 | 6.28 | 0.6 | 8 | | 2.2 | 1.8 | 1.2 | |
| 10 | 26.6 | 79.9 | 6.42 | 0.6 | 8 | | 2.2 | 1.8 | 1.2 | |
| 14 | 27.8 | 82.0 | 7.22 | 0.6 | 7 | | 2.2 | 1.6 | 1.4 | |
| 15 | 28.0 | 82.4 | 7.05 | 0.6 | 7 | | 2.2 | 1.6 | 1.4 | |
| 20 | 28.5 | 83.3 | 6.69 | 0.6 | 7 | | 2.2 | 1.6 | 1.4 | |
| 25 | 29.0 | 84.2 | 6.69 | 0.6 | 7 | | 2.2 | 1.6 | 1.4 | |
| 30 | 29.3 | 84.7 | 6.74 | 0.6 | 7 | | 2.2 | 1.6 | 1.4 | |
| 35 | 29.5 | 85.1 | 6.70 | 0.6 | 7 | | 2.2 | 1.6 | 1.4 | |
| 40 | 29.0 | 85.3 | 6.69 | 0.6 | 7 | | 2.2 | 1.6 | 1.4 | 1.3 |
| 45 | 29.7 | 85.5 | 6.67 | 0.6 | 0 | Water/soda ash/sodium aluminate mixture feed complete. | 2.2 | 0.0 | 0.0 | |
| 55 | 26.8 | 80.2 | 4.99 | 4.8 | 0 | | 17.1 | 0.0 | 0.0 | |
| 63 | 24.3 | 75.7 | 4.05 | 0.6 | 0 | Aluminum sulfate feed complete. | 2.2 | 0.0 | 0.0 | |
| 65 | 24.3 | 75.7 | 4.06 | 0.6 | 0 | Started Phosphoric acid (75%) solution feed. | 2.2 | 0.0 | 0.0 | |
| 71 | 27.1 | 80.8 | 3.96 | 0.6 | 0 | Phosphoric acid (75%) solution feed complete. | 2.2 | 0.0 | 0.0 | |
| 105 | 25.5 | 77.5 | 4.14 | 0 | 0 | Let mix overnight. | 0.0 | 0.0 | 0.0 | |
| | | | | | | Sep. 29, 2021 - 9:00 am (18.1 hrs) Solution clear. Filtered through # 541 Whatman paper. | | | | |
| Average | 27.0 | 80.6 | 6.49 | | | | | | | |

TABLE 26

| | | | | | | | | | | | | | | | |
|---|---|---|---|---|---|---|---|---|---|---|---|---|---|---|---|
| | | | | | UltraPAC 2361 (50% Basic PAS) | | | | | | Headspace | | | | |
| | | | | 0.25% Phosphoric acid (75%) solution | | | Conversion Gallons | | | | Target | Initial | Actual | | |
| | Working Examples MV-122 | | | | MV-122 | | 306.0417 | 14774.7 | | | 11.6 | 3.9 | 16.0 | 16.6 | |
| | Digest Temp. (° C.) | | | | Formulation | | Target | | | | Actual | | | | |
| Target | Overnight (° C.) | % $M_2O_3$ | % Basicity | Sp. Gr. | grams | % | Pounds | Gallons | % | Min. Gallons | Pounds | Gallons | % | | |
| 40.00 | Start Up Water | 0 | | 1.000 | 40.00 | 8.28 | 12,240 | 1,468 | 8.28 | 2,100 | 12,240 | 1468 | 8.28 | | |
| 0.00 | Ferric sulfate | 17.75 | 10.5 | 1.581 | 0.00 | 0.00 | 0 | 0 | 0.00 | 0 | 0 | 0 | 0.00 | | |
| 37.41 | Solution Water | 0 | | 1.000 | 37.44 | 7.75 | 11,460 | 1,375 | 7.75 | 2,745 | 11,460 | 1468 | 7.75 | | |
| 12.50 | Sodium carbonate | 0 | | NA | 12.52 | 2.59 | 3,830 | NA | 2.59 | | 3,830 | NA | 2.59 | | |
| 43.10 | 43% Sodium aluminate | 22.96 | 149.0 | 1.520 | 43.31 | 8.97 | 13,255 | 1,046 | 8.97 | 2,421 | 13,255 | 1046 | 8.97 | % $Na_2O$ SAX | 19.35 |
| 365.70 | Alumium sulfate | 7.98 | 3.8 | 1.325 | 365.62 | 75.70 | 111,895 | 10,129 | 75.70 | | 111,895 | 10129 | 75.70 | | |
| 0.00 | Pressure PAC (UP 290) | 16.88 | 41.8 | 1.370 | 0.00 | 0.00 | 0 | 0 | 0.00 | | 0 | 0 | 0.00 | % Cl UP 290 | 20.99 |
| 1.25 | Phosphoric acid (75%) | 0 | | 1.570 | 1.25 | 0.26 | 385 | 29 | 0.26 | | 385 | 29 | 0.26 | | |
| | Flush Water | | | 1.000 | 0.00 | 0.00 | 0 | 0 | 0.00 | | 0 | 0 | 0.00 | | |
| 500.0 | Final product | 8.10 | 8.10 | 1.200 | 500.1 | 103.55 | 153,065 | 15,300 | 105.29 | | 153,065 | 13,749 | 103.55 | | |
| | Check | | | | 483.0 | 100.00% | 153,065 | | | | 147,813 | 13,702 | 100.00% | | |
| | % SA soln | 25.1% | | 1.250 | 402.5 | 96.57% | 147,813 | −5,252 | | 147,813 | −5,252 | −47 | 96.57% | | |

| | Evaporation | | | % $Al_2O_2$ | % Basicity | % $SO_4$ | % Cl | $Cl/SO_4$ ratio | Cl + $SO_4$ | Na | Cl + $SO_4$ + Na |
|---|---|---|---|---|---|---|---|---|---|---|---|
| Expected | 0.0 | 0.00% | Evap. & $CO_2$ | 8.10% | 50.1 | 17.07 | 0.00 | 0.00 | 17.07 | 2.36 | 19.43 |
| Actual | 17.2 | 3.55% | Just $CO_2$ | 7.82% | | 16.49 | 0.00 | | 16.49 | 2.36 | 18.85 |

1. Add required amount of start up water to the reactor and start agitation. 0.9541
2. Add the required amount of water into the soda ash mix vessel and start agitator. 5,252 3.55%
3. Add required amount of sodium carbonate (soda ash) to the soda ash mix vessel and agitate until dissolved.
4. Add the required amount of 43% sodium aluminate solution into the soda ash mix vessel.
5. Add the required amount of aluminum sulfate solution to the alum holding vessel.
6. Start addition of the aluminum solution to the reactor to lower pH to less than 4.
7. Start addition of the sodium carbonate/sodium aluminate mixture to the reactor.
8. Adjust feed rates to add the solutions over desired time period maintaining the pH between 5.5 and 7.
9. When all of the sodium carbonate/sodium aluminate solution has been added let the pH fall below 5.
10. When the pH falls below 5 increase the aluminum sulfate feed rate.
11. When all of the aluminim sulfate solution has been added start the phosphoric acid addition.
12. When phosphoric acid addition is completet let solution mix until all solids have dissolved.

| Analysis:<br>Specific Gravity | Calculated | Actual | |
|---|---|---|---|
| % $M_2O_3$ | | | |
| % $Al_2O_3$ | 8.10 | 8.07 | −0.03 |
| % $Fe_2O_3$ | 0.00 | | |
| % Basicity | 50.1 | 48.6 | −1.5 142.9 |
| % Sulfates | 17.07 | | |
| Turbidity, NTU | | | |

TABLE 26-continued

| | | | | | | | | | | |
|---|---|---|---|---|---|---|---|---|---|---|
| Viscosity, cps | | | | | | | | | | |
| Precipitation observations and data | | | | | | | | | | |
| Time (min) | Bulk slurry Temp. (° C.) | Bulk slurry Temp. (° F.) | Bulk slurry pH | Alum/ UP290 pump setting | $H_2O$/ SA/SAX pump setting | Comments | Alum pump rate (ml/min.) | $H_2O$/ SA/SAX pump rate (ml/min.) | Pump Ratio | |
| 0 | 21.2 | 70.2 | 3.79 | 0.6 | 7 | Agitator at 200 rpm. Started both feeds at 12:45 pm. | 2.2 | 1.6 | 1.4 | |
| 1 | 21.8 | 71.2 | 5.46 | 0.6 | 7 | | 2.2 | 1.6 | 1.4 | |
| 2 | 22.4 | 72.3 | 5.93 | 0.6 | 7 | | 2.2 | 1.6 | 1.4 | |
| 3 | 22.9 | 73.2 | 4.87 | 0.6 | 7 | | 2.2 | 1.6 | 1.4 | |
| 4 | 23.4 | 74.1 | 5.80 | 0.6 | 7 | Agitator at 250 rpm. | 2.2 | 1.6 | 1.4 | |
| 5 | 23.8 | 74.8 | 5.80 | 0.6 | 7 | | 2.2 | 1.6 | 1.4 | |
| 6 | 24.1 | 75.4 | 5.85 | 0.6 | 7 | | 2.2 | 1.6 | 1.4 | |
| 7 | 24.4 | 75.5 | 5.90 | 0.6 | 7 | | 2.2 | 1.6 | 1.4 | |
| 8 | 24.7 | 76.5 | 5.91 | 0.6 | 8 | | 2.2 | 1.8 | 1.2 | |
| 9 | 25.1 | 77.2 | 6.09 | 0.6 | 8 | | 2.2 | 1.8 | 1.2 | |
| 10 | 25.5 | 77.9 | 6.16 | 0.6 | 8 | | 2.2 | 1.8 | 1.2 | |
| 11 | 25.8 | 78.4 | 6.36 | 0.6 | 8 | | 2.2 | 1.8 | 1.2 | |
| 12 | 26. | 79.0 | 6.44 | 0.6 | 8 | | 2.2 | 1.8 | 1.2 | |
| 13 | 26.4 | 79.5 | 6.55 | 0.6 | 8 | | 2.2 | 1.8 | 1.2 | |
| 14 | 26.6 | 79.9 | 6.70 | 0.6 | 8 | | 2.2 | 1.8 | 1.2 | |
| 15 | 26.9 | 80.4 | 6.67 | 0.6 | 8 | | 2.2 | 1.8 | 1.2 | |
| 20 | 27.7 | 81.9 | 6.82 | 0.6 | 8 | | 2.2 | 1.8 | 1.2 | |
| 25 | 28.3 | 82.9 | 6.73 | 0.6 | 8 | | 2.2 | 1.8 | 1.2 | |
| 30 | 28.7 | 83.7 | 6.71 | 0.6 | 8 | | 2.2 | 1.8 | 1.2 | |
| 35 | 28.9 | 84.0 | 6.98 | 0.6 | 8 | | 2.2 | 1.8 | 1.2 | 1.3 |
| 39 | 29.1 | 84.4 | 6.98 | 0.6 | 0 | Water/soda ash/sodium aluminate mixture feed complete. | 2.2 | 0.0 | 0.0 | |
| 49 | 25.1 | 77.2 | 4.98 | 4.8 | 0 | | 17.1 | 0.0 | 0.0 | |
| 59 | 23.5 | 74.3 | 3.94 | 0.6 | 0 | Aluminum sulfate feed complete. Started Phosphoric acid (75%) solution feed. | 2.2 | 0.0 | 0.0 | |
| 65 | 23.8 | 74.8 | 3.95 | 0 | 0 | Phosphoric acid (75%) solution feed complete. | 0.0 | 0.0 | 0.0 | |
| 150 | 22.6 | 72.7 | 4.10 | 0 | 0 | Let mix overnight. Sep. 30, 2021 - 9:00 am (20.75 hrs) Solution clear. Filtered through # 541 Whatman paper. | 0.0 | 0.0 | 0.0 | |
| Average | 25.9 | 78.5 | 6.42 | | | | | | | |

TABLE 27

| | | | | | | | | | | | | | | | |
|---|---|---|---|---|---|---|---|---|---|---|---|---|---|---|---|
| | | | | UltraPAC 2361 (50% Basic PAS) | | | | | | | Headspace | | | | |
| | | | | 0.50% Phosphoric acid (75%) solution | | | Conversion Gallons | | | | Target | Initial | Actual | | |
| | Working Examples MV-125 | | | MV-125 | | | 305.8201 | 14774.7 | | | 11.4 | 4.1 | 16.0 | 16.6 | |
| | Digest Temp. (° C.) | | | | Formulation | | Target | | | | Actual | | | | |
| Target | Overnight (° C.) | % $M_2O_3$ | % Basicity | Sp. Gr. | grams | % | Pounds | Gallons | % | Min. Gallons | Pounds | Gallons | % | | |
| 40.00 | Start Up Water | 0 | | 1.000 | 40.00 | 8.28 | 12,235 | 1,468 | 8.28 | 2,100 | 12,235 | 1468 | 8.28 | | |
| 0.00 | Ferric sulfate | 17.75 | 10.5 | 1.581 | 0.00 | 0.00 | 0 | 0 | 0.00 | 0 | 0 | 0 | 0.00 | | |
| 37.41 | Solution Water | 0 | | 1.000 | 37.41 | 7.74 | 11,440 | 1,372 | 7.74 | 2,744 | 11,440 | 1465 | 7.74 | | |
| 12.50 | Sodium carbonate | 0 | | NA | 12.50 | 2.59 | 3,825 | NA | 2.59 | | 3,825 | NA | 2.59 | | |
| 44.20 | 43% Sodium aluminate | 22.96 | 149.0 | 1.520 | 44.13 | 9.13 | 13,495 | 1,065 | 9.15 | 2,437 | 13,495 | 1065 | 9.13 | % $Na_2O$ SAX | 19.35 |
| 363.40 | Alumium sulfate | 7.98 | 3.8 | 1.375 | 363.49 | 75.21 | 111,165 | 10,063 | 75.20 | | 111,165 | 10063 | 75.20 | | |
| 0.00 | Pressure PAC (UP 290) | 16.88 | 41.8 | 1.370 | 0.00 | 0.00 | 0 | 0 | 0.00 | | 0 | 0 | 0.00 | % Cl UP 290 | 20.99 |
| 2.50 | H3PO4 (75%) solution | 0 | | 1.570 | 2.50 | 0.52 | 765 | 58 | 0.52 | | 765 | 58 | 0.52 | | |
| | Flush Water | | | 1.000 | 0.00 | 0.00 | 0 | 0 | 0.00 | | 0 | 0 | 0.00 | | |
| 500.0 | Final product | 8.10 | 8.10 | 1.200 | 500.0 | 103.47 | 152,920 | 15,285 | 102.94 | | 152,925 | 13,749 | 1.03.45 | | |
| | Check | | | | 483.3 | 100.01% | 152,925 | | | 0 | 147,823 | 13,698 | 100.00% | | |
| | % SA soln | 25.0% | | 1.249 | 402.8 | 96.66% | 147,818 | −5,107 | | 147,823 | −5,102 | −50 | 96.66% | | |

| Evaporation | | | | % $Al_2O_2$ | % Basicity | % $SO_4$ | % Cl | $Cl/SO_4$ ratio | Cl + $SO_4$ | Na | Cl + $SO_4$ + Na |
|---|---|---|---|---|---|---|---|---|---|---|---|
| Expected | 0.0 | 0.00% | Evap. & $CO_2$ | 8.10% | 50.0 | 16.96 | 0.00 | 0.00 | 16.96 | 2.38 | 19.34 |
| Actual | 16.7 | 3.46% | Just $CO_2$ | 7.83% | | 16.40 | 0.00 | | 16.40 | 2.38 | 18.78 |

1. Add required amount of start up water to the reactor and start agitation. 0.9541
2. Add the required amount of water into the soda ash mix vessel and start agitator. 5,102 3.45%
3. Add required amount of sodium carbonate (soda ash) to the soda ash mix vessel and agitate until dissolved.
4. Add the required amount of 43% sodium aluminate solution into the soda ash mix vessel.
5. Add the required amount of aluminum sulfate solution to the alum holding vessel.
6. Start addition of the aluminum solution to the reactor to lower pH to less than 4.
7. Start addition of the sodium carbonate/sodium aluminate mixture to the reactor.
8. Adjust feed rates to add the solutions over desired time period maintaining the pH between 5.5 and 7.
9. When all of the sodium carbonate/sodium aluminate solution has been added let the pH fall below S.
10. When the pH falls below 5 increase the aluminum sulfate feed rate.
11. When all of the aluminim sulfate solution has been added start the phosphoric acid addition.
12. When phosphoric acid addition is completet let solution mix until all solids have dissolved.

| Analysis: Specific Gravity | Calculated | Actual | |
|---|---|---|---|
| % $M_2O_3$ | | | |
| % $Al_2O_3$ | 8.10 | 8.05 | −0.05 |
| % $Fe_2O_3$ | 0.00 | | |
| % Basicity | 50.0 | 49.0 | −1.0 145.3 |
| % Sulfates | 16.96 | | |
| Turbidity, NTU | | | |

TABLE 27-continued

| | Viscosity, cps | | | | | | | | | |
|---|---|---|---|---|---|---|---|---|---|---|
| | | | | | | Precipitation observations and data | | | | |
| Time (min) | Bulk slurry Temp. (° C.) | Bulk slurry Temp. (° F.) | Bulk slurry pH | Alum/ UP290 pump setting | $H_2O$/ SA/SAX pump setting | Comments | Alum pump rate (ml/min.) | $H_2O$/ SA/SAX pump rate (ml/min.) | Pump Ratio | |
| 0 | 21.6 | 70.9 | 3.37 | 0.6 | 8 | Agitator at 250 rpm. Started both feeds at 2:50 pm. | 2.2 | 1.8 | 1.2 | |
| 1 | 22.3 | 72.1 | 5.97 | 0.6 | 8 | | 2.2 | 1.8 | 1.2 | |
| 2 | 23.0 | 73.4 | 6.69 | 0.6 | 8 | | 2.2 | 1.8 | 1.2 | |
| 3 | 23.7 | 74.7 | 6.73 | 0.6 | 8 | | 2.2 | 1.8 | 1.2 | |
| 4 | 24.4 | 75.9 | 6.93 | 0.6 | 8 | | 2.2 | 1.8 | 1.2 | |
| 5 | 24.8 | 76.6 | 6.92 | 0.6 | 8 | | 2.2 | 1.8 | 1.2 | |
| 6 | 25.2 | 77.4 | 6.86 | 0.6 | 8 | | 2.2 | 1.8 | 1.2 | |
| 7 | 25.6 | 78.1 | 6.67 | 0.6 | 8 | | 2.2 | 1.8 | 1.2 | |
| 8 | 25.9 | 78.6 | 6.61 | 0.6 | 8 | | 2.2 | 1.8 | 1.2 | |
| 9 | 26.2 | 79.2 | 6.80 | 0.6 | 8 | | 2.2 | 1.8 | 1.2 | |
| 10 | 26.4 | 79.5 | 6.80 | 0.6 | 8 | | 2.2 | 1.8 | 1.2 | |
| 15 | 27.4 | 81.3 | 6.70 | 0.6 | 8 | | 2.2 | 1.8 | 1.2 | |
| 20 | 28.2 | 82.8 | 6.94 | 0.6 | 8 | | 2.2 | 1.8 | 1.2 | |
| 22 | 28.4 | 83.1 | 7.01 | 0.6 | 7 | | 2.2 | 1.6 | 1.4 | |
| 25 | 28.6 | 83.5 | 6.81 | 0.6 | 7 | | 2.2 | 1.6 | 1.4 | |
| 30 | 28.9 | 84.0 | 6.68 | 0.6 | 8 | | 2.2 | 1.8 | 1.2 | |
| 35 | 23.1 | 73.6 | 6.93 | 0.6 | 8 | | 2.2 | 1.8 | 1.2 | 1.3 |
| 39 | 29.2 | 84.6 | 7.01 | 0.6 | 0 | Water/soda ash/sodium aluminate mixture feed complete. | 2.2 | 0.0 | 0.0 | |
| 40 | 29.0 | 84.3 | 5.59 | 0.6 | 0 | | 2.2 | 0.0 | 0.0 | |
| 49 | 26.2 | 79.2 | 5.00 | 4.8 | 0 | | 17.1 | 0.0 | 0.0 | |
| 59 | 26.3 | 79.3 | 3.90 | 0.6 | 0 | Aluminum sulfate feed complete. | 2.2 | 0.0 | 0.0 | |
| 60 | 23.5 | 74.3 | 3.90 | 0.6 | 0 | Started Phosphoric acid (75%) solution feed. | 2.2 | 0.0 | 0.0 | |
| 66 | 24.1 | 75.4 | 3.90 | 0.6 | 0 | Phosphoric acid (75%) solution feed complete. | 2.2 | 0.0 | 0.0 | |
| 72 | 24.0 | 75.2 | 3.91 | 0.0 | 0 | Let mix overnight. | 0.0 | 0.0 | 0.0 | |
| | | | | | | Oct. 1, 2021 - 9:00 am (18.2 hrs) Solution clear. Filtered through # 541 Whatman paper. | | | | |
| Average | 26.4 | 79.5 | 5.83 | | | | | | | |

TABLE 28

| | | | | | | | | | | | | | | | |
|---|---|---|---|---|---|---|---|---|---|---|---|---|---|---|---|
| | | | | | | UltraPAC 2361 (50% Basic PAS) | | | | | Headspace | | | | |
| | | | | 1.0% Phosphoric acid (75%) solution | | | Conversion Gallons | | | | Target | Initial | Actual | | |
| | Working Examples MV-128 | | | MV-128 | | | 305.4409 | 14774.7 | | | 11.4 | 3.9 | 16.0 | 16.9 | |
| | Digest Temp. (° C.) | | | | Formulation | | Target | | | | Actual | | | | |
| Target | Overnight (° C.) | % $M_2O_3$ | % Basicity | Sp. Gr. | grams | % | Pounds | Gallons | % | Min. Gallons | Pounds | Gallons | % | | |
| 40.00 | Start Up Water | 0 | | 1.000 | 40.00 | 8.27 | 12,220 | 1,466 | 8.27 | 2,100 | 12,220 | 1466 | 8.27 | | |
| 0.00 | Ferric sulfate | 17.75 | 10.9 | 1.581 | 0.00 | 0.00 | 0 | 0 | 0.00 | 0 | 0 | 0 | 0.00 | | |
| 37.41 | Solution Water | 0 | | 1.000 | 37.43 | 7.73 | 11,435 | 1,372 | 7.74 | 2,743 | 11,435 | 1464 | 7.74 | | |
| 12.50 | Sodium carbonate | 0 | | NA | 12.51 | 2.59 | 3,820 | NA | 2.58 | | 3,820 | NA | 2.58 | | |
| 46.30 | 43% Sodium aluminate | 22.96 | 149.0 | 1.520 | 46.46 | 9.60 | 14,190 | 1,120 | 9.60 | 2,491 | 14,190 | 1120 | 9.60 | % $Na_2O$ SAX | 19.35 |
| 358.80 | Alumium sulfate | 7.98 | 3.8 | 1.325 | 359.38 | 74.26 | 109,770 | 9,937 | 74.26 | | 109,770 | 9937 | 74.26 | | |
| 0.00 | Pressure PAC (UP 290) | 16.88 | 41.8 | 1.370 | 0.00 | 0.00 | 0 | 0 | 0.00 | | 0 | 0 | 0.00 | % Cl UP 290 | 20.99 |
| 5.00 | H3PO4 (75%) solution | 0 | | 1.570 | 5.28 | 1.09 | 1,615 | 123 | 1.09 | | 1,615 | 123 | 1.09 | | |
| | Flush Water | | | 1.000 | 0.00 | 0.00 | 0 | 0 | 0.00 | | 0 | 0 | 0.00 | | |
| 500.0 | Final product | 8.13 | 8.13 | 1.200 | 501.3 | 103.54 | 153,045 | 15,298 | 102.45 | | 153,050 | 13,749 | 103.54 | | |
| | Check | | | | 483.9 | 100.00% | 153,050 | | | 0 | 147,823 | 13,674 | 100.00% | | |
| | % SA soln | 25.1% | | 1.249 | 403.3 | 96.58% | 147,818 | −5,232 | | 147,823 | −5,227 | −75 | 96.58% | | |

| | Evaporation | | | % $Al_2O_2$ | % Basicity | % $SO_4$ | % Cl | $Cl/SO_4$ ratio | Cl + $SO_4$ | Na | Cl + $SO_4$ + Na |
|---|---|---|---|---|---|---|---|---|---|---|---|
| Expected | 0.0 | 0.00% | Evap. & $CO_2$ | 8.13% | 49.9 | 16.75 | 0.00 | 0.00 | 16.75 | 2.45 | 19.20 |
| Actual | 17.1 | 3.54% | Just $CO_2$ | 7.85% | | 16.18 | 0.00 | | 16.18 | 2.45 | 18.62 |

1. Add required amount of start up water to the reactor and start agitation. 0.9541
2. Add the required amount of water into the soda ash mix vessel and start agitator. 5,227 3.54%
3. Add required amount of sodium carbonate (soda ash) to the soda ash mix vessel and agitate until dissolved.
4. Add the required amount of 43% sodium aluminate solution into the soda ash mix vessel.
5. Add the required amount of aluminum sulfate solution to the alumni holding vessel.
6. Start addition of the aluminum solution and the sodium carbonate/sodium aluminate mixture to the reactor.
7. Adjust feed rates to add the solutions over desired time period maintaining the ph between 5.5 and 7.
8. When all of the sodium carbonate/sodium aluminate solution has been added let the pH fall below 5.
9. When the pH falls below 5 increase the aluminum sulfate feed rate.
10. When all of the aluminim sulfate solution has been added start the phosphoric acid addition.
11. When phosphoric acid addition is completet let solution mix until all solids have dissolved.

| Analysis:<br>Specific Gravity | Calculated | Actual | |
|---|---|---|---|
| % $M_2O_3$ | | | |
| % $Al_2O_3$ | 8.13 | 8.09 | −0.04 |
| % $Fe_2O_3$ | 0.00 | | |
| % Basicity | 49.9 | 48.8 | −1.1 145.1 |
| % Sulfates | 1.6.75 | | |
| Turbidity, NTU | | | |
| Viscosity, cps | | | |

TABLE 28-continued

| Precipitation observations and data | | | | | | | | | | |
|---|---|---|---|---|---|---|---|---|---|---|
| Time (min) | Bulk slurry Temp. (° C.) | Bulk slurry Temp. (° F.) | Bulk slurry pH | Alum/ UP290 pump setting | $H_2O$/ SA/SAX pump setting | Comments | Alum pump rate (ml/min.) | $H_2O$/ SA/SAX pump rate (ml/min.) | Pump Ratio | |
| 0 | 22.1 | 71.8 | 5.14 | 0.6 | 8 | Agitator at 250 rpm. Started both feeds at 2:15 pm. No initial alum. | 2.2 | 1.8 | 1.2 | |
| 1 | 22.9 | 73.2 | 5.49 | 0.6 | 8 | | 2.2 | 1.8 | 1.2 | |
| 2 | 23.7 | 74.7 | 6.36 | 0.6 | 8 | | 2.2 | 1.8 | 1.2 | |
| 3 | 24.4 | 75.9 | 6.09 | 0.6 | 8 | | 2.2 | 1.8 | 1.2 | |
| 4 | 24.9 | 76.8 | 6.67 | 0.6 | 8 | | 2.2 | 1.8 | 1.2 | |
| 5 | 25.3 | 77.5 | 6.31 | 0.6 | 8 | | 2.2 | 1.8 | 1.2 | |
| 6 | 25.7 | 78.3 | 6.51 | 0.6 | 8 | | 2.2 | 1.8 | 1.2 | |
| 7 | 26.0 | 78.8 | 6.91 | 0.6 | 8 | | 2.2 | 1.8 | 1.2 | |
| 8 | 26.3 | 79.3 | 7.13 | 0.6 | 7 | | 2.2 | 1.6 | 1.4 | |
| 9 | 26.5 | 79.7 | 6.93 | 0.6 | 7 | | 2.2 | 1.6 | 1.4 | |
| 10 | 26.7 | 80.1 | 6.85 | 0.6 | 7 | | 2.2 | 1.6 | 1.4 | |
| 11 | 26.9 | 80.4 | 6.56 | 0.6 | 7 | | 2.2 | 1.6 | 1.4 | |
| 12 | 27.1 | 80.8 | 6.41 | 0.6 | 8 | | 2.2 | 1.8 | 1.2 | |
| 13 | 27.3 | 81.1 | 6.57 | 0.6 | 8 | | 2.2 | 1.8 | 1.2 | |
| 14 | 27.5 | 81.5 | 6.53 | 0.6 | 8 | | 2.2 | 1.8 | 1.2 | |
| 15 | 27.7 | 81.9 | 6.54 | 0.6 | 8 | | 2.2 | 1.8 | 1.2 | |
| 20 | 28.5 | 83.3 | 7.00 | 0.6 | 7 | | 2.2 | 1.6 | 1.4 | |
| 25 | 28.9 | 84.0 | 6.75 | 0.6 | 7 | | 2.2 | 1.6 | 1.4 | |
| 30 | 29.1 | 84.4 | 6.59 | 0.6 | 8 | | 2.2 | 1.8 | 1.2 | |
| 35 | 29.5 | 85.1 | 6.79 | 0.6 | 8 | | 2.2 | 1.8 | 1.2 | |
| 40 | 29.7 | 85.5 | 6.94 | 0.6 | 8 | | 2.2 | 1.8 | 1.2 | 1.3 |
| 41 | 29.7 | 85.5 | 6.99 | 0.6 | 0 | Water/soda ash/sodium aluminate mixture feed complete. | 2.2 | 0.0 | 0.0 | |
| 51 | 26.6 | 79.9 | 4.98 | 4.8 | 0 | | 17.1 | 0.0 | 0.0 | |
| 63 | 24.0 | 75.2 | 3.98 | 0.0 | 0 | Aluminum sulfate feed complete. | 0.0 | 0.0 | 0.0 | |
| 65 | 24.0 | 75.2 | 3.99 | 0.6 | 0 | Started Phosphoric acid (75%) solution feed. | 2.2 | 0.0 | 0.0 | |
| 68 | 25.3 | 77.5 | 3.97 | 0.0 | 0 | Phosphoric acid (75%) solution feed complete. | 0.0 | 0.0 | 0.0 | |
| 95 | 24.5 | 76.1 | 4.08 | 0.0 | 0 | Let mix overnight. | 0.0 | 0.0 | 0.0 | |
| | | | | | | Oct. 5, 2021 - 8:30 am (18.25 hrs) Solution clear. Filtered through # 541 Whatman paper. | | | | |
| Average | 26.9 | 80.5 | 6.72 | | | | | | | |

TABLE 29

| | | | | | | | | | | | | | | | |
|---|---|---|---|---|---|---|---|---|---|---|---|---|---|---|---|
| | | | | | | | UltraPAC 2361 (50% Basic PAS) | | | | Headspace | | | | |
| | | | | 1.5% Phosphoric acid (75%) solution | | | Conversion Gallons | | | | Target | Initial | Actual | | |
| | Working Examples MV-131 | | | MV-131 | | | 305.4220 | 14774.7 | | | 11.4 | 4.4 | 16.0 | 17.1 | |
| | Digest Temp. (° C.) | | | | Formulation | | Target | | | | Actual | | | | |
| Target | Overnight (° C.) | % $M_2O_3$ | % Basicity | Sp. Gr. | grams | % | Pounds | Gallons | % | Min. Gallons | Pounds | Gallons | % | | |
| 40.00 | Start Up Water | 0 | | 1.000 | 40.00 | 8.27 | 12,215 | 1,465 | 8.26 | 2,100 | 12,215 | 1465 | 8.26 | | |
| 0.00 | Ferric sulfate | 17.75 | 10.5 | 1.581 | 0.00 | 0.00 | 0 | 0 | 0.00 | 0 | 0 | 0 | 0.00 | | |
| 37.41 | Solution Water | 0 | | 1.000 | 37.42 | 7.73 | 11,430 | 1,371 | 7.73 | 2,742 | 11,430 | 1464 | 7.73 | | |
| 12.50 | Sodium carbonate | 0 | | NA | 12.50 | 2.58 | 3,820 | NA | 2.58 | | 3,820 | NA | 2.58 | | |
| 50.10 | 43% Sodium aluminate | 22.96 | 149.0 | 1.520 | 50.99 | 10.54 | 15,575 | 1,229 | 10.54 | 2,600 | 15,575 | 1229 | 10.54 | % $Na_2O$ SAX | 19.35 |
| 352.50 | Alumium sulfate | 8.07 | 2.7 | 1.325 | 351.56 | 72.64 | 107,375 | 9,720 | 72.64 | | 107,375 | 9720 | 72.64 | | |
| 0.00 | Pressure PAC (UP 290) | 16.88 | 41.8 | 1.370 | 0.00 | 0.00 | 0 | 0 | 0.00 | | 0 | 0 | 0.00 | % Cl UP 290 | 20.99 |
| 7.50 | H3PO4 (7%) solution | 0 | | 1.570 | 7.60 | 1.57 | 2,320 | 177 | 1.57 | | 2,320 | 177 | 1.57 | | |
| | Flush Water | | | 1.000 | 0.00 | 0.00 | 0 | 0 | 0.00 | | 0 | 0 | 0.00 | | |
| 500.0 | Final product | 8.28 | 8.28 | 1.200 | 500.07 | 103.33 | 152,730 | 15,266 | 101.76 | | 152,755 | 13,749 | 103.33 | | |
| | Check | | | | 483.96 | 100.00% | 152,735 | | | 0 | 147,820 | 13,657 | 100.00% | | |
| | % SA soln | 25.0% | | 1.249 | 403.30 | 96.78% | 147,815 | −4,920 | | 147,820 | −4,915 | −92 | 96.78% | | |

| | Evaporation | | | % $Al_2O_2$ | % Basicity | % $SO_4$ | % Cl | $Cl/SO_4$ ratio | Cl + $SO_4$ | Na | Cl + $SO_4$ + Na |
|---|---|---|---|---|---|---|---|---|---|---|---|
| Expected | 0.0 | 0.00% | Evap. & $CO_2$ | 8.28% | 50.5 | 16.57 | 0.00 | 0.00 | 16.57 | 2.58 | 19.15 |
| Actual | 16.11 | 3.33% | Just $CO_2$ | 8.01% | | 16.04 | 0.00 | | 16.04 | 2.58 | 18.61 |

1. Add required amount of start up water to the reactor and start agitation. 0.9541
2. Add the required amount of water into the soda ash mix vessel and start agitator. 4,915 3.33%
3. Add required amount of sodium carbonate (soda ash) to the soda ash mix vessel and agitate until dissolved.
4. Add the required amount of 43% sodium aluminate solution into the soda ash mix vessel.
5. Add the required amount of aluminum sulfate solution to the alum holding vessel.
6. Start addition of the aluminum solution and the sodium carbonate/sodium aluminate mixture to the reactor.
7. Adjust feed rates to add the solutions over desired time period maintaining the pH between 5.5 and 7.
8. When all of the sodium carbonate/sodium aluminate solution has been added let the pH fall below 5.
9. When the pH falls below 5 increase the aluminum sulfate feed rate.
10. When all of the aluminim sulfate solution has been added start the phosphoric acid addition.
11. When phosphoric acid addition is completet let solution mix until all solids have dissolved.

| Analysis:<br>Specific Gravity | Calculated | Actual | |
|---|---|---|---|
| % $M_2O_3$ | | | |
| % $Al_2O_3$ | 8.28 | 8.20 | −0.08 |
| % $Fe_2O_3$ | 0.00 | | |
| % Basicity | 50.5 | 50.3 | −0.2 148.3 |
| % Sulfates | 16.57 | | |
| Turbidity, NTU | | | |
| Viscosity, cps | | | |

TABLE 29-continued

| Precipitation observations and data | | | | | | | | | | |
|---|---|---|---|---|---|---|---|---|---|---|
| Time (min) | Bulk slurry Temp. (° C.) | Bulk slurry Temp. (° F.) | Bulk slurry pH | Alum/ UP290 pump setting | $H_2O$/ SA/SAX pump setting | Comments | Alum pump rate (ml/min.) | $H_2O$/ SA/SAX pump rate (ml/min.) | Pump Ratio | |
| 0 | 21.5 | 70.7 | 5.72 | 0.6 | 8 | Agitator at 2.50 rom. Started both feeds at 2:55 pm. No initial alum. | 7.2 | 1.8 | 1.2 | |
| 1 | 22.3 | 72.1 | 6.16 | 0.6 | 8 | | 2.2 | 1.8 | 1.2 | |
| 2 | 23.1 | 73.6 | 6.91 | 0.6 | 7 | | 2.2 | 1.6 | 1.4 | |
| 3 | 23.6 | 74.5 | 5.65 | 0.6 | 8 | | 2.2 | 1.8 | 1.2 | |
| 4 | 24.2 | 75.6 | 5.88 | 0.6 | 8 | | 2.2 | 1.8 | 1.2 | |
| 5 | 24.6 | 76.3 | 6.13 | 0.6 | 8 | | 2.2 | 1.8 | 1.2 | |
| 6 | 25.1 | 77.2 | 6.27 | 0.6 | 8 | | 2.2 | 1.8 | 1.2 | |
| 7 | 25.9 | 77.9 | 6.45 | 0.6 | 8 | | 2.2 | 1.8 | 1.2 | |
| 8 | 25.8 | 78.4 | 6.79 | 0.6 | 8 | | 2.2 | 1.8 | 1.2 | |
| 9 | 26.1 | 79.0 | 7.05 | 0.7 | 8 | | 2.6 | 1.8 | 1.4 | |
| 10 | 26.5 | 79.7 | 7.00 | 0.7 | 8 | | 2.6 | 1.8 | 1.4 | |
| 11 | 26.7 | 80.1 | 6.79 | 0.7 | 8 | | 2.6 | 1.8 | 1.4 | |
| 12 | 26.9 | 80.4 | 6.62 | 0.7 | 8 | | 2.6 | 1.8 | 1.4 | |
| 13 | 27.2 | 81.0 | 6.61 | 0.7 | 8 | | 2.6 | 1.8 | 1.4 | |
| 14 | 27.4 | 81.3 | 6.43 | 0.7 | 8 | | 2.6 | 1.8 | 1.4 | |
| 15 | 27.6 | 81.7 | 6.50 | 0.7 | 8 | | 2.6 | 1.8 | 1.4 | |
| 20 | 28.4 | 83.1 | 6.26 | 0.6 | 8 | | 2.2 | 1.8 | 1.2 | |
| 25 | 29.0 | 84.2 | 6.71 | 0.6 | 8 | | 2.2 | 1.8 | 1.2 | |
| 30 | 29.2 | 84.6 | 6.92 | 0.7 | 8 | | 2.6 | 1.8 | 1.4 | |
| 35 | 29.6 | 84.9 | 6.56 | 0.7 | 8 | | 2.6 | 1.8 | 1.4 | |
| 41 | 29.7 | 85.5 | 6.56 | 0.7 | 0 | Water/soda ash/sodium aluminate mixture feed complete. | 2.6 | 0.2 | 12.1 | 2.0 |
| 53 | 26.0 | 78.8 | 4.71 | 4.8 | 0 | | 17.1 | 0.0 | 0.0 | |
| 66 | 24.0 | 75.2 | 4.03 | 0.6 | 0 | Aluminum sulfate feed complete. Started Phosphoric acid (75%) solution feed. | 2.2 | 0.0 | 0.0 | |
| 71 | 26.1 | 79.0 | 3.97 | 0.0 | 0 | Phosphoric acid (75%) solution feed complete | 0.0 | 0.0 | 0.0 | |
| 80 | 25.8 | 78.4 | 4.03 | 0 | 0 | Let mix overnight. | 0.1 | 0.0 | 0.0 | |
| | | | | | | Oct. 7, 2021 - 9:00 am (18.1 hrs) Solution clear. Filtered through # 541 Whatman paper. | 0.0 | 0.0 | 0.0 | |
| Average | 26.5 | 80.3 | 5.60 | | | | | | | |

TABLE 30

| | | | | | | | | | | | | | | | |
|---|---|---|---|---|---|---|---|---|---|---|---|---|---|---|---|
| | | | | | 60% Basic PAS | | | | | | Headspace | | | | |
| | | | | 0.50% Phosphoric acid (75%) solution | | | Conversion Gallons | | | | Target | Initial | Actual | | |
| | Working Examples MV-142 | | | MV-142 | | | 307.8647 | 14774.7 | | | 11. | 2.5 | 16.0 | 17.8 | |
| | Digest Temp. (° C.) | | | | Formulation | | Target | | | | Actual | | | | |
| Target | Overnight (° C.) | % $M_2O_3$ | % Basicity | Sp. Gr. | grams | % | Pounds | Gallons | % | Min. Gallons | Pounds | Gallons | % | | |
| 40.00 | Start Up Water | 0 | | 1.000 | 40.00 | 8.33 | 12,315 | 1,477 | 8.33 | 2,100 | 12,315 | 1477 | 8.33 | | |
| 0.00 | Ferric sulfate | 17.75 | 10.5 | 1.581 | 0.00 | 0.00 | 0 | 0 | 0.00 | 0 | 0 | 0 | 0.00 | | |
| 37.41 | Solution Water | 0 | | 1.000 | 37.42 | 7.79 | 11,520 | 1,382 | 7.79 | 2,764 | 11,520 | 1476 | 7.79 | | |
| 12.50 | Sodium carbonate | 0 | | NA | 12.50 | 2.60 | 3,850 | NA | 2.60 | | 3,850 | NA | 2.60 | | |
| 61.80 | 43% Sodium aluminate | 22.96 | 149.0 | 1.520 | 61.87 | 12.89 | 19,050 | 1,503 | 12.89 | 2,885 | 19,050 | 1503 | 12.89 | % $Na_2O$ SAX | 19.35 |
| 345.80 | Alumium sulfate | 8.07 | 2.7 | 1.325 | 345.87 | 72.04 | 106,480 | 9,639 | 72.04 | | 106,480 | 9639 | 72.04 | | |
| 0.00 | Pressure PAC (UP 290) | 16.88 | 41.8 | 1.370 | 0.00 | 0.00 | 0 | 0 | 0.00 | | 0 | 0 | 0.00 | % Cl UP 290 | 20.99 |
| 2.50 | H3PO4 (75%) solution | 0 | | 1.570 | 2.65 | 0.55 | 815 | 62 | 0.55 | | 815 | 62 | 0.55 | | |
| | Flush Water | | | 1.000 | 0.00 | 0.00 | 0 | 0 | 0.00 | | 0 | 0 | 0.00 | | |
| 500.0 | Final product | 8.77 | 8.77 | 1.200 | 500.3 | 104.20 | 154,030 | 15,396 | 103.65 | | 154,030 | 13,749 | 104.21 | | |
| | Check | | | | 480.1 | 99.99% | 154,030 | | | 0 | 147,814 | 13,604 | 100.00% | | |
| | % SA soln | 25.0% | | 1.249 | 400.1 | 95.96% | 147,814 | −6,216 | | 147,814 | −6,216 | −145 | 95.96% | | |

| Evaporation | | | | % $Al_2O_2$ | % Basicity | % $SO_4$ | % Cl | $Cl/SO_4$ ratio | Cl + $SO_4$ | Na | Cl + $SO_4$ + Na |
|---|---|---|---|---|---|---|---|---|---|---|---|
| Expected | 0.0 | 0.00% | Evap. & $CO_2$ | 8.77% | 59.9 | 16.45 | 0.00 | 0.00 | 16.43 | 2.92 | 19.35 |
| Actual | 20.2 | 4.21% | Just $CO_2$ | 8.42% | | 15.77 | 0.00 | | 15.77 | 2.9 | 18.69 |

1. Add required amount of start up water to the reactor and start agitation. 0.9541
2. Add the required amount of water into the soda ash mix vessel and start agitator. 6,216 4.21%
3. Add required amount of sodium carbonate (soda ash) to the soda ash mix vessel and agitate until dissolved.
4. Add the required amount of 43% sodium aluminate solution into the soda ash mix vessel.
5. Add the required amount of aluminum sulfate solution to the alum holding vessel.
6. Start addition of the aluminum solution and the sodium carbonate/sodium aluminate mixture to the reactor.
7. Adjust feed rates to add the solutions over desired time period maintaining the pH between 5.5 and 7.
8. When all of the sodium carbonate/sodium aluminate solution has been added let the pH fall below 5.
9. When the pH falls below 5 increase the aluminum sulfate feed rate.
10. When all of the aluminim sulfate solution has been added start the phosphoric acid addition.
11. When phosphoric acid addition is completet let solution mix until all solids have dissolved.

| Analysis:<br>Specific Gravity | Calculated | Actual | |
|---|---|---|---|
| % $M_2O_3$ | | | |
| % $Al_2O_3$ | 8.77 | 8.78 | 0.01 |
| % $Fe_2O_3$ | 0.00 | | |
| % Basicity | 59.9 | 59.3 | −0.6 147.1 |
| % Sulfates | 16.43 | | |
| Turbidity, NTU | | | |
| Viscosity, cps | | | |

TABLE 30-continued

| Precipitation observations and data | | | | | | | | | | |
|---|---|---|---|---|---|---|---|---|---|---|
| Time (min) | Bulk slurry Temp. (° C.) | Bulk slurry Temp. (° F.) | Bulk slurry pH | Alum/ UP290 pump setting | $H_2O$/ SA/SAX pump setting | Comments | Alum pump rate (ml/min.) | $H_2O$/ SA/SAX pump rate (ml/min.) | Pump Ratio | |
| 0 | 20.3 | 68.5 | 6.64 | 0.6 | 6 | Agitator at 200 rpm. Started both feeds at 11:59 pm. No initial alum. | 2.2 | 1.4 | 1.6 | |
| 1 | 20.9 | 69.6 | 3.84 | 0.6 | 6 | | 2.2 | 1.4 | 1.6 | |
| 2 | 21.5 | 70.7 | 4.01 | 0.6 | 7 | | 2.2 | 1.6 | 1.4 | |
| 3 | 22.2 | 72.0 | 4.11 | 0.6 | 8 | | 2.2 | 1.8 | 1.2 | |
| 4 | 22.7 | 72.9 | 4.46 | 0.6 | 8 | | 2.2 | 1.8 | 1.2 | |
| 5 | 23.0 | 73.4 | 4.82 | 0.6 | 8 | | 2.2 | 1.8 | 1.2 | |
| 6 | 23.8 | 74.8 | 5.24 | 0.6 | 8 | | 2.2 | 1.8 | 1.2 | |
| 7 | 24.4 | 75.9 | 5.34 | 0.6 | 8 | | 2.2 | 1.8 | 1.2 | |
| 8 | 25.0 | 77.0 | 5.50 | 0.6 | 8 | | 2.2 | 1.8 | 1.2 | |
| 9 | 25.7 | 78.3 | 6.10 | 0.6 | 8 | | 2.2 | 1.8 | 1.2 | |
| 10 | 26.1 | 79.0 | 6.14 | 0.6 | 8 | | 2.2 | 1.8 | 1.2 | |
| 11 | 26.5 | 79.7 | 6.41 | 0.6 | 8 | | 2.2 | 1.8 | 1.2 | |
| 12 | 26.8 | 80.2 | 6.57 | 0.6 | 7 | | 2.2 | 1.6 | 1.4 | |
| 13 | 27.3 | 80.8 | 6.53 | 0.6 | 7 | | 2.2 | 1.6 | 1.4 | |
| 14 | 27.3 | 81.1 | 6.53 | 0.6 | 7 | | 2.2 | 1.6 | 1.4 | |
| 15 | 27.5 | 81.5 | 6.56 | 0.6 | 7 | | 2.2 | 1.6 | 1.4 | |
| 20 | 28.2 | 82.8 | 6.77 | 0.6 | 6 | | 2.2 | 1.4 | 1.6 | |
| 25 | 28.4 | 83.1 | 6.32 | 0.6 | 7 | | 2.2 | 1.6 | 1.4 | |
| 30 | 28.9 | 84.0 | 6.41 | 0.6 | 7 | | 2.2 | 1.6 | 1.4 | |
| 35 | 29.2 | 84.6 | 6.35 | 0.6 | 8 | | 2.2 | 1.8 | 1.2 | |
| 37 | 29.4 | 84.9 | 6.64 | 0.6 | 7 | | 2.2 | 1.6 | 1.4 | |
| 40 | 29.6 | 85.3 | 6.62 | 0.6 | 7 | | 2.2 | 1.6 | 1.4 | |
| 45 | 29.8 | 85.6 | 6.43 | 0.6 | 7 | | 2.2 | 1.6 | 1.4 | |
| 50 | 29.9 | 85.8 | 6.64 | 0.6 | 7 | | 2.2 | 1.6 | 1.4 | 1.3 |
| 51 | 29.9 | 85.8 | 6.64 | 0.6 | 0 | Water/soda ash/sodium aluminate mixture feed complete. | 2.2 | 0.0 | 0.0 | |
| 62 | 27.2 | 81.0 | 4.96 | 4.8 | 0 | | 17.1 | 0.0 | 0.0 | |
| 70 | 24.5 | 76.1 | 4.07 | 0.6 | 0 | Aluminum sulfate feed complete. | 2.2 | 0.0 | 0.0 | |
| 71 | 24.4 | 75.9 | 4.09 | 0.6 | 0 | Started Phosphoric acid (75%) solution feed | 2.2 | 0.0 | 0.0 | |
| 74 | 25.0 | 77.0 | 4.10 | 0 | 0 | Phosphoric acid (75%) solution feed complete. | 0.0 | 0.0 | 0.0 | |
| 82 | 24.9 | 76.8 | 4.12 | 0 | 0 | Let mix overnight. | 0.0 | 0.0 | 0.0 | |
| | | | | | | Oct. 20, 2021 - 8:30 am (20.5 hrs) Solution still cloudy. Let mix overnight. | | | | |
| | | | | | | Oct. 21, 2021 - 9:30 am (45.5 hrs) Solution dear. Filtered through # 541 Whatman paper. | | | | |
| Average | 26.9 | 80.4 | 6.23 | | | | | | | |

TABLE 31

| | | | | | | | | | | | | | | | |
|---|---|---|---|---|---|---|---|---|---|---|---|---|---|---|---|
| | | | | | | | 60% Basic PAS | | | | Headspace | | | | |
| | | | | 0.50% Phosphoric acid (75%) solution | | | Conversion Gallons | | | | Target | Initial | Actual | | |
| | Working Examples MV-145 | | | MV-145 | | | 295.6772 | 14774.7 | | | 11.4 | 11.4 | 16.0 | 14.9 | |
| | Digest Temp. (° C.) | | | | Formulation | | Target | | | | Actual | | | | |
| Target | Overnight (° C.) | % $M_2O_3$ | % Basicity | Sp. Gr. | grams | % | Pounds | Gallons | % | Min. Gallons | Pounds | Gallons | % | | |
| 40.00 | Start Up Water | 0 | | 1.000 | 40.00 | 8.00 | 11,825 | 1,418 | 8.00 | 2,100 | 11,825 | 1418 | 8.00 | | |
| 0.00 | Ferric sulfate | 17.75 | 10.5 | 1.581 | 0.00 | 0.00 | 0 | 0 | 0.00 | 0 | 0 | 0 | 0.00 | | |
| 45.00 | Solution Water | 0 | | 1.000 | 45.00 | 9.00 | 13,305 | 1,596 | 9.00 | 3,192 | 13,305 | 1704 | 9.00 | | |
| 15.00 | Sodium carbonate | 0 | | NA | 15.00 | 3.00 | 4,435 | NA | 3.00 | | 4,435 | NA | 3.00 | | |
| 56.80 | 43% Sodium aluminate | 22.96 | 149.0 | 1.520 | 56.80 | 11.36 | 16,795 | 1,325 | 11.36 | 2,921 | 16,795 | 1325 | 11.36 | % $Na_2O$ SAX | 19.35 |
| 340.61 | Alumium sulfate | 8.07 | 2.7 | 1.325 | 340.61 | 68.13 | 100,710 | 9,117 | 68.13 | | 100,710 | 9117 | 68.13 | | |
| 0.00 | Pressure PAC (UP 290) | 16.88 | 41.8 | 1.370 | 0.00 | 0.00 | 0 | 0 | 0.00 | | 0 | 0 | 0.00 | % Cl UP 290 | 20.99 |
| 2.50 | H3PO4 (75%) solution | 0 | | 1.570 | 2.50 | 0.50 | 740 | 57 | 0.50 | | 740 | 57 | 0.50 | | |
| | Flush Water | | | 1.000 | 0.00 | 0.00 | 0 | 0 | 0.00 | | 0 | 0 | 0.00 | | |
| 499.9 | Final product | 8.11 | 8.11 | 1.200 | 499.9 | 99.99 | 147,810 | 14,774 | 99.50 | | 147,810 | 13,749 | 100.00 | | |
| | Check | | | | 499.9 | 99.99% | 147,810 | | | 0 | 147,810 | 13,842 | 100.00% | | |
| | % SA soln | 25.0% | | 1.249 | 416.6 | 100.00% | 147,810 | 0 | | 147,810 | 0 | 93 | 100.00% | | |

| | Evaporation | | | % $Al_2O_2$ | % Basicity | % $SO_4$ | % Cl | $Cl/SO_4$ ratio | Cl + $SO_4$ | Na | Cl + $SO_4$ + Na |
|---|---|---|---|---|---|---|---|---|---|---|---|
| Expected | 0.0 | 0.00% | Evap. & $CO_2$ | 8.11% | 60.0 | 15.54 | 0.00 | 0.00 | 15.54 | 2.87 | 18.41 |
| Actual | 0.0 | 0.00% | Just $CO_2$ | 8.11% | | 15.54 | 0.00 | | 15.54 | 2.87 | 18.41 |

1. Add required amount of start up water to the reactor and start agitation. 0.9541
2. Add the required amount of water into the soda ash mix vessel and start agitator. 0 0.00%
3. Add required amount of sodium carbonate (soda ash) to the soda ash mix vessel and agitate until dissolved.
4. Add the required amount of 43% sodium aluminate solution into the soda ash mix vessel.
5. Add the required amount of aluminum sulfate solution to the alumni holding vessel.
6. Start addition of the aluminum solution and the sodium carbonate/sodium aluminate mixture to the reactor.
7. Adjust feed rates to add the solutions over desired time period maintaining the phi between 5.5 and 7.
8. When all of the sodium carbonate/sodium aluminate solution has been added let the pH fall below 5.
9. When the pH falls below 5 increase the aluminum sulfate feed rate.
10. When all of the aluminim sulfate solution has been added start the phosphoric acid addition.
11. When phosphoric acid addition is completet let solution mix until all solids have dissolved.

| Analysis:<br>Specific Gravity | Calculated | Actual | |
|---|---|---|---|
| % $M_2O_3$ | | | |
| % $Al_2O_3$ | 8.11 | 8.58 | 0.47 |
| % $Fe_2O_3$ | 0.00 | | |
| % Basicity | 60.0 | 60.0 | 0.0 148.9 |
| % Sulfates | 15.54 | | |
| Turbidity, NTU | | | |
| Viscosity, cps | | | |

TABLE 31-continued

| Precipitation observations and data | | | | | | | | | | |
|---|---|---|---|---|---|---|---|---|---|---|
| Time (min) | Bulk slurry Temp. (° C.) | Bulk slurry Temp. (° F.) | Bulk slurry pH | Alum/ UP290 pump setting | $H_2O$/ SA/SAX pump setting | Comments | Alum pump rate (ml/min.) | $H_2O$/ SA/SAX pump rate (ml/min.) | Pump Ratio | |
| 0 | 21.8 | 71.2 | 6.31 | 0.6 | 6 | Agitator at 200 rpm. Started both feeds at 2:30 pm. No initial alum. | 2.2 | 1.4 | 1.6 | |
| 1 | 22.5 | 72.5 | 4.84 | 0.6 | 6 | | 2.2 | 1.4 | 1.6 | |
| 2 | 23.1 | 73.6 | 4.95 | 0.6 | 7 | | 2.2 | 1.6 | 1.4 | |
| 3 | 23.6 | 74.5 | 5.16 | 0.6 | 8 | | 2.2 | 1.8 | 1.2 | |
| 4 | 24.7 | 76.5 | 6.70 | 0.6 | 7 | | 2.2 | 1.6 | 1.4 | |
| 5 | 25.1 | 77.2 | 5.86 | 0.6 | 7 | | 2.2 | 1.6 | 1.4 | |
| 6 | 25.6 | 78.1 | 5.99 | 0.6 | 8 | | 2.2 | 1.8 | 1.2 | |
| 7 | 26.1 | 79.0 | 6.16 | 0.6 | 8 | | 2.2 | 1.8 | 1.2 | |
| 8 | 26.6 | 79.9 | 6.30 | 0.6 | 8 | | 2.2 | 1.8 | 1.2 | |
| 9 | 27.0 | 80.6 | 6.44 | 0.6 | 8 | | 2.2 | 1.8 | 1.2 | |
| 10 | 27.4 | 81.3 | 6.56 | 0.6 | 8 | | 2.2 | 1.8 | 1.2 | |
| 11 | 27.7 | 81.9 | 6.67 | 0.6 | 7 | | 2.2 | 1.6 | 1.4 | |
| 12 | 27.9 | 82.2 | 6.63 | 0.6 | 7 | | 2.2 | 1.6 | 1.4 | |
| 13 | 28.0 | 82.4 | 6.59 | 0.6 | 7 | | 2.2 | 1.6 | 1.4 | |
| 14 | 28.2 | 82.8 | 6.54 | 0.6 | 7 | | 2.2 | 1.6 | 1.4 | |
| 15 | 28.3 | 82.9 | 6.47 | 0.6 | 7 | | 2.2 | 1.6 | 1.4 | |
| 20 | 29.0 | 84.2 | 6.53 | 0.6 | 7 | | 2.2 | 1.6 | 1.4 | |
| 25 | 29.4 | 84.5 | 6.35 | 0.5 | 8 | | 2.2 | 1.8 | 1.2 | |
| 30 | 29.9 | 85.8 | 6.60 | 0.6 | 8 | | 2.2 | 1.8 | 1.2 | |
| 40 | 30.6 | 87.1 | 6.91 | 0.6 | 7 | | 2.2 | 1.6 | 1.4 | |
| 45 | 30.6 | 87.1 | 6.72 | 0.6 | 7 | | 2.2 | 1.6 | 1.4 | |
| 52 | 30.7 | 87.3 | 6.56 | 0.6 | 7 | Water/soda ash/sodium aluminate mixture feed complete. | 2.2 | 1.6 | 1.4 | 1.3 |
| 64 | 27.3 | 81.3 | 4.97 | 4.8 | 0 | | 17.1 | 0.0 | 0.0 | |
| 71 | 25.2 | 77.6 | 4.22 | 0.6 | 0 | | 2.2 | 0.0 | 0.0 | |
| 77 | 25.0 | 77.0 | 4.25 | 0.6 | 0 | Aluminum sulfate feed complete. Started Phosphoric acid (75%) solution feed. | 2.2 | 0.0 | 0.0 | |
| 80 | 25.5 | 77.9 | 4.26 | 0.0 | 0 | Phosphoric acid (75%) solution feed complete. | 0.0 | 0.0 | 0.0 | |
| 90 | 25.5 | 77.9 | 4.29 | 0.0 | 0 | Let mix overnight. | 0.0 | 0.0 | 0.0 | |
| | | | | | | Oct. 21, 2021 9:30 am (19 hrs) Solution still cloudy clear. Set heat to 30° C. | | | | |
| | | | | | | 3:00 pm (24.5 hrs) Solution clear. Filtered solution through #41 Whatman paper. | | | | |
| Average | 27.6 | 81.6 | 6.46 | | | | | | | |

TABLE 32

| | | | | | | | | | | | | | | | |
|---|---|---|---|---|---|---|---|---|---|---|---|---|---|---|---|
| | | | | UltraPAC 2361 (50% Basic PAS) | | | | | | | Headspace | | | | |
| | | | | 1.0% Phosphoric acid (75%) solution | | | Conversion Gallons | | | | Target | Initial | Actual | | |
| | Working Examples MV-155 | | | | MV-155 | | 306.8804 | 14774.7 | | | 11.4 | 3.5 | 16.0 | 17.0 | |
| | Digest Temp. (° C.) | | | | Formulation | | Target | | | | Actual | | | | |
| Target | Overnight (° C.) | % $M_2O_3$ | % Basicity | Sp. Gr. | grams | % | Pounds | Gallons | % | Min. Gallons | Pounds | Gallons | % | | |
| 40.00 | Start Up Water | 0 | | 1.000 | 40.00 | 8.30 | 12,275 | 1,472 | 8.30 | 2,100 | 12,275 | 1472 | 8.30 | | |
| 0.00 | Ferric sulfate | 17.75 | 10.5 | 1.581 | 0.00 | 0.00 | 0 | 0 | 0.00 | 0 | 0 | 0 | 0.00 | | |
| 37.41 | Solution Water | 0 | | 1.000 | 37.37 | 7.76 | 11,470 | 1,376 | 7.76 | 2,752 | 11,470 | 1469 | 7.76 | | |
| 12.50 | Sodium carbonate | 0 | | NA | 12.49 | 2.59 | 3,835 | NA | 2.59 | | 3,835 | NA | 2.59 | | |
| 48.00 | 43% Sodium aluminate | 22.96 | 149.0 | 1.520 | 47.87 | 9.94 | 14,690 | 1,359 | 9.94 | 2,535 | 14,690 | 1,159 | 9.94 | % $Na_2O$ SAX | 19.35 |
| 357.10 | Alumium sulfate | 8.07 | 2.7 | 1.325 | 356.92 | 74.10 | 109,530 | 9,915 | 74.10 | | 109,530 | 9915 | 74.10 | | |
| 0.00 | Pressure PAC (UP 290) | 16.88 | 41.8 | 1.370 | 0.00 | 0.00 | 0 | 0 | 0.00 | | 0 | 0 | 0.00 | % Cl UP 290 | 20.99 |
| 5.00 | H3PO4 (75%) solution | 0 | | 1.570 | 5.03 | 1.04 | 1,545 | 118 | 1.05 | | 1,545 | 118 | 1.05 | | |
| | Flush Water | | | 1.000 | 0.00 | 0.00 | 0 | 0 | 0.00 | | 0 | 0 | 0.00 | | |
| 500.0 | Final product | 8.28 | 8.26 | 1.200 | 499.68 | 103.73 | 153,340 | 15,327 | 102.70 | | 153,345 | 13,749 | 103.74 | | |
| | Check | | | | 481.66 | 99.99% | 153,345 | | | 0 | 147,820 | 13,663 | 100.00% | | |
| | % SA soln | 25.1% | | 1.249 | 401.4 | 96.39% | 147,815 | −5,530 | | 147,820 | −5,525 | −86 | 96.40% | | |

| | Evaporation | | | % $Al_2O_2$ | % Basicity | % $SO_4$ | % Cl | $Cl/SO_4$ ratio | Cl + $SO_4$ | Na | Cl + $SO_4$ + Na |
|---|---|---|---|---|---|---|---|---|---|---|---|
| Expected | 0.0 | 0.00% | Evap. & $CO_2$ | 8.26% | 49.9 | 16.90 | 0.00 | 0.00 | 16.90 | 2.50 | 19.40 |
| Actual | 18.0 | 3.74% | Just $CO_2$ | 7.96% | | 16.29 | 0.00 | | 16.29 | 2.50 | 18.79 |

1. Add required amount of start up water to the reactor and start agitation. 0.9541
2. Add the required amount of water into the soda ash mix vessel and start agitator. 5,525 3.74%
3. Add required amount of sodium carbonate (soda ash) to the soda ash mix vessel and agitate until dissolved.
4. Add the required amount of 43% sodium aluminate solution into the soda ash mix vessel.
5. Add the required amount of aluminum sulfate solution to the alum holding vessel.
6. Start addition of the aluminum solution to the reactor to lower PH to less than 4.
7. Start addition of the sodium carbonate/sodium aluminate mixture to the reactor.
8. Adjust feed rates to add the solutions over desired time period maintaining the pH between 5.5 and 7.
9. When all of the sodium carbonate/sodium aluminate solution has been added let the pH fall below 5.
10. When the pH falls below 5 increase the aluminum sulfate feed rate.
11. When all of the aluminim sulfate solution has been added start the phosphoric acid addition.
12. When phosphoric acid addition is completet let solution mix until all solids have dissolved.

| Analysis: Specific Gravity | Calculated | Actual | |
|---|---|---|---|
| % $M_2O_3$ | | | |
| % $Al_2O_3$ | 8.26 | 8.22 | −0.04 |
| % $Fe_2O_3$ | 0.00 | | |
| % Basicity | 49.9 | 48.9 | −1.0 145.4 |
| % Sulfates | 16.90 | | |
| Turbidity, NTU | | | |

TABLE 32-continued

| | | | | | | | | | | |
|---|---|---|---|---|---|---|---|---|---|---|
| Viscosity, cps | | | | | | | | | | |
| Precipitation observations and data | | | | | | | | | | |
| Time (min) | Bulk slurry Temp. (° C.) | Bulk slurry Temp. (° F.) | Bulk slurry pH | Alum/ UP290 pump setting | $H_2O$/ SA/SAX pump setting | Comments | Alum pump rate (ml/min.) | $H_2O$/ SA/SAX pump rate (ml/min.) | Pump Ratio | |
| 0 | 21.9 | 71.4 | 3.62 | 0.6 | 6 | Agitator at 200 rpm. Started both feeds at 3:10 pm. | 2.2 | 1.4 | 1.6 | |
| 1 | 22.6 | 72.7 | 4.62 | 0.6 | 5 | | 2.2 | 1.4 | 1.6 | |
| 2 | 22.9 | 73.2 | 4.66 | 0.6 | 8 | | 2.2 | 1.8 | 1.2 | |
| 3 | 23.2 | 73.8 | 5.10 | 0.6 | 8 | | 2.2 | 2.8 | 1.2 | |
| 4 | 23.8 | 74.8 | 5.61 | 0.6 | 8 | Agitator increased to 250 rpm. | 2.2 | 1.8 | 1.2 | |
| 5 | 24.1 | 75.4 | 5.58 | 1.2 | 16 | | 4.3 | 3.4 | 1.3 | |
| 6 | 25.2 | 77.4 | 5.42 | 1.2 | 17 | | 4.3 | 3.6 | 1.2 | |
| 7 | 25.7 | 78.3 | 5.34 | 1.2 | 18 | | 4.3 | 3.8 | 1.1 | |
| 8 | 26.8 | 80.2 | 5.53 | 1.2 | 19 | | 4.3 | 4.0 | 1.1 | |
| 9 | 27.7 | 81.9 | 5.53 | 1.2 | 20 | | 4.3 | 4.2 | 1.0 | |
| 10 | 28.4 | 83.1 | 5.59 | 1.2 | 21 | | 4.3 | 4.4 | 1.0 | |
| 11 | 29.2 | 84.0 | 5.82 | 1.2 | 22 | | 4.3 | 4.6 | 1.0 | |
| 12 | 30.0 | 86.0 | 5.83 | 1.2 | 23 | | 4.3 | 4.8 | 0.9 | |
| 13 | 30.5 | 86.9 | 5.95 | 1.2 | 24 | | 4.3 | 5.0 | 0.9 | |
| 14 | 31.0 | 87.8 | 6.01 | 1.2 | 24 | | 4.3 | 5.0 | 0.9 | |
| 15 | 31.5 | 88.7 | 6.06 | 1.2 | 24 | | 4.3 | 5.0 | 0.9 | |
| 17 | 32.3 | 90.1 | 6.76 | 1.2 | 24 | | 4.3 | 5.0 | 0.9 | 1.0 |
| 19 | 33.1 | 91.6 | 6.68 | 1.2 | 0 | Water/soda ash/sodium aluminate mixture feed complete. | 4.3 | 0.0 | 0.0 | |
| 21 | 31.4 | 88.5 | 5.35 | 1.2 | 0 | | 4.3 | 0.0 | 0.0 | |
| 23 | 29.8 | 85.6 | 4.87 | 4.8 | 0 | | 17.1 | 0.0 | 0.0 | |
| 30 | 26.4 | 79.5 | 4.01 | 4.8 | 0 | | 17.1 | 0.0 | 0.0 | |
| 33 | 26.1 | 79.0 | 3.95 | 0.6 | 0 | Aluminum sulfate feed complete. | 2.2 | 0.0 | 0.0 | |
| 35 | 26.1 | 79.0 | 3.96 | 0.6 | 0 | Started Phosphoric acid (75%) solution feed. | 2.2 | 0.0 | 0.0 | |
| 37 | 27.5 | 81.5 | 3.95 | 0 | 0 | Phosphoric acid (75%) solution feed complete. | 0.0 | 0.0 | 0.0 | |
| 40 | 27.4 | 81.3 | 3.95 | 0 | 0 | Let mix overnight. | 0.0 | 0.0 | 0.0 | |
| | | | | | | Dec. 15, 2021 8:30 am (17.33 hrs) Solution clear. Filtered solution through #4 Whatman paper. | | | | |
| Average | 28.5 | 83.3 | 5.85 | | | | | | | |

TABLE 33

| | | | | | | | | | | | | | | | |
|---|---|---|---|---|---|---|---|---|---|---|---|---|---|---|---|
| | | | | UitraPAC 2361 (50% Basic PAS) | | | | | | | Headspace | | | | |
| | | | | 0.6% sodium gluconate | | | Conversion Gallons | | | | Target | Initial | Actual | | |
| | Working Examples MV-158 | | | MV-158 | | | 306.2065 | 14774.7 | | | 11.4 | 3.6 | 16.0 | 16.3 | |
| | Digest Temp. (° C.) | | | | Formulation | | Target | | | | Actual | | | | |
| Target | Overnight (° C.) | % $M_2O_3$ | % Basicity | Sp. Gr. | grams | % | Pounds | Gallons | % | Min. Gallons | Pounds | Gallons | % | | |
| 40.00 | Start Up Water | 0 | | 1.000 | 40.00 | 8.29 | 12,250 | 1,469 | 8.29 | 2,100 | 12,250 | 1469 | 8.29 | | |
| 3.00 | Sodium gluconate | | | 1.581 | 3.11 | 0.64 | 950 | 114 | 0.64 | 601 | 950 | 114 | 0.64 | | |
| 37.41 | Solution Water | 0 | | 1.000 | 37.40 | 7.75 | 11,450 | 1,373 | 7.75 | 2,747 | 11,450 | 1467 | 7.75 | | |
| 12.50 | Sodium carbonate | 0 | | NA | 12.52 | 2.59 | 3,835 | NA | 2.59 | | 3,835 | NA | 2.59 | | |
| 43.50 | 43% Sodium aluminate | 22.96 | 149.0 | 1.520 | 43.70 | 9.05 | 13,380 | 1,056 | 9.05 | 2,429 | 13,380 | 1056 | 9.05 | % $Na_2O$ SAX | 19.35 |
| 363.60 | Alumium sulfate | 8.07 | 2.7 | 1.325 | 363.73 | 75.35 | 111,375 | 10,082 | 75.35 | | 111,375 | 10082 | 75.35 | | |
| 0.00 | Pressure PAC (UP 290) | 16.88 | 41.8 | 1.370 | 0.00 | 0.00 | 0 | 0 | 0.00 | | 0 | 0 | 0.00 | % Cl UP 290 | 20.99 |
| 0.00 | H3PO4 (75%) solution | 0 | | 1.570 | 0.00 | 0.00 | 0 | 0 | 0.00 | | 0 | 0 | 0.00 | | |
| | Flush Water | | | 1.000 | 0.00 | 0.00 | 0 | 0 | 0.00 | | 0 | 0 | 0.00 | | |
| 500.0 | Final product | 8.16 | 8.16 | 1.200 | 500.5 | 103.67 | 153,245 | 15,318 | 103.68 | | 153,240 | 13,749 | 103.68 | | |
| | Check | | | | 482.7 | 99.99% | 153,240 | | | 0 | 147,803 | 13,727 | 100.00% | | |
| | % SA soln | 25.1% | | 1.250 | 402.3 | 96.46% | 147,808 | −5,432 | | 147,803 | −5,437 | −21 | 96.45% | | |

| | Evaporation | | | % $Al_2O_2$ | % Basicity | % $SO_4$ | % Cl | $Cl/SO_4$ ratio | Cl + $SO_4$ | Na | Cl + $SO_4$ + Na |
|---|---|---|---|---|---|---|---|---|---|---|---|
| Expected | 0.0 | 0.00% | Evap. & $CO_2$ | 8.16% | 50.2 | 17.19 | 0.00 | 0.00 | 17.19 | 2.37 | 19.56 |
| Actual | 17.7 | 3.68% | Just $CO_2$ | 7.87% | | 16.58 | 0.00 | | 16.58 | 2.37 | 18.95 |

1. Add required amount of start up water to the reactor and start agitation. 0.9541
2. Add the required amount of water into the soda ash mix vessel and start agitator. 5,437 3.68%
3. Add required amount of sodium carbonate (soda ash) to the soda ash mix vessel and agitate until dissolved.
4. Add the required amount of 43% sodium aluminate solution into the soda ash mix vessel.
5. Add the required amount of aluminum sulfate solution to the alum holding vessel.
6. Start addition of the aluminum solution to the reactor to lower pH to less than 4.
7. Start addition of the sodium carbonate/sodium aluminate mixture to the reactor.
8. Adjust feed rates to add the solutions over desired time period maintaining the pH between 5.5 and 7.
9. When all of the sodium carbonate/sodium aluminate solution has been added let the pH fall below 5.
10. When the pH falls below 5 increase the aluminum sulfate feed rate.
11. When all of the aluminim sulfate solution has been added , add the sodium gluconate.
12. When the sodium gluconate has been added let solution mix until all solids have dissolved.

| Analysis:<br>Specific Gravity | Calculated | Actual | |
|---|---|---|---|
| % $M_2O_3$ | | | |
| % $Al_2O_3$ | 8.16 | 8.18 | 0.02 |
| % $Fe_2O_3$ | 0.00 | | |
| % Basicity | 50.2 | 49.3 | −1.1 144.8 |
| % Sulfates | 17.19 | | |
| Turbidity, NTU | | | |

TABLE 33-continued

| Time (min) | Bulk slurry Temp. (° C.) | Bulk slurry Temp. (° F.) | Bulk slurry pH | Alum/ UP290 pump setting | $H_2O$/ SA/SAX pump setting | Comments | Alum pump rate (ml/min.) | $H_2O$/ SA/SAX pump rate (ml/min.) | Pump Ratio | Viscosity, cps |
|---|---|---|---|---|---|---|---|---|---|---|
| | | | | | | Precipitation observations and data | | | | |
| 0 | 22.5 | 72.5 | 3.55 | 0.6 | 6 | Agitator at 250 rpm. Started both feeds at 12:40 pm. | 2.2 | 1.4 | 1.6 | |
| 1 | 23.6 | 74.5 | 4.70 | 0.6 | 6 | | 2.2 | 1.4 | 1.6 | |
| 2 | 24.0 | 75.2 | 4.82 | 0.6 | 8 | | 2.2 | 1.8 | 1.2 | |
| 3 | 24.4 | 75.9 | 5.44 | 0.6 | 8 | | 2.2 | 1.8 | 1.2 | |
| 4 | 25.2 | 77.4 | 5.74 | 0.6 | 8 | | 2.2 | 1.8 | 1.2 | |
| 5 | 26.0 | 78.8 | 5.92 | 0.6 | 9 | | 2.2 | 2.0 | 1.1 | |
| 6 | 26.7 | 80.1 | 6.20 | 0.6 | 9 | | 2.2 | 2.0 | 1.1 | |
| 7 | 27.2 | 81.0 | 6.71 | 0.6 | 8 | | 2.2 | 1.8 | 1.2 | |
| 8 | 27.7 | 81.9 | 6.67 | 0.6 | 8 | | 2.2 | 1.8 | 1.2 | |
| 9 | 28.0 | 82.4 | 6.71 | 0.6 | 8 | | 2.2 | 1.8 | 1.2 | |
| 10 | 28.3 | 82.9 | 6.72 | 0.6 | 8 | | 2.2 | 1.8 | 1.2 | |
| 15 | 29.4 | 84.9 | 6.73 | 0.6 | 8 | | 2.2 | 1.8 | 1.2 | |
| 20 | 30.0 | 86.0 | 6.72 | 0.6 | 8 | | 2.2 | 1.8 | 1.2 | |
| 25 | 30.4 | 86.7 | 6.79 | 0.6 | 8 | | 2.2 | 1.8 | 1.2 | |
| 30 | 30.8 | 87.4 | 6.81 | 0.6 | 8 | | 2.2 | 1.8 | 1.2 | |
| 35 | 31.0 | 87.8 | 6.84 | 0.6 | 8 | | 2.2 | 1.8 | 1.2 | 1.2 |
| 40 | 31.1 | 88.0 | 6.84 | 0.6 | 0 | Water/soda ash/sodium aluminate mixture feed complete. | 2.2 | 0.0 | 0.0 | |
| 45 | 29.4 | 84.9 | 5.48 | 0.6 | 0 | | 2.2 | 0.0 | 0.0 | |
| 50 | 27.9 | 82.2 | 4.98 | 4.2 | 0 | | 15.0 | 0.0 | 0.0 | |
| 60 | 25.7 | 78.3 | 4.06 | 4.2 | 0 | | 15.0 | 0.0 | 0.0 | |
| 62 | 25.6 | 78.1 | 4.03 | 0.0 | 0 | Aluminum sulfate feed complete. Added sodium gluconate. | 0.0 | 0.0 | 0.0 | |
| 70 | 25.3 | 77.5 | 4.06 | 0.0 | 0 | Let mix overnight. Dec. 16, 2021 8:30 am (19.2 hrs) Solution clear. Filtered solution through #4 Whatman paper. | 0.0 | 0.0 | 0.0 | |
| Average | 28.3 | 82.9 | 6.64 | | | | | | | |

TABLE 34

| | | | | | | | | | | | | | | | |
|---|---|---|---|---|---|---|---|---|---|---|---|---|---|---|---|
| | | | | | UitraPAC 2361 (50% Basic PAS) | | | | | | Headspace | | | | |
| | | | | 1.0% Phosphoric acid (75%) solution | | | Conversion Gallons | | | | Target | Initial | Actual | | |
| | Working Examples MV-161 | | | MV-161 | | | 65.6957 | 14774.7 | | | 11.4 | 3.9 | 16.0 | 16.9 | |
| | Digest Temp. (° C.) | | | | Formulation | | | Target | | | | Actual | | | |
| Target | Overnight (° C.) | % $M_2O_3$ | % Basicity | Sp. Gr. | grams | % | Pounds | Gallons | % | Min. Gallons | Pounds | Gallons | % | | |
| 185.96 | Start Up Water | 0 | | 1.000 | 185.96 | 8.27 | 12,215 | 1,465 | 8.26 | 2,100 | 12,215 | 1465 | 8.26 | | |
| 0.00 | Ferric sulfate | 17.75 | 10.5 | 1.581 | 0.00 | 0.00 | 0 | 0 | 0.00 | 0 | 0 | 0 | 0.00 | | |
| 174.02 | Solution Water | 0 | | 1.000 | 174.02 | 7.73 | 11,430 | 1,371 | 7.73 | 2.742 | 11,430 | 1460 | 7.73 | | |
| 56.25 | Sodium carbonate | 0 | | NA | 56.25 | 2.50 | 3,695 | NA | 2.50 | | 3,695 | NA | 2.50 | | |
| 218.10 | 43% Sodiun; aluminate | 22.96 | 149.0 | 1.520 | 218.10 | 9.69 | 14,330 | 1,131 | 9.69 | 2,502 | 14,330 | 1131 | 9.69 | % $Na_2O$ SAX | 19.35 |
| 1672.77 | Alumium sulfate | 7.98 | 3.8 | 1.325 | 1672.77 | 74.35 | 109,895 | 9,948 | 74.35 | | 109,895 | 9948 | 74.35 | | |
| 0.00 | Pressure PAC (UP 290) | 16.88 | 41.8 | 1.370 | 0.00 | 0.00 | 0 | 0 | 0.00 | | 0 | 0 | 0.00 | % Cl UP 290 | 20.99 |
| 22.50 | H3PO4 (75%) solution | 0 | | 1.570 | 22.50 | 1.00 | 1,480 | 113 | 1.00 | | 1,480 | 113 | 1.00 | | |
| | First: Water | | | 1.000 | 0.00 | 0.00 | 0 | 0 | 0.00 | | 0 | 0 | 0.00 | | |
| 2250.0 | Final product | 8.18 | 8.16 | 1.200 | 2329.6 | 103.54 | 153,045 | 15,298 | 102.54 | | 153,045 | 13,749 | 103.54 | | |
| | Check | | | | 2250.0 | 100.00% | 153,045 | | | 0 | 147,812 | 13,674 | 100.00% | | |
| | % SA soln | 24.4% | | 1.243 | 1,875.0 | 96.38% | 147,812 | −5,233 | | 147,812 | −5,233 | −75 | 96.58% | | |

| Evaporation | | | | % $Al_2O_2$ | % Basicity | % $SO_4$ | % Cl | Cl/$SO_4$ ratio | Cl + $SO_4$ | Na | Cl + $SO_4$ + Na |
|---|---|---|---|---|---|---|---|---|---|---|---|
| Expected | 79.65 | 3.54% | Evap. & $CO_2$ | 8.16% | 50.0 | 16.77 | 0.00 | 0.00 | 16.77 | 2.42 | 19.19 |
| Actual | 79.65 | 3.54% | Just $CO_2$ | 7.88% | | 16.20 | 0.00 | | 16.20 | 2.42 | 18.62 |

1. Add required amount of start up water to the reactor and start agitation.
2. Add the required amount of water into the soda ash mix vessel and start agitator.
3. Add required amount of sodium carbonate (soda ash) to the soda ash mix vessel and agitate until dissolved.
4. Add the required amount of 43% sodium aluminate solution into the soda ash mix vessel.
5. Add the required amount of aluminum sulfate solution to the alum holding vessel.
6. Start addition of the aluminum solution to the reactor to lower pH to less than 4.
7. Start addition of the sodium carbonate/sodium aluminate mixture to the reactor.
8. Adjust feed rates to add the solutions over desired time period maintaining the pH between 5.5 and 7.
9. When all of the sodium carbonate/sodium aluminate solution has been added let the pH fall below 5.
10. When the pH falls below 5 increase the aluminum sulfate feed rate.
11. When all of the aluminim sulfate solution has been added start the phosphoric acid addition.
12. When phosphoric acid addition is completet let solution mix until all solids have dissolved.

0.9541

5,233 3.54%

| Analysis: Specific Gravity | Calculateci | Actual | |
|---|---|---|---|
| % $M_2O_3$ | | | |
| % $Al_2O_3$ | 8.16 | 8.10 | −0.06 |
| % $Fe_2O_3$ | 0.00 | | 0.0 148.8 |
| % Basicity | 50.0 | 50.0 | |
| % Sulfates | 16.77 | | |
| Turbidity, NTU | | | |

TABLE 34-continued

Viscosity, cps

Precipitation observations and data

| Time (min) | Bulk slurry Temp. (° C.) | Bulk slurry Temp. (° F.) | Bulk slurry pH | Alum/UP290 pump setting | $H_2O$/SA/SAX pump setting | Comments | Alum pump rate (ml/min.) | $H_2O$/SA/SAX pump rate (ml/min.) | Pump Ratio | |
|---|---|---|---|---|---|---|---|---|---|---|
| 0 | 18.2 | 64.8 | 3.81 | 0.6 | 6 | Agitator at 200 rpm. Starter both feeds at 12:45 pm. | 2.2 | 1.4 | 1.6 | |
| 1 | 18.4 | 65.1 | 4.50 | 0.6 | 6 | | 2.2 | 1.4 | 1.6 | |
| 2 | 18.5 | 65.3 | 4.70 | 0.6 | 8 | | 2.2 | 1.8 | 1.2 | |
| 3 | 18.7 | 65.1 | 5.29 | 0.6 | 8 | | 2.2 | 1.8 | 1.2 | |
| 4 | 19.0 | 66.2 | 5.69 | 0.6 | 8 | | 2.2 | 1.8 | 1.2 | |
| 5 | 19.2 | 66.6 | 5.91 | 0.6 | 9 | | 2.2 | 2.0 | 1.1 | |
| 6 | 19.4 | 66.9 | 6.14 | 0.6 | 9 | | 2.2 | 2.0 | 1.1 | |
| 7 | 19.7 | 67.5 | 6.29 | 0.6 | 8 | | 2.2 | 1.8 | 1.2 | |
| 8 | 19.9 | 67.8 | 6.39 | 0.6 | 8 | | 2.2 | 1.8 | 1.2 | |
| 9 | 20.1 | 68.2 | 6.48 | 0.6 | 8 | | 2.2 | 1.8 | 1.2 | |
| 10 | 20.3 | 68.5 | 6.54 | 1.2 | 16 | | 4.3 | 3.4 | 1.3 | |
| 11 | 20.8 | 69.1 | 6.48 | 1.2 | 15 | | 4.3 | 3.4 | 1.3 | |
| 12 | 21.0 | 69.8 | 6.46 | 2.4 | 32 | | 8.6 | 6.5 | 1.3 | |
| 13 | 21.5 | 70.7 | 6.23 | 2.4 | 32 | | 8.6 | 6.5 | 1.3 | |
| 14 | 22.2 | 72.0 | 6.27 | 2.4 | 32 | Increased agitator to 250 rpm. | 8.6 | 6.5 | 1.3 | |
| 15 | 22.7 | 72.9 | 6.23 | 2.4 | 34 | | 8.6 | 6.9 | 1.2 | |
| 16 | 23.2 | 73.8 | 6.35 | 2.4 | 34 | | 8.6 | 6.9 | 1.2 | |
| 17 | 23.5 | 74.3 | 6.45 | 2.4 | 34 | | 8.6 | 6.9 | 1.2 | |
| 18 | 24.1 | 75.4 | 6.60 | 2.4 | 34 | | 8.6 | 6.9 | 1.2 | |
| 19 | 24.4 | 75.9 | 6.66 | 2.5 | 34 | | 8.9 | 6.9 | 1.3 | |
| 20 | 24.8 | 76.6 | 6.64 | 2.5 | 34 | | 8.9 | 6.9 | 1.3 | |
| 21 | 25.2 | 77.4 | 6.63 | 2.5 | 34 | | 8.9 | 6.9 | 1.3 | |
| 25 | 26.2 | 79.2 | 6.60 | 2.6 | 34 | | 9.3 | 6.9 | 1.3 | |
| 30 | 27.3 | 81.1 | 6.45 | 2.5 | 34 | | 8.9 | 6.9 | 1.3 | |
| 40 | 28.6 | 83.5 | 6.54 | 2.5 | 34 | | 8.9 | 6.9 | 1.3 | |
| 50 | 29.3 | 84.7 | 6.57 | 2.5 | 34 | | 8.9 | 6.9 | 1.3 | 1.3 |
| 60 | 29.0 | 84.2 | 5.85 | 2.5 | 0 | Water/soda ash/sodium aluminate mixture feed complete. | 8.9 | 0.0 | 0.0 | |
| 70 | 26.2 | 79.2 | 4.85 | 5.0 | 0 | | 17.8 | 0.0 | 0.0 | |
| 115 | 22.7 | 72.9 | 4.13 | 0.6 | 0 | Aluminum sulfate feed complete. Started phosphoric acid (75%) solution feed. | 2.2 | 0.0 | 0.0 | |
| 120 | 23.5 | 74.3 | 4.19 | 0.0 | 0 | Phosphoric acid (75%) solution feed complete | 0.0 | 0.0 | 0.0 | |
| 170 | 23.5 | 74.3 | 4.19 | 0.0 | 0 | Let mix overnight. | 0.0 | 0.0 | 0.0 | |
| | | | | | | Jan. 28, 2022 8:30 am (19.75 hrs) Solution clear. filtered solution through #41 Whatman paper. | | | | |
| Average | 23.4 | 74.3 | 6.43 | | | | | | | |

TABLE 35

| Target | | % $M_2O_3$ | % Basicity | Sp. Gr. | grams | % | Pounds | Gallons | % | Min. Gallons | Pounds | Gallons | % | | |
|---|---|---|---|---|---|---|---|---|---|---|---|---|---|---|---|
| | | | | | UltraPAC 2361 (50% Basic PAS) | | | | | | Headspace | | | | |
| | | | | 1.0% Phosphoric acid (75%) solution | | | Conversion Gallons | | | | Target | Initial | Actual | | |
| | Working Examples MV-169 | | | MV-169 | | | 65.3448 | 14774.7 | | | 11.4 | 5.2 | 16.0 | 16.9 | |
| | Digest Temp. (° C.) | | | | Formulation | | Target | | | | Actual | | | | |
| Target | Overnight (° C.) | % $M_2O_3$ | % Basicity | Sp. Gr. | grams | % | Pounds | Gallons | % | Min. Gallons | Pounds | Gallons | % | | |
| 185.96 | Start Up Water | 0 | | 1.000 | 185.96 | 8.22 | 12,150 | 1,457 | 8.22 | 2.100 | 12,150 | 1457 | 8.22 | | |
| 0.00 | Ferric sulfate | 17.75 | 10.5 | 1.581 | 0.00 | 0.00 | 0 | 0 | 0.00 | 0 | 0 | 0 | 0.00 | | |
| 174.02 | Solution Water | 0 | | 1.000 | 173.92 | 7.69 | 11,365 | 1,363 | 7.69 | 2,726 | 11,365 | 1452 | 7.69 | | |
| 56.25 | Sodium carbonate | 0 | | NA | 56.28 | 2.49 | 3,680 | NA | 2.49 | | 3,680 | NA | 2.49 | | |
| 172.00 | 43% Sodium aluminate | 23.87 | 149.0 | 1.520 | 171.93 | 7.60 | 11,235 | 887 | 7.60 | 2,250 | 11,235 | 887 | 7.60 | % $Na_2O$ SAX | 19.35 |
| 1718.90 | Alumium sulfate | 8.36 | 6.7 | 1.325 | 1717.36 | 75.92 | 112,220 | 10,159 | 75.92 | | 112,220 | 10159 | 75.92 | | |
| 0.00 | Pressure PAC (UP 290) | 16.88 | 41.8 | 1.370 | 0.00 | 0.00 | 0 | 0 | 0.00 | | 0 | 0 | 0.00 | % Cl UP 290 | 20.99 |
| 22.50 | H3PO4 (75%) solution | 0 | | 1.570 | 22.67 | 1.00 | 1,480 | 113 | 1.00 | | 1,480 | 113 | 1.00 | | |
| | Flush Water | | | 1.000 | 0.00 | 0.00 | 0 | 0 | 0.00 | | 0 | 0 | 0.00 | | |
| 2250.0 | Final product | 8.16 | 8.16 | 1.200 | 2328.1 | 102.92 | 152,130 | 15,206 | 101.92 | | 152,130 | 13,749 | 102.92 | | |
| | Check | | | | 2262.0 | 100.00% | 152,130 | | | 0 | 147,811 | 13,733 | 100.00% | | |
| | % SA soln | 24.4% | | 1.243 | 1,885.0 | 97.16% | 147,811 | −4,319 | | 147,811 | −4,319 | −15 | 97.16% | | |

| Evaporation | | | | % $Al_2O_2$ | % Basicity | % $SO_4$ | % Cl | $Cl/SO_4$ ratio | Cl + $SO_4$ | Na | Cl + $SO_4$ + Na |
|---|---|---|---|---|---|---|---|---|---|---|---|
| Expected | 79.65 | 3.54% | Evap. & $CO_2$ | 8.16% | 44.9 | 17.94 | 0.00 | 0.00 | 17.94 | 2.18 | 20.11 |
| Actual | 66.09 | 2.92% | Just $CO_2$ | 7.93% | | 17.43 | 0.00 | | 17.43 | 2.18 | 19.60 |

1. Add required amount of start up water to the reactor and start agitation. 0.9541
2. Add the required amount of water into the soda ash mix vessel and start agitator. 4,319 2.92%
3. Add required amount of sodium carbonate (soda ash) to the soda ash mix vessel and agitate until dissolved.
4. Add the required amount of 43% sodium aluminate solution into the soda ash mix vessel.
5. Add the required amount of aluminum sulfate solution to the alum holding vessel.
6. Start addition of the aluminum solution to the reactor to lower pH to less than 4.
7. Start addition of the sodium carbonate/sodium aluminate mixture to the reactor.
8. Adjust feed rates to add the solutions over desired time period maintaining the pH between 5.5 and 7.
9. When all of the sodium carbonate/sodium aluminate solution has been added let the pH fall below 5.
10. When the pH falls below 5 increase the aluminum sulfate feed rate.
11. When all of the aluminim sulfate solution has been added start the phosphoric acid addition.
12. When phosphoric acid addition is completet let solution mix until all solids have dissolved.

| Analysis: Specific Gravity | Calculated | Actual | |
|---|---|---|---|
| % $M_2O_3$ | | | |
| % $Al_2O_3$ | 8.16 | 8.19 | 0.03 |
| % $Fe_2O_3$ | 0.00 | | |
| % Basicity | 44.9 | 44.4 | −0.5 146.7 |
| % Sulfates | 17.94 | | |
| Turbidity, NTU | | | |

TABLE 35-continued

Viscosity, cps

Precipitation observations and data

| Time (min) | Bulk slurry Temp. (° C.) | Bulk slurry Temp. (° F.) | Bulk slurry pH | Alum/ UP290 pump setting | $H_2O$/ SA/SAX pump setting | Comments | Alum pump rate (ml/min.) | $H_2O$/ SA/SAX pump rate (ml/min.) | Pump Ratio | |
|---|---|---|---|---|---|---|---|---|---|---|
| 0 | 21.4 | 70.5 | 3.86 | 0.6 | 6 | Agitator at 200 rpm. Started both feeds at 2:40 pm. | 2.2 | 1.4 | 1.6 | |
| 1 | 21.5 | 70.7 | 4.41 | 0.6 | 6 | | 2.2 | 1.4 | 1.6 | |
| 2 | 21.6 | 70.9 | 4.58 | 0.6 | 8 | | 2.2 | 1.8 | 1.2 | |
| 3 | 21.7 | 71.1 | 5.08 | 0.6 | 8 | | 2.2 | 1.8 | 1.2 | |
| 4 | 21.5 | 71.4 | 5.31 | 0.6 | 8 | | 2.2 | 1.8 | 1.2 | |
| 5 | 22.1 | 71.8 | 5.57 | 0.6 | 9 | | 2.2 | 2.0 | 1.1 | |
| 6 | 22.3 | 72.1 | 5.71 | 0.6 | 9 | | 2.2 | 2.0 | 1.1 | |
| 7 | 22.5 | 72.5 | 5.81 | 0.6 | 8 | | 2.2 | 1.8 | 1.2 | |
| 8 | 22.7 | 72.9 | 5.92 | 0.6 | 8 | | 2.2 | 1.8 | 1.2 | |
| 9 | 22.9 | 73.2 | 6.01 | 0.6 | 8 | | 2.2 | 1.8 | 1.2 | |
| 10 | 23.1 | 73.6 | 6.06 | 1.2 | 16 | | 4.3 | 3.4 | 1.3 | |
| 12 | 23.7 | 74.7 | 6.12 | 2.4 | 32 | | 8.6 | 6.5 | 1.3 | |
| 14 | 24.9 | 75.8 | 6.10 | 2.4 | 34 | | 8.6 | 6.9 | 1.2 | |
| 16 | 26.2 | 79.2 | 6.22 | 2.4 | 34 | | 8.6 | 6.9 | 1.2 | |
| 18 | 27.1 | 80.8 | 6.31 | 2.4 | 34 | | 8.6 | 6.9 | 1.2 | |
| 20 | 28.0 | 82.4 | 6.35 | 2.4 | 34 | | 8.6 | 6.9 | 1.2 | |
| 25 | 29.4 | 84.9 | 6.39 | 2.4 | 34 | | 8.6 | 6.9 | 1.2 | |
| 30 | 30.3 | 86.5 | 6.40 | 2.4 | 34 | | 8.6 | 6.9 | 1.2 | |
| 40 | 31.4 | 88.5 | 6.40 | 2.4 | 34 | | 8.6 | 6.9 | 1.2 | 1.2 |
| 51 | 31.9 | 89.4 | 6.55 | 2.5 | 0 | Water/soda ash/sodium aluminate mixture feed complete. | 8.9 | 0.0 | 0.0 | |
| 60 | 29.4 | 84.9 | 4.93 | 4.8 | 0 | | 17.1 | 0.0 | 0.0 | |
| 115 | 24.8 | 76.6 | 5.51 | 0.6 | 0 | Aluminum sulfate feed complete. Started phosphoric acid (75%) solution feed. | 2.2 | 0.0 | 0.0 | |
| 122 | 26.3 | 79.3 | 3.47 | 0.00 | 0 | Phosphoric acid (75%) solution feed complete. | 0.0 | 0.0 | 0.0 | |
| 135 | 26.1 | 79.0 | 3.49 | 0.0 | 0 | Let mix overnight. | 0.0 | 0.0 | 0.0 | |
| | | | | | | Apr. 19, 2022 9:00 am (18.33 hrs) Solution clear. Filtered solution through #41 Whatman paper. | | | | |
| Average | 26.1 | 78.9 | 5.13 | | | | | | | |

TABLE 36

| | | | | | | | | | | | | | | | |
|---|---|---|---|---|---|---|---|---|---|---|---|---|---|---|---|
| | UltraPAC 2361 (50% Basic PAS) | | | | | | | | | | Headspace | | | | |
| | | | | | 1.0% Phosphoric acid (75%) solution | | Conversion Gallons | | | | Target | Initial | Actual | | |
| | Working Examples MV-173 | | | | MV-173 | | 64.8222 | 14774.7 | | | 11.4 | 6.9 | 16.0 | 16.0 | |
| | Digest Temp. (° C.) | | | | Formulation | | | Target | | | | Actual | | | |
| Target | Overnight (° C.) | % $M_2O_3$ | % Basicity | Sp. Gr. | grams | % | Pounds | Gallons | % | Min. Gallons | Pounds | Gallons | % | | |
| 185.96 | Start Up Water | 0 | | 1.000 | 185.96 | 8.16 | 12,055 | 1,446 | 8.16 | 2,100 | 12,055 | 1446 | 8.16 | | |
| 0.00 | Ferric sulfate | 17.75 | 10.5 | 1.581 | 0.00 | 0.00 | 0 | 0 | 0.00 | 0 | 0 | 0 | 0.00 | | |
| 174.02 | Solution Water | 0 | | 1.000 | 173.97 | 7.63 | 11,275 | 1,352 | 7.63 | 2,705 | 11,275 | 1441 | 7.63 | | |
| 56.25 | Sodium carbonate | 0 | | NA | 56.27 | 2.47 | 3,650 | NA | 2.47 | | 3,650 | NA | 2.47 | | |
| 188.50 | 43% Sodium aluminate | 23.87 | 149.0 | 1.520 | 188.43 | 8.26 | 12,215 | 964 | 8.26 | 2,316 | 12,215 | 964 | 8.26 | % $Na_2O$ SAX | 20.27 |
| 1701.50 | Alumium sulfate | 8.36 | 6.7 | 1.325 | 1701.31 | 74.61 | 110,285 | 9,984 | 74.61 | | 110,285 | 9984 | 74.61 | | |
| 0.00 | Pressure PAC (UP 290) | 16.88 | 41.8 | 1.370 | 0.00 | 0.00 | 0 | 0 | 0.00 | | 0 | 0 | 0.00 | % Cl UP 290 | 20.99 |
| 22.50 | H3PO4 (75%) solution | 0 | | 1.570 | 22.66 | 0.99 | 1,470 | 112 | 0.99 | | 1,470 | 112 | 0.99 | | |
| | Flush Water | | | 1.000 | 0.00 | 0.00 | 0 | 0 | 0.00 | | 0 | 0 | 0.00 | | |
| 2250.0 | Final product | 8.21 | 8.21 | 1.200 | 2328.6 | 102.12 | 150,945 | 15,088 | 101.12 | | 150,950 | 13,749 | 102.12 | | |
| | Check | | | | 2280.3 | 100.00% | 150,950 | | | 0 | 147,822 | 13,753 | 100.00% | | |
| | % SA soln | 24.4% | | 1.243 | 1,900.2 | 97.92% | 147,817 | −3,133 | | 147,822 | −3,128 | 4 | 97.93% | | |

| | Evaporation | | | % $Al_2O_2$ | % Basicity | % $SO_4$ | % Cl | $Cl/SO_4$ ratio | Cl + $SO_4$ | Na | Cl + $SO_4$ + Na |
|---|---|---|---|---|---|---|---|---|---|---|---|
| Expected | 78.70 | 3.50% | Evap. & $CO_2$ | 8.21% | 47.4 | 17.63 | 0.00 | 0.00 | 17.63 | 2.26 | 19.89 |
| Actual | 48.33 | 2.12% | Just $CO_2$ | 8.04% | | 17.26 | 0.00 | | 17.26 | 2.26 | 19.53 |

1. Add required amount of start up water to the reactor and start agitation. 0.9541
2. Add the required amount of water into the soda ash mix vessel and start agitator. 3,128 2.12%
3. Add required amount of sodium carbonate (soda ash) to the soda ash mix vessel and agitate until dissolved.
4. Add the required amount of 43% sodium aluminate solution into the soda ash mix vessel.
5. Add the required amount of aluminum sulfate solution to the alum holding vessel,
6. Start addition of the aluminum solution to the reactor to lower pH to less than 4.
7. Start addition of the sodium carbonate/sodium aluminate mixture to the reactor.
8. Adjust feed rates to add the solutions over desired time period maintaining the pH between 5.5 and 7.
9. When all of the sodium carbonate/sodium aluminate solution has been added let the pH fall below 5.
10. When the pH fails below 5 increase the aluminum sulfate feed rate.
11. When all of the aluminim sulfate solution has been added start the phosphoric acid addition.
12. When phosphoric acid addition is completet let solution mix until all solids have dissolved.

| Analysis: Specific Gravity | Calculated | Actual | |
|---|---|---|---|
| % $M_2O_3$ | | | |
| % $Al_2O_3$ | 8.21 | 8.22 | 0.01 |
| % $Fe_2O_3$ | 0.00 | | |
| % Basicity | 47.4 | 46.8 | −0.6 146.6 |
| % Sulfates | 17.63 | | |
| Turbidity, NTU | | | |

TABLE 36-continued

Viscosity, cps

Precipitation observations and data

| Time (min) | Bulk slurry Temp. (° C.) | Bulk slurry Temp. (° F.) | Bulk slurry pH | Alum/ UP290 pump setting | $H_2O$/ SA/SAX pump setting | Comments | Alum pump rate (ml/min.) | $H_2O$/ SA/SAX pump rate (ml/min.) | Pump Ratio | |
|---|---|---|---|---|---|---|---|---|---|---|
| 0 | 21.9 | 71.4 | 3.75 | 0.6 | 6 | Agitator at 200 rpm. Started both feeds at 12:15 pm. | 2.2 | 1.4 | 1.6 | |
| 1 | 21.9 | 71.4 | 4.33 | 0.6 | 6 | | 2.2 | 1.4 | 1.6 | |
| 2 | 22.0 | 71.6 | 4.32 | 1.2 | 12 | | 4.3 | 2.6 | 1.7 | |
| 3 | 22.2 | 72.0 | 4.66 | 2.4 | 28 | | 8.6 | 5.8 | 1.5 | |
| 4 | 22.8 | 73.0 | 5.06 | 2.4 | 28 | | 8.6 | 5.8 | 1.5 | |
| 5 | 23.3 | 73.9 | 5.19 | 2.4 | 32 | | 8.6 | 6.5 | 1.3 | |
| 6 | 23.6 | 74.5 | 5.18 | 2.4 | 32 | | 8.6 | 6.5 | 1.3 | |
| 7 | 24.5 | 76.1 | 5.33 | 2.4 | 32 | | 8.6 | 6.5 | 1.3 | |
| 8 | 25.1 | 77.2 | 5.70 | 2.4 | 32 | | 8.6 | 6.5 | 1.3 | |
| 9 | 25.6 | 78.1 | 5.86 | 2.4 | 32 | | 8.6 | 6.5 | 1.3 | |
| 10 | 26.2 | 79.2 | 5.91 | 2.4 | 32 | | 8.6 | 6.5 | 1.3 | |
| 11 | 26.6 | 79.9 | 6.01 | 2.4 | 32 | | 8.6 | 6.5 | 1.3 | |
| 15 | 28.1 | 82.6 | 6.18 | 2.4 | 34 | | 8.6 | 6.9 | 1.2 | |
| 20 | 29.7 | 85.5 | 6.47 | 2.4 | 34 | | 8.6 | 6.9 | 1.2 | |
| 25 | 30.5 | 86.9 | 6.60 | 2.4 | 34 | | 8.6 | 6.9 | 1.2 | |
| 30 | 31.1 | 88.0 | 6.67 | 2.4 | 33 | | 8.6 | 6.7 | 1.3 | |
| 35 | 31.5 | 88.7 | 6.64 | 2.4 | 33 | | 8.6 | 6.7 | 1.3 | |
| 40 | 31.8 | 89.2 | 6.62 | 2.4 | 33 | | 8.6 | 6.7 | 1.3 | |
| 50 | 31.7 | 89.1 | 6.10 | 2.4 | 0 | Water/soda ash/sodium aluminate mixture feed complete. | 8.6 | 0.2 | 40.5 | 4.1 |
| 55 | 30.0 | 86.0 | 5.27 | 4.8 | 0 | | 17.1 | 0.0 | 0.0 | |
| 142 | 25.1 | 77.2 | 4.13 | 0.6 | 0 | Aluminum sulfate feed complete. Started phosphoric acid (75%) solution feed. | 2.2 | 0.0 | 0.0 | |
| 150 | 26.6 | 79.9 | 4.09 | 0.0 | 0 | Phosphoric acid (75%) solution feed complete. | 0.1 | 0.0 | 0.0 | |
| 290 | 24.3 | 75.7 | 4.19 | 0.0 | 0 | Let mix overnight. | 0.0 | 0.0 | 0.0 | |
| | | | | | | Apr. 21, 2022 8:30 am (20.25 hrs) Solution clear. Filtered solution through #41 Whatman paper. | 0.0 | 0.0 | 0.0 | |
| Average | 27.5 | 81.5 | 6.03 | | | | | | | |

TABLE 37

| Target | Overnight (° C.) | % $M_2O_3$ | % Basicity | Sp. Gr. | grams | % | Pounds | Gallons | % | Min. Gallons | Pounds | Gallons | % | | |
|---|---|---|---|---|---|---|---|---|---|---|---|---|---|---|---|
| | | | | | | | UltraPAC 2361 (50% Basic PAS) | | | | Headspace | | | | |
| | | | | | 1.0% Phosphoric acid (75%) solution | | Conversion Gallons | | | | Target | Initial | Actual | | |
| | Working Examples MV-176 | | | MV-176 | | | 66.6691 | 14774.7 | | | 11.4 | 8.2 | 16.0 | 15.6 | |
| | Digest Temp. (° C.) | | | | Formulation | | Target | | | | Actual | | | | |
| 185.96 | Start Up Water | 0 | | 1.000 | 185.96 | 8.39 | 12,400 | 1,487 | 8.39 | 2,100 | 12,400 | 1487 | 8.39 | | |
| 0.00 | Ferric sulfate | 17.75 | 10.5 | 1.581 | 0.00 | 0.00 | 0 | 0 | 0.00 | 0 | 0 | 0 | 0.00 | | |
| 174.02 | Solution Water | 0 | | 1.000 | 174.10 | 7.85 | 11,605 | 1,392 | 7.85 | 2,784 | 11,605 | 1482 | 7.85 | | |
| 56.25 | Sodium carbonate | 0 | | NA | 56.21 | 2.54 | 3,745 | NA | 2.53 | | 3,745 | NA | 2.53 | | |
| 203.50 | 43% Sodium aluminate | 23.87 | 135.5 | 1.520 | 203.59 | 9.18 | 13,575 | 1,071 | 9.18 | 2,463 | 13,575 | 1071 | 9.18 | % $Na_2O$ SAX | 20.27 |
| 1607.80 | Alumium sulfate | 8.36 | 6.7 | 1.325 | 1608.08 | 72.53 | 107,210 | 9,705 | 72.53 | | 107,210 | 9705 | 72.53 | | |
| 0.00 | Pressure PAC (UP 290) | 16.88 | 41.8 | 1.370 | 0.00 | 0.00 | 0 | 0 | 0.00 | | 0 | 0 | 0.00 | % Cl UP 290 | 20.99 |
| 22.50 | H3PO4 (75%) solution | 0 | | 1.570 | 22.59 | 1.02 | 1,505 | 115 | 1.02 | | 1,505 | 115 | 1.02 | | |
| | Flush Water | | | 1.000 | 0.00 | 0.00 | 0 | 0 | 0.00 | | 0 | 0 | 0.00 | | |
| 2187.5 | Final product | 8.26 | 8.26 | 1.200 | 2250.5 | 101.51 | 150,040 | 14,997 | 100.49 | | 150,040 | 13,749 | 101.51 | | |
| | Check | | | | 2217.1 | 100.00% | 150,040 | | | 0 | 147,811 | 13,780 | 100.00% | | |
| | % SA soln | 24.4% | | 1.242 | 1,847.6 | 98.51% | 147,811 | −2,229 | | 147,811 | −2,229 | 31 | 98.51% | | |

| | Evaporation | | | % $Al_2O_2$ | % Basicity | % $SO_4$ | % Cl | Cl/$SO_4$ ratio | Cl + $SO_4$ | Na | Cl + $SO_4$ + Na |
|---|---|---|---|---|---|---|---|---|---|---|---|
| Expected | 62.50 | 2.86% | Evap. & $CO_2$ | 8.26% | 47.5 | 17.14 | 0.00 | 0.00 | 17.14 | 2.43 | 19.57 |
| Actual | 33.43 | 1.51% | Just $CO_2$ | 8.13% | | 16.88 | 0.00 | | 16.88 | 2.43 | 19.31 |

1. Add required amount of start up water to the reactor and start agitation. 0.9541
2. Add the required amount of water into the soda ash mix vessel and start agitator. 2,229 1.51%
3. Add required amount of sodium carbonate (soda ash) to the soda ash mix vessel and agitate until dissolved.
4. Add the required amount of 43% sodium aluminate solution into the soda ash mix vessel.
5. Add the required amount of aluminum sulfate solution to the alum holding vessel.
6. Start addition of the aluminum solution to the reactor to lower pH to less than 4.
7. Start addition of the sodium carbonate/sodium aluminate mixture to the reactor.
8. Adjust feed rates to add the solutions over desired time period maintaining the pH between 5.5 and 7.
9. When all of the sodium carbonate/sodium aluminate solution has been added let the pH fall below 5.
10. When the pH fails below 5 increase the aluminum sulfate feed rate.
11. When all of the aluminim sulfate solution has been added start the phosphoric acid addition.
12. When phosphoric acid addition is completet let solution mix until all solids have dissolved.

| Analysis:<br>Specific Gravity | Calculated | Actual | |
|---|---|---|---|
| % $M_2O_3$ | | | |
| % $Al_2O_3$ | 8.26 | 8.31 | 0.05 |
| % $Fe_2O_3$ | 0.00 | | |
| % Basicity | 47.5 | 49.8 | 2.3 144.0 |
| % Sulfates | 17.14 | | |
| Turbidity, NTU | | | |

TABLE 37-continued

| | | | | | | | | | | | |
|---|---|---|---|---|---|---|---|---|---|---|---|
| | | Viscosity, cps | | | | | | | | | |
| | | | | | | Precipitation observations and data | | | | | |
| Time (min) | Bulk slurry Temp. (° C.) | Bulk slurry Temp. (° F.) | Bulk slurry pH | Alum/ UP290 pump setting | $H_2O$/ SA/SAX pump setting | Comments | Alum pump rate (ml/min.) | $H_2O$/ SA/SAX pump rate (ml/min.) | Pump Ratio | | |
| 0 | 22.2 | 72.0 | 3.82 | 0.6 | 6 | Agitator at 200 rpm. Started both feeds at 1:35 pm. | 2.2 | 1.4 | 1.6 | | |
| 1 | 22.4 | 72.3 | 4.15 | 0.6 | 6 | | 2.2 | 1.4 | 1.6 | | |
| 2 | 22.5 | 72.5 | 4.23 | 2.4 | 34 | | 8.6 | 6.9 | 1.2 | | |
| 3 | 23.0 | 73.4 | 4.50 | 2.4 | 34 | | 8.6 | 6.9 | 1.2 | | |
| 4 | 23.0 | 73.4 | 4.57 | 2.4 | 38 | | 8.6 | 7.7 | 1.1 | | |
| 5 | 24.8 | 76.6 | 6.20 | 2.4 | 38 | | 8.6 | 7.7 | 1.1 | | |
| 6 | 25.7 | 78.3 | 6.34 | 2.4 | 38 | Increased agitator to 250 rpm. | 8.6 | 7.7 | 1.1 | | |
| 7 | 26.5 | 79.7 | 6.65 | 2.4 | 34 | | 8.6 | 6.9 | 1.2 | | |
| 8 | 27.1 | 80.8 | 6.85 | 2.4 | 34 | | 8.6 | 6.9 | 1.2 | | |
| 9 | 27.7 | 81.9 | 6.86 | 2.4 | 32 | | 8.6 | 6.5 | 1.3 | | |
| 10 | 28.1 | 82.6 | 6.85 | 2.4 | 32 | | 8.6 | 6.5 | 1.3 | | |
| 15 | 29.5 | 85.1 | 6.70 | 2.4 | 32 | | 8.6 | 6.5 | 1.3 | | |
| 20 | 30.6 | 87.1 | 6.65 | 2.4 | 32 | | 8.6 | 6.5 | 1.3 | | |
| 30 | 31.8 | 89.2 | 6.57 | 2.4 | 32 | | 8.6 | 6.5 | 1.3 | | |
| 40 | 32.5 | 90.5 | 6.49 | 2.4 | 32 | | 8.6 | 6.5 | 1.3 | 1.3 | |
| 50 | 32.9 | 91.2 | 6.49 | 2.4 | 0 | Water/soda ash/sodium aluminate mixture feed complete. | 8.6 | 0.0 | 0.0 | | |
| 60 | 29.8 | 85.6 | 5.01 | 4.8 | 0 | | 17.1 | 0.0 | 0.0 | | |
| 123 | 26.0 | 78.8 | 4.17 | 0.6 | 0 | Aluminum sulfate feed complete. Started phosphoric acid (75%) solution feed. | 2.2 | 0.0 | 0.0 | | |
| 130 | 27.4 | 81.3 | 4.13 | 0.0 | 0 | Phosphoric acid (75%) solution feed complete. | 0.0 | 0.0 | 0.0 | | |
| 147 | 27.3 | 81.1 | 4.16 | 0.0 | 0 | Let mix overnight. | 0.0 | 0.0 | 0.0 | | |
| | | | | | | Apr. 25, 2022 8:00 am (18.42 hrs) Solution clear. Filtered solution through #41 Whatman paper. | | | | | |
| Average | 28.5 | 83.3 | 6.60 | | | | | | | | |

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A method of preparing a polyaluminum sulfate (PAS) solution, the method comprising:

forming a basic solution of sodium carbonate and sodium aluminate;

adding an aqueous solution of aluminum sulfate and the basic solution to water to form a mixture having a pH between about 5 and about 7;

allowing precipitates of aluminum hydroxide to form in the mixture; and adding an additional aqueous solution of aluminum sulfate to the mixture in an amount sufficient to dissolve the precipitates of the aluminum hydroxide and to form the PAS solution.

2. The method according to claim 1, wherein the aqueous solution of aluminum sulfate and the basic solution of sodium carbonate and sodium aluminate are added to the water as two separate streams that do not contact one another prior to being added to the water.

3. The method according to claim 2, wherein the basic solution has a ratio of the sodium carbonate to the sodium aluminate of 0.1 to 0.3.

4. The method according to claim 2, further comprising agitating the water when the two separate streams are added to the water.

5. The method according to claim 2, further comprising adjusting flow rates of the two separate streams in order to maintain the pH of the mixture.

6. The method according to claim 1, wherein the PAS solution formed has less than 20 ppm chloride.

7. The method according to claim 1, wherein the mixture has a pH between about 6.5 to about 6.8.

8. The method according to claim 1, further comprising adding phosphoric acid to the PAS solution.

9. The method according to claim 8, wherein the phosphoric acid is added at a concentration of about 0.75% to about 1.5% by weight.

10. A polyaluminum sulfate (PAS) solution prepared by the method of claim 1.

11. The PAS solution according to claim 10, having a basicity of between about 40 and about 70, a weight percent sulfate between about 15 and about 22, and a weight percent alumina between about 7.5 and about 12.

12. The PAS solution according to claim 10, having a basicity of between about 48% and about 52%, a weight percent sulfate between about 16.8 and about 17.2, and a weight percent alumina between about 8.0 and about 8.5.

13. The PAS solution according to claim 10, stabilized with between about 0.75% and about 1.125% phosphoric acid by weight.

14. A method for treating water to reduce impurities, the method comprising:

adding the PAS solution of claim 10 to the water in order to coagulate the impurities; and separating the coagulated impurities from the water to produce a treated water reduced in the impurities without increasing a chloride to sulfate mass ratio of the treated water.

* * * * *